(12) United States Patent
Kitamura et al.

(10) Patent No.: US 12,445,649 B2
(45) Date of Patent: Oct. 14, 2025

(54) INFORMATION PROCESSING DEVICE AND METHOD

(71) Applicant: SONY SEMICONDUCTOR SOLUTIONS CORPORATION, Kanagawa (JP)

(72) Inventors: Takuya Kitamura, Kanagawa (JP); Takefumi Nagumo, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/715,891

(22) PCT Filed: Nov. 25, 2022

(86) PCT No.: PCT/JP2022/043458
§ 371 (c)(1),
(2) Date: Jun. 3, 2024

(87) PCT Pub. No.: WO2023/106120
PCT Pub. Date: Jun. 15, 2023

(65) Prior Publication Data
US 2025/0039456 A1    Jan. 30, 2025

(30) Foreign Application Priority Data

Dec. 9, 2021   (JP) ................. 2021-200177

(51) Int. Cl.
*H04N 7/12*       (2006.01)
*H04N 19/12*      (2014.01)
(Continued)

(52) U.S. Cl.
CPC .......... *H04N 19/647* (2014.11); *H04N 19/12* (2014.11); *H04N 19/184* (2014.11)

(58) Field of Classification Search
CPC ...................................... H04N 19/50
See application file for complete search history.

(56) References Cited

U.S. PATENT DOCUMENTS

2012/0219231 A1    8/2012   Gharavi-Alkhansari et al.

FOREIGN PATENT DOCUMENTS

| EP | 3379835 A1 | 9/2018 |
|---|---|---|
| JP | 2001-358593 A | 12/2001 |
| JP | 2006-080793 A | 3/2006 |

OTHER PUBLICATIONS

International Search Report and Written Opinion of PCT Application No. PCT/JP2022/043458, issued on Jan. 31, 2023, 09 pages of ISRWO.

*Primary Examiner* — Y Lee
*Assistant Examiner* — Young Lee
(74) *Attorney, Agent, or Firm* — CHIP LAW GROUP

(57) ABSTRACT

The present disclosure relates to an information processing device and method capable of suppressing a drop in encoding efficiency.
A valid most significant bit position of a data unit constituted by a plurality of samples is detected, a bit string below the valid most significant bit position is extracted as valid data from the samples, and a bitstream including the valid most significant bit position and the valid data of each of the samples is generated. Furthermore, the valid most significant bit position of the data unit constituted by the plurality of samples and the valid data of each of the samples are extracted from the bitstream, invalid data constituted by a bit pattern according to a binary type is generated, the valid data is aligned, the invalid data and the aligned valid data are coupled for each of the samples, and a data unit is generated. The present disclosure can be applied, for example, in an (Continued)

information processing device, an electronic device, an information processing method, a program, or the like.

11 Claims, 57 Drawing Sheets

(51) Int. Cl.
*H04N 19/184* (2014.01)
*H04N 19/64* (2014.01)

Fig. 3

| | | | | | | | | | | | | |
|---|---|---|---|---|---|---|---|---|---|---|---|---|
| 1 | 1 | 1 | 1 | 1 | 0 | 0 | 0 | 1 | 1 | 1 | 1 | 1 |
| 0 | 0 | 0 | 0 | 0 | 1 | 0 | 1 | 0 | 0 | 0 | 0 | 1 |
| 1 | 1 | 1 | 1 | 1 | 0 | 0 | 1 | 0 | 1 | 1 | 0 | 0 |
| 0 | 0 | 0 | 0 | 0 | 1 | 0 | 0 | 0 | 0 | 1 | 1 | 1 |
| 0 | 0 | 0 | 0 | 0 | 0 | 1 | 0 | 1 | 0 | 0 | 1 | 1 |
| 1 | 1 | 1 | 1 | 1 | 0 | 0 | 1 | 0 | 0 | 1 | 0 | 0 |
| 1 | 1 | 1 | 1 | 1 | 0 | 1 | 0 | 0 | 1 | 0 | 1 | 1 |
| 0 | 0 | 0 | 0 | 0 | 0 | 1 | 0 | 0 | 1 | 1 | 0 | 0 |

42

MSB ... LSB

| | | | | | | | | | | | | |
|---|---|---|---|---|---|---|---|---|---|---|---|---|
| 0 | 0 | 0 | 0 | 0 | 0 | 1 | 1 | 0 | 0 | 1 | 1 | 1 |
| 0 | 0 | 0 | 0 | 1 | 1 | 0 | 1 | 0 | 0 | 0 | 0 | 1 |
| 0 | 0 | 0 | 0 | 0 | 0 | 0 | 1 | 1 | 1 | 1 | 0 | 0 |
| 0 | 0 | 0 | 0 | 0 | 1 | 0 | 0 | 0 | 1 | 1 | 0 | 0 |
| 0 | 0 | 0 | 0 | 0 | 0 | 1 | 0 | 1 | 0 | 0 | 1 | 1 |
| 0 | 0 | 0 | 0 | 0 | 1 | 1 | 0 | 1 | 0 | 0 | 0 | 0 |
| 0 | 0 | 0 | 0 | 0 | 0 | 1 | 0 | 1 | 0 | 1 | 0 | 1 |
| 0 | 0 | 0 | 0 | 1 | 0 | 1 | 0 | 0 | 1 | 1 | 0 | 0 |

41

MSB ... LSB

Fig. 4

| 1 | FOR DATA UNIT, TRANSMIT INFORMATION INDICATING VALID MOST SIGNIFICANT BIT POSITION AND PCM DATA BELOW VALID MOST SIGNIFICANT BIT POSITION OF EACH SAMPLE |
|---|---|
| 1-1 | ANY DESIRED BINARY TYPE |
| 1-1-1 | STRAIGHT BINARY |
| 1-1-2 | TWO'S COMPLEMENT BINARY, MSB TRANSMISSION |
| 1-1-3 | OFFSET BINARY, MSB TRANSMISSION |
| 1-2 | SELECTIVE APPLICATION OF ENCODING METHOD, TRANSMISSION OF APPLIED ENCODING METHOD SELECTION INFORMATION |
| 1-2-1 | DPCM |
| 1-2-2 | SELECTION BASED ON EFFICIENCY COMPARISON RESULT |
| 1-2-2-1 | SELECTION BASED ON COVERAGE |
| 1-2-2-2 | SELECTION BASED ON RATE DISTORTION |
| 1-2-2-3 | SELECTION BASED ON DESIGNATED PARAMETER |
| 1-3 | HANDLING PLURALITY OF BINARY TYPES |
| 1-3-1 | DESIGNATION OF BINARY TYPE BY SYSTEM |
| 1-3-1-1 | TRANSMISSION OF BINARY TYPE INFORMATION |
| 1-3-2 | DETERMINING INPUT BINARY TYPE, TRANSMISSION OF BINARY TYPE INFORMATION |

INFORMATION PROCESSING DEVICE AND METHOD

CROSS REFERENCE TO RELATED APPLICATIONS

This application is a U.S. National Phase of International Patent Application No. PCT/JP2022/043458 filed on Nov. 25, 2022, which claims priority benefit of Japanese Patent Application No. JP 2021-200177 filed in the Japan Patent Office on Dec. 9, 2021. Each of the above-referenced applications is hereby incorporated herein by reference in its entirety.

TECHNICAL FIELD

The present disclosure relates to an information processing device and method, and particularly relates to an information processing device and method capable of suppressing a drop in encoding efficiency.

BACKGROUND ART

Thus far, various methods have been proposed as methods for encoding (compressing) and decoding (decompressing) images. For example, an encoding method is known which appropriately switches between encoding using Differential Pulse Code Modulation (DPCM) and encoding using Pulse Code Modulation (PCM) (see PTL 1, for example).

CITATION LIST

Patent Literature

[PTL 1]
U.S. Patent Application Publication No. 2012/0219231 (Specification)

SUMMARY

Technical Problem

There has, however, been demand for other methods.
Having been conceived in light of such a situation, the present disclosure makes it possible to suppress a drop in encoding efficiency.

Solution to Problem

An information processing device according to one aspect of the present technique is an information processing device including: a valid most significant bit position detection unit that detects a valid most significant bit position in a data unit constituted by a plurality of samples, the valid most significant bit position being a position of a most significant bit among bits having a value different from a bit pattern according to a binary type; a valid data extraction unit that extracts a bit string below the valid most significant bit position as valid data from the samples; and a bitstream generation unit that generates a bitstream including information indicating the valid most significant bit position and the valid data of each of the samples.

An information processing method according to one aspect of the present technique is an information processing method including: detecting a valid most significant bit position in a data unit constituted by a plurality of samples, the valid most significant bit position being a position of a most significant bit among bits having a value different from a bit pattern according to a binary type; extracting a bit string below the valid most significant bit position as valid data from the samples; and generating a bitstream including (i) information indicating the valid most significant bit position and (ii) the valid data of each of the samples.

An information processing device according to another aspect of the present technique is an information processing device including: an extraction unit that extracts, from a bitstream, (i) information indicating a valid most significant bit position in a data unit constituted by a plurality of samples, the valid most significant bit position being the most significant bit position among the bits having a value different from the bit pattern according to the binary type, and (ii) valid data that is a bit string below the valid most significant bit position in each of the samples; an invalid data generation unit that generates invalid data that is above the valid most significant bit position, the invalid data conforming to the bit pattern; a valid data alignment unit that aligns the valid data to make the valid data a bit string below the valid most significant bit position in the samples; and a data unit generation unit that generates the data unit by coupling the invalid data with the valid data aligned, for each of the samples.

An information processing method according to another aspect of the present technique is an information processing method including: extracting, from a bitstream, (i) information indicating a valid most significant bit position in a data unit constituted by a plurality of samples, the valid most significant bit position being the most significant bit position among the bits having a value different from the bit pattern according to the binary type, and (ii) valid data that is a bit string below the valid most significant bit position in each of the samples; generating invalid data that is above the valid most significant bit position, the invalid data conforming to the bit pattern; aligning the valid data to make the valid data a bit string below the valid most significant bit position in the samples; and generating the data unit by coupling the invalid data with the valid data aligned, for each of the samples.

In the information processing device and method according to the one aspect of the present technique, a valid most significant bit position is detected in a data unit constituted by a plurality of samples, the valid most significant bit position being a position of a most significant bit among bits having a value different from a bit pattern according to a binary type; a bit string below the valid most significant bit position is extracted as valid data from the samples; and a bitstream including (i) information indicating the valid most significant bit position and (ii) the valid data of each of the samples is generated.

In the information processing device and method according to the other aspect of the present technique, (i) information indicating a valid most significant bit position in a data unit constituted by a plurality of samples, the valid most significant bit position being the most significant bit position among the bits having a value different from the bit pattern according to the binary type, and (ii) valid data that is a bit string below the valid most significant bit position in each of the samples, are extracted from a bitstream; invalid data that is above the valid most significant bit position is generated, the invalid data conforming to the bit pattern; the valid data is aligned to make the valid data a bit string below the valid most significant bit position in the samples; and the data unit is generated by coupling the invalid data with the valid data aligned, for each of the samples.

BRIEF DESCRIPTION OF DRAWINGS

FIG. 3 is a diagram illustrating an example of straight binary and two's complement binary.
FIG. 4 is a diagram illustrating an encoding method.

DESCRIPTION OF EMBODIMENTS

Modes for carrying out the present disclosure (called "embodiments" hereinafter) will be described hereinafter. The descriptions will be given in the following order.
  1. PCM Mode
  2. VMP-Applied PCM Mode
  3. Supplement <1. PCM Mode>
<Documents that Support Technical Content and Terms>

The scope disclosed in the present technique is not limited to the content described in the embodiments and also includes the content described in the following patent literature and the like that were publicly known at the time of filing, the content of other literature referred to in the following patent literature, and the like.

PTL 1: (see above)

In other words, the content of the patent literature and the content of other literature referred to in the patent literature described above are also grounds for determining support requirements.

<Encoding Having PCM Mode>

Thus far, various methods have been proposed as methods for encoding (compressing) and decoding (decompressing) images. For example, as described in PTL 1, an encoding method is known which appropriately switches between encoding using Differential Pulse Code Modulation (DPCM) and encoding using Pulse Code Modulation (PCM). In PCM mode, input data is transmitted as a bit string without variable length encoding (VLC) from the MSB side (that is, the bit coverage is a fixed value).

Figure 1:
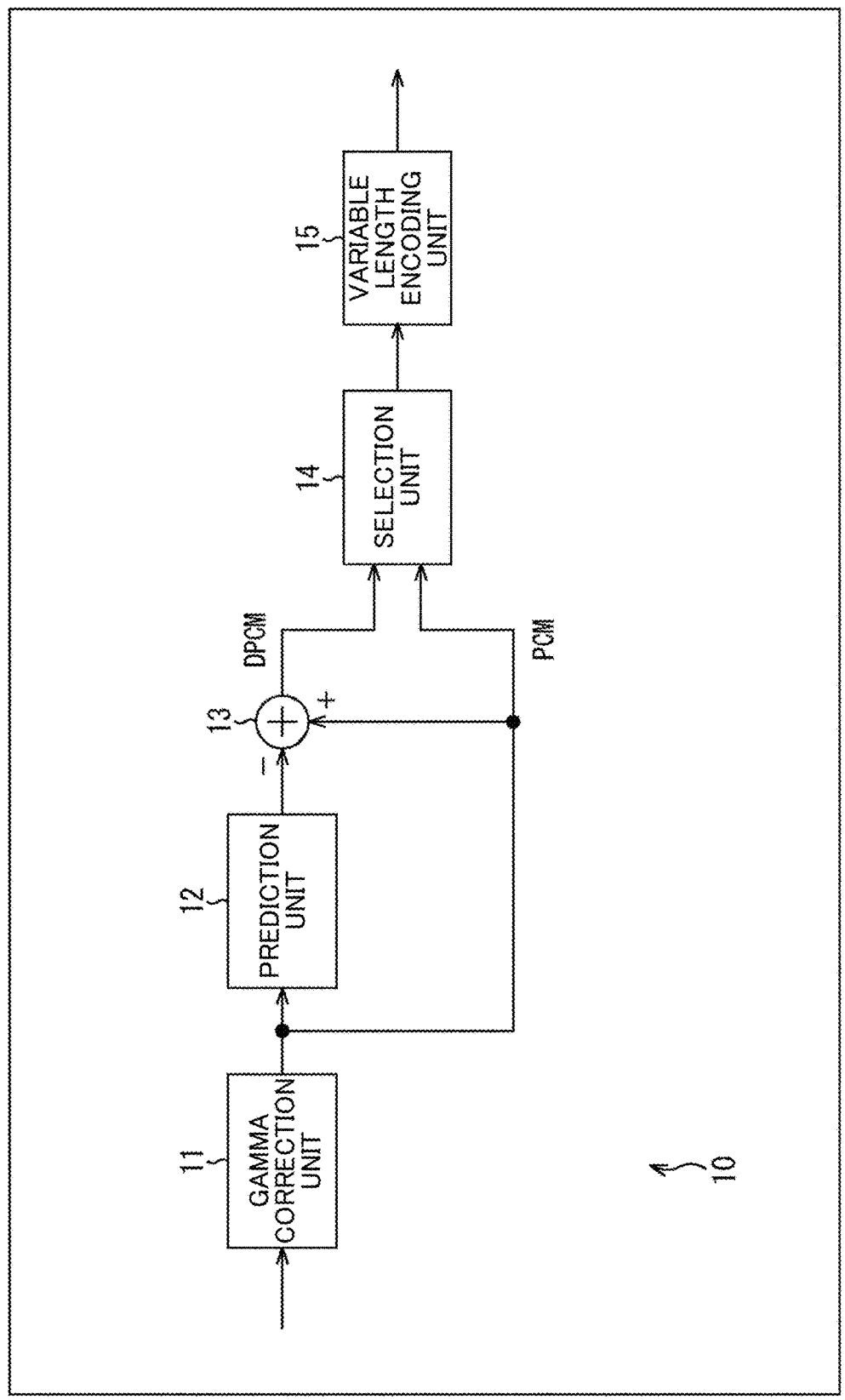
FIG. 1 is a block diagram illustrating an example of the configuration of an encoding device that switches between DPCM and PCM.

An encoding device 10 illustrated in FIG. 1 encodes input data in a DPCM mode or a PCM mode. The input data is held in a prediction unit 12 after being gamma-corrected in a gamma correction unit 11. A computation unit 13 subtracts, from a sample to be processed (the gamma-corrected input data), a past sample held in the prediction unit 12, and calculates a difference between the samples. In the DPCM mode, a selection unit 14 selects the stated difference. A variable length encoding unit 15 performs variable-length encoding on the difference and outputs encoded data. In contrast, in the PCM mode, the selection unit 14 selects the gamma-corrected input data. The variable length encoding unit 15 outputs the input data without performing variable-length encoding thereon.

Figure 2:
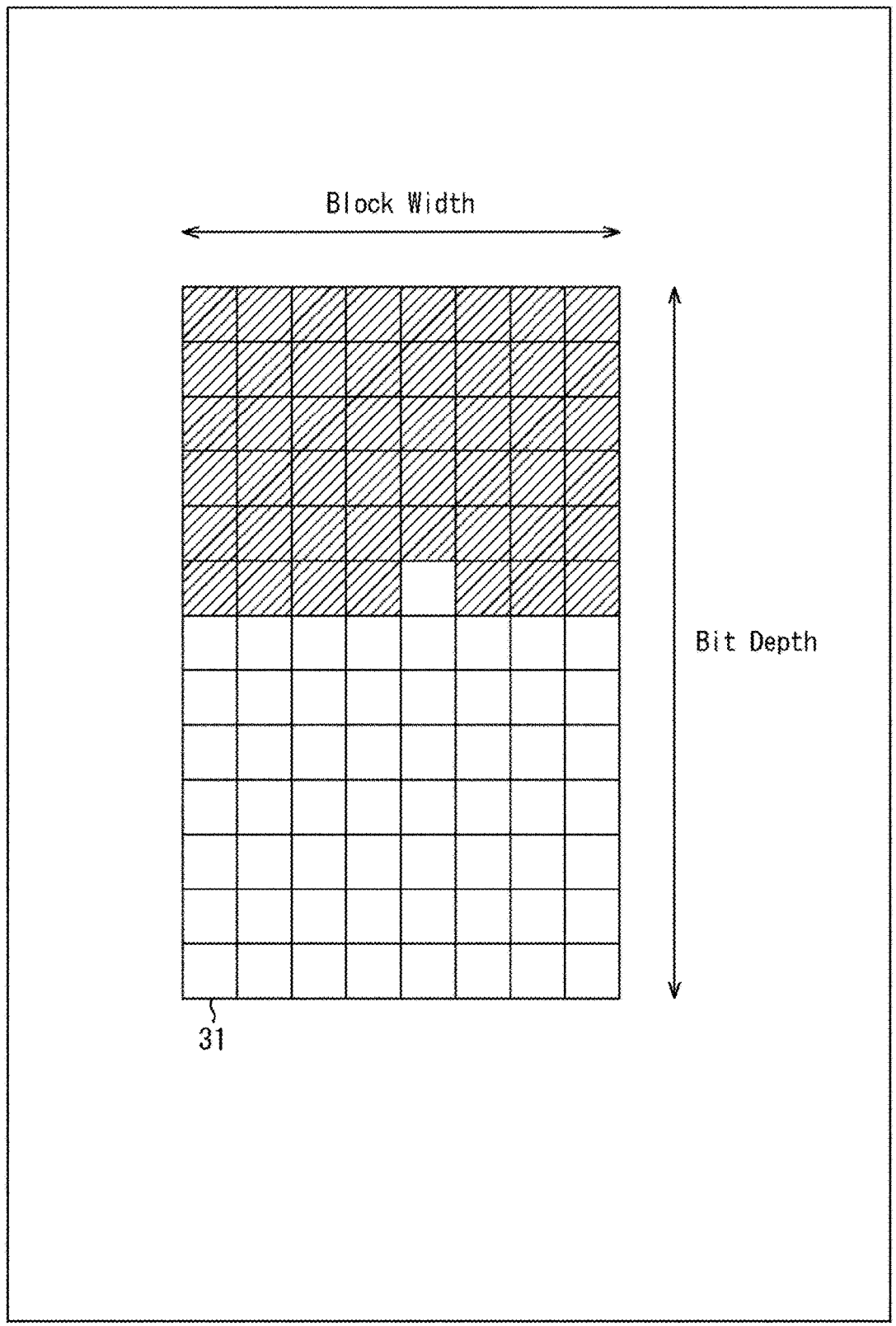
FIG. 2 is a diagram illustrating an example of a data unit.
Figure 8:
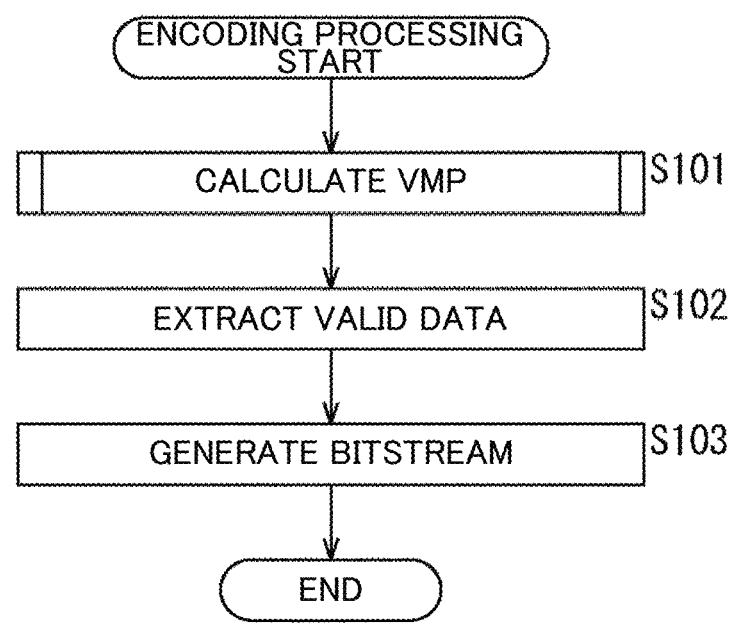
FIG. 8 is a flowchart illustrating an example of the flow of encoding processing.

Of the DPCM mode and the PCM mode, the mode having better encoding efficiency (e.g., the mode having greater bit coverage) is selected and applied, for example. In other words, the PCM mode is selected for blocks (also called "data units") which have low correlation and are not effective in DPCM. For example, assume a data unit 31, such as that illustrated in FIG. 2, is supplied as the input data. In the drawing, each square represents a bit, and one column in the vertical direction represents a bit string for one sample. In other words, the data unit 31 illustrated in FIG. 8 is constituted by data for eight samples, and the bit depth (bit length) for one sample is 13 bits. As described above, in the PCM mode, the input data is output as a bitstream without encoding. For example, for 6 bps (bit per sample), in the figure, the less significant bits indicated by the white squares are quantized, and the most significant six bits indicated by the hatched squares are output as the bitstream.

<Input Data>

As the dynamic ranges of sensors increase, a state where the local dynamic range of the actual data is smaller than the dynamic range of the data format can often occur. Consider a case where such data is the input data for the encoding device 10.

If the binary type (representation method) of the input data is straight binary and the dynamic range thereof is relatively small (close to zero), the bits on the most significant bit (MSB) side are often 0, as in a data unit 41 illustrated in FIG. 3, for example. In the example in FIG. 3, the value of all the bits is 0 in the part of the data unit 41 indicated by gray. With such input data, a large number of bit strings of "0" are transmitted in the PCM mode, resulting in a corresponding degree of wastefulness.

Meanwhile, if, for example, the binary type of the input data is two's complement binary, as in an Indirect Time of Flight (iToF) I/Q signal, and the dynamic range thereof is relatively small (close to zero), the bits on the MSB side are often 0 for a positive number and 1 for a negative number, as in a data unit 42 illustrated in FIG. 3, for example. In the example in FIG. 3, the part of the data unit 42 indicated by gray is constituted by samples for which the value of all the bits is 0 and samples for which the value of all the bits is 1. With such input data, a large number of identical bit strings are transmitted in the PCM mode, resulting in a corresponding degree of wastefulness.

In other words, in the PCM mode, there is a risk that, depending on the input data, the encoding efficiency will drop.

<2. VMP-Applied PCM Mode>

Accordingly, information indicating a valid most significant bit position (VMP), and PCM data below the VMP for each sample, are transmitted for the data unit, as indicated in the uppermost row of the table in FIG. 4 (Method 1).

The data unit is a unit of encoding processing, constituted by a plurality of samples. "Valid most significant bit position" refers to the position of the most significant bit among the bits having a value different from the bit pattern according to the binary type of the samples in the data unit.

For example, the information processing device includes: a valid most significant bit position detection unit that detects a valid most significant bit position in a data unit constituted by a plurality of samples, the valid most significant bit position being a position of a most significant bit among bits having a value different from a bit pattern according to a binary type; a valid data extraction unit that extracts a bit string below the valid most significant bit position as valid data from the samples; and a bitstream generation unit that generates a bitstream including information indicating the valid most significant bit position and the valid data of each of the samples.

Additionally, an information processing method includes: detecting a valid most significant bit position in a data unit constituted by a plurality of samples, the valid most significant bit position being a position of a most significant bit among bits having a value different from a bit pattern according to a binary type; extracting a bit string below the valid most significant bit position as valid data from the samples; and generating a bitstream including (i) information indicating the valid most significant bit position and (ii) the valid data of each of the samples.

Additionally, an information processing device includes: an extraction unit that extracts, from a bitstream, (i) information indicating a valid most significant bit position in a data unit constituted by a plurality of samples, the valid most significant bit position being the most significant bit position among the bits having a value different from the bit pattern according to the binary type, and (ii) valid data that is a bit string below the valid most significant bit position in each of the samples; an invalid data generation unit that generates invalid data that is above the valid most significant bit position, the invalid data conforming to the bit pattern; a valid data alignment unit that aligns the valid data to make the valid data a bit string below the valid most significant bit position in the samples; and a data unit generation unit that generates the data unit by coupling the invalid data with the valid data aligned, for each of the samples.

Additionally, an information processing method includes: extracting, from a bitstream, (i) information indicating a valid most significant bit position in a data unit constituted by a plurality of samples, the valid most significant bit position being the most significant bit position among the bits having a value different from the bit pattern according to the binary type, and (ii) valid data that is a bit string below the valid most significant bit position in each of the samples; generating invalid data that is above the valid most significant bit position, the invalid data conforming to the bit pattern; aligning the valid data to make the valid data a bit string below the valid most significant bit position in the samples; and generating the data unit by coupling the invalid data with the valid data aligned, for each of the samples.

Doing so makes it possible to reduce the transmission amount for bits of higher significance than the VMP, which in turn makes it possible to suppress an increase in the code amount more than the PCM mode, which transmits all the bits in the sample. Note that the bits more significant than the VMP have a bit pattern according to the binary type, and can therefore be restored without respect to the valid data. In other words, applying the method described above makes it possible to suppress a drop in the encoding efficiency through a lossless method.

An encoding method for transmitting information indicating the valid most significant bit position and valid data in this manner will also be referred to as a "VMP-applied PCM mode" in the present specification.

When the foregoing Method 1 is applied, each sample may have any binary type, as indicated in the second row from the top of the table in FIG. 4 (Method 1-1).

<2-1. Straight Binary>

When the foregoing Method 1-1 is applied, for example, the binary type of each sample may be straight binary, as indicated in the third row from the top of the table in FIG. 4 (Method 1-1-1).

<Encoding Device>

For example, the binary type may be straight binary, the bit pattern may be constituted only by values of "0", and the valid most significant bit position (VMP) may be the position of the most significant bit among the bits having a value of "1".

Figure 5:
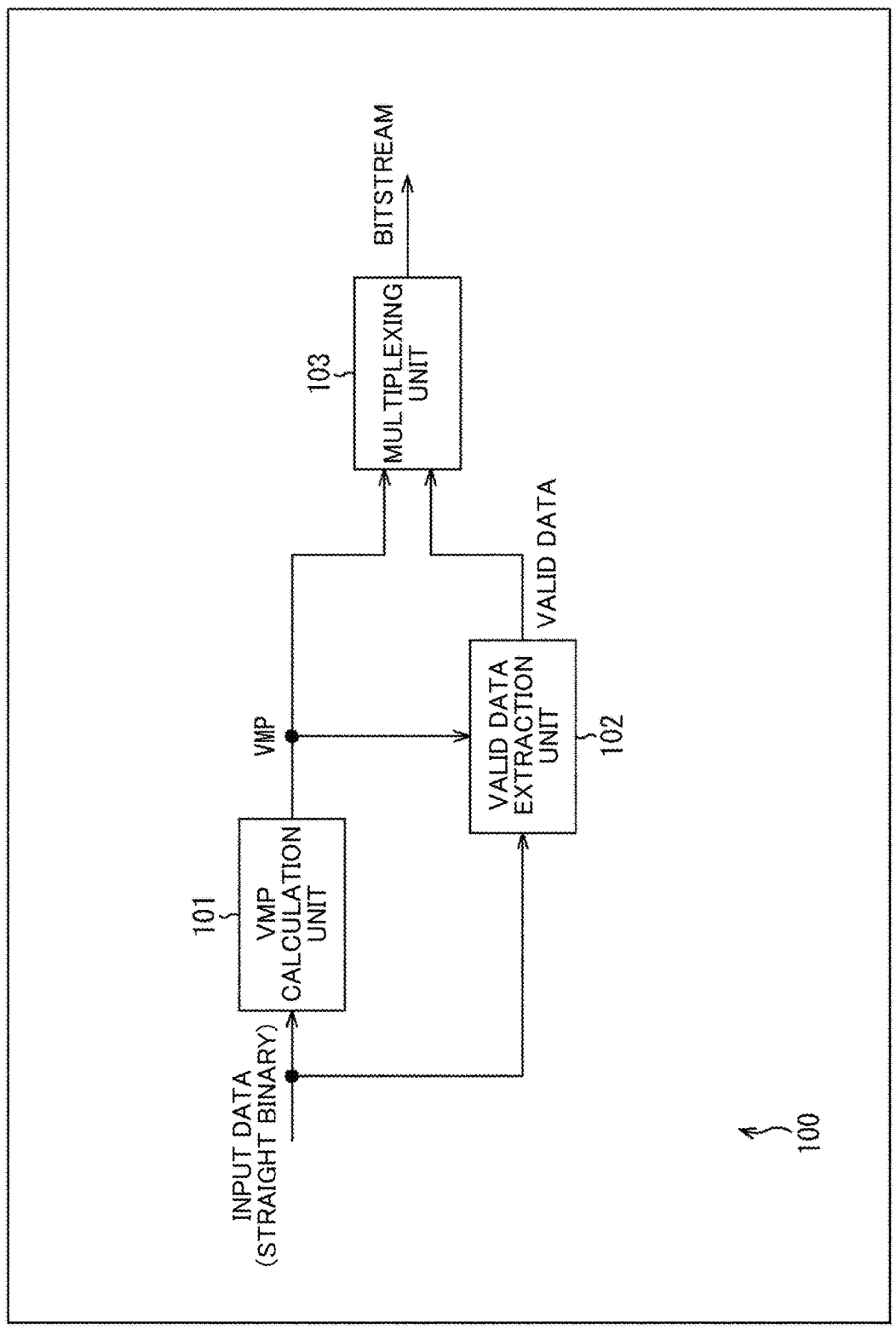
FIG. 5 is a block diagram illustrating an example of the main configuration of an encoding device.

The present technique can be applied in any desired device. For example, the present technique can be applied in an encoding device. FIG. 5 is a block diagram illustrating an example of the configuration of an encoding device serving as one aspect of an information processing device to which the present technique is applied. Note that FIG. 5 illustrates the main processing units, data flows, and the like, and the items illustrated in FIG. 5 are not necessarily all the items. In other words, an encoding device 100 may include processing units not illustrated as blocks in FIG. 5, and processing and data flows not indicated as arrows or the like in FIG. 5.

The encoding device 100 illustrated in FIG. 5 is a device that encodes input data supplied for each of data units, the data unit being a predetermined unit of data constituted by a plurality of samples, and outputs the resulting encoded data as a bitstream. At this time, the encoding device 100 performs the encoding by applying the present technique (Method 1-1-1). In other words, the encoding device 100 encodes input data in straight binary, which is an integer representation without signs (+, −), in the VMP-applied PCM mode.

Figure 6:
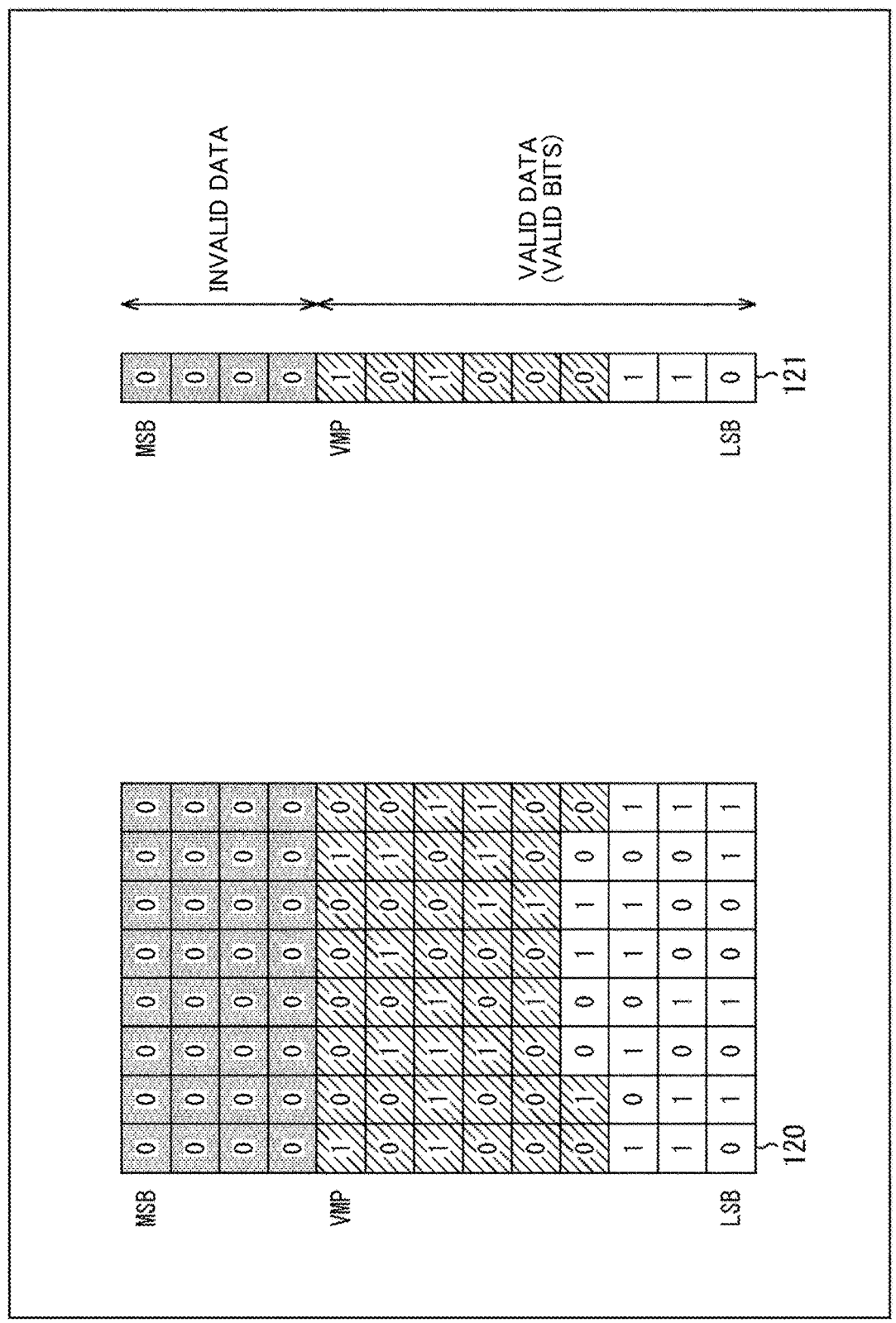
FIG. 6 is a diagram illustrating an example of a straight binary data unit.

A data unit 120 illustrated on the left side of FIG. 6 is an example of the bit structure of one data unit in the input data. In the data unit 120, each square represents a bit, and the number in the square (0 or 1) represents the value of the bit. Additionally, one column in the vertical direction represents a bit string for one sample. In other words, in the figure, the number of squares in the vertical direction represents the bit depth (bit length). The uppermost bit in the figure is the most significant bit (MSB) of the sample. The lowermost bit in the figure is the least significant bit (LSB) of the sample. The number of squares in the horizontal direction in the figure indicates the number of samples included in the data unit 120.

In other words, in the example in FIG. 6, the data unit 120 is constituted by eight samples, each having a bit length of 13 bits. Note that the bit length of the sample and the number of samples constituting the data unit can be determined as desired, and are not limited to this example.

A sample 121 of the data unit 120, located at the left end in the figure, will be used as an example to describe the bit structure of the sample. As illustrated on the right side of FIG. 6, this sample 121 is straight binary of "0000101000110" and represents a decimal value of "326." In the present specification, among the bit strings in the sample 121, the bits constituting the part "101000110", indicating the value "326", will also referred to as "valid bits". The bits constituting the part "0000", which does not indicate the value "326", will also be referred to as "invalid bits".

As in "0000", with straight binary, the bit string of the part that does not constitute the decimal value is constituted only by values of "0". In the present specification, a bit string contiguous with the most significant bit of the sample and having a bit pattern according to the binary type will also be referred to as "invalid data". When focusing only on the sample 121, the above-described bit string "0000" is invalid data.

The value of the most significant bit of the bit string "101000110", which indicates the value of "326", is "1". In other words, the most significant bit among the valid bits has a value different from the bit pattern according to the binary type. In the present specification, the bit string below the most significant bit position among the bits having a value different from the bit pattern according to the binary type will also be referred to as "valid data". When focusing only on the sample 121, the above-described bit string "101000110" is valid data.

In the present specification, the position of the most significant bit among the valid bits is also referred to as the "valid most significant bit position" (VMP). In other words, "VMP" refers to the position of the most significant bit among the bits having a value different from the bit pattern according to the binary type. When focusing only on the sample 121, the bit position of the leftmost value of "1" in the above-described bit string "101000110" (the most significant bit position) is the VMP.

When focusing on the data unit 120, the VMP indicates the position of the most significant bit among the valid bits of all the samples. In other words, the position of the most significant bit among the valid bits of each sample in a data unit constituted by a plurality of samples is also referred to as the "valid most significant bit position" (VMP).

In other words, focusing on the data unit 120, the VMP refers to the position of the most significant bit among the bits having a value different from the bit pattern according to the binary type, in all the samples. That is, the position of the most significant bit among the bits having a value different from the bit pattern according to the binary type, in a data unit constituted by a plurality of samples, is also referred to as the "valid most significant bit position" (VMP).

In the data unit 120 in FIG. 6, a single bit string in the horizontal direction in the figure indicates a bit plane constituted by bits which are in the same bit positions as each other. If the bit plane is constituted by invalid bits, each bit in the bit plane has a value according to a bit pattern corresponding to the binary type. In other words, if the bit plane includes valid bits, the values are different from the bit pattern corresponding to the binary type. Accordingly, the most significant bit plane position among the bit plane in which at least one bit has a value different from the bit pattern according to the binary type, in a data unit constituted by a plurality of samples, is also referred to as the "valid most significant bit position" (VMP).

Focusing on the data unit 120, the valid data corresponds to a bit string below the position of the most significant bit among the bits having a value different from the bit pattern according to the binary type, of all the samples. Additionally, the invalid data corresponds to a bit string contiguous with the most significant bit of the sample and having a bit pattern according to the binary type, for all the samples.

In other words, "valid data" refers to a bit string below the valid most significant bit position (VMP). "Invalid data" refers to a bit string above the valid most significant bit position (VMP). The sample is constituted by the valid data and the invalid data.

With the data unit 120 in FIG. 6, the fifth bit from the MSB is at the VMP, the part indicated by gray is the invalid data, and the part indicated by hatching and white is the valid data. Depending on the sample, the valid data can include valid bits as well as invalid bits. For example, the most significant bit of the valid data in the second sample from the left has a value of "0" and is included in a bit pattern contiguous from the MSB according to straight binary, and is therefore an invalid bit. In the case of straight binary, the invalid data is constituted only by invalid bits.

Returning to FIG. 5, the encoding device 100 to which input data having such a configuration (the straight binary input data) is supplied includes a VMP calculation unit 101, a valid data extraction unit 102, and a multiplexing unit 103. The input data to be encoded is supplied to the VMP calculation unit 101 and the valid data extraction unit 102 for each data unit.

The VMP calculation unit 101 obtains the valid most significant bit position (VMP) for the supplied input data. In other words, the VMP calculation unit 101 detects the valid most significant bit position (VMP), which is the position of the most significant bit among the bits having a value different from the bit pattern according to the binary type, in a data unit constituted by a plurality of samples. The VMP calculation unit 101 can therefore also be called a "valid most significant bit position detection unit". Since the input data is straight binary, the VMP calculation unit 101 searches for a bit having the most significant value of "1" in the data unit, and takes that bit position as the VMP. The VMP calculation unit 101 supplies information indicating the detected VMP to the valid data extraction unit 102 and the multiplexing unit 103.

The valid data extraction unit 102 extracts the bit string below the VMP from each sample of the input data as the valid data, based on the information supplied by the VMP calculation unit 101. The valid data extraction unit 102 supplies the extracted valid data to the multiplexing unit 103.

The multiplexing unit 103 generates a bitstream including (i) information indicating the valid most significant bit position and (ii) the valid data of each sample by multiplexing the information indicating the VMP supplied by the VMP calculation unit 101 and the valid data supplied by the valid data extraction unit 102. In other words, the multiplexing unit 103 generates a bitstream of encoded data obtained by encoding the straight binary input data in the VMP-applied PCM mode. The multiplexing unit 103 can therefore also be called a "bitstream generation unit". The multiplexing unit 103 outputs the generated bitstream to the exterior of the encoding device 100.

Figure 7:
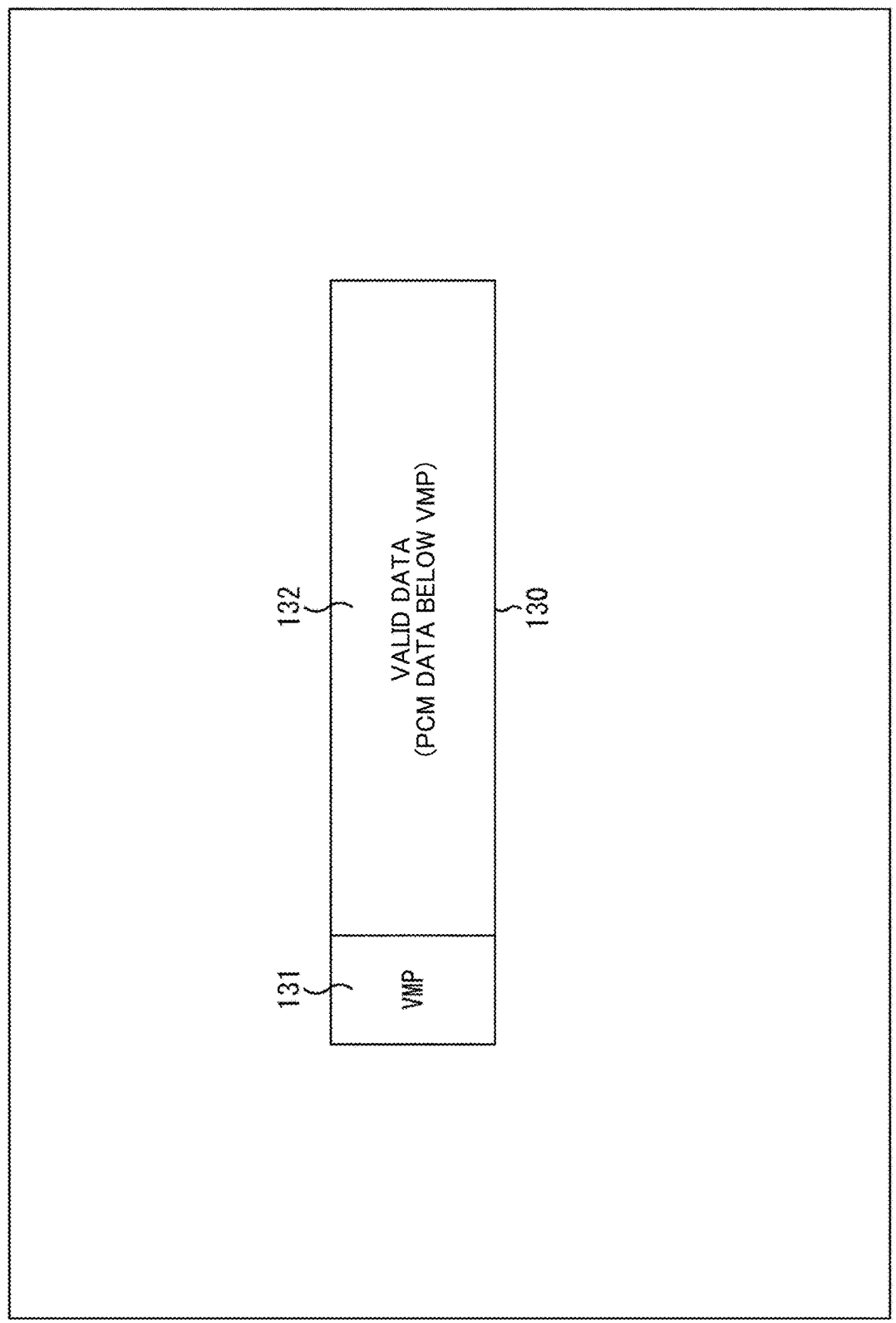
FIG. 7 is a diagram illustrating an example of the main configuration of a straight binary bitstream.

FIG. 7 is a diagram illustrating an example of the main configuration of the bitstream. A bitstream 130 illustrated in FIG. 7 is a bitstream of encoded data, generated by the multiplexing unit 103, in which the input data is encoded in the VMP-applied PCM mode. As illustrated in FIG. 7, the bitstream 130 includes a VMP 131 and valid data 132. The VMP 131 is information indicating the VMP in the data unit to be processed. The valid data 132 is the valid data of each sample that constitutes that data unit. In other words, the valid data 132 is constituted by a bit string (PCM data) below the VMP indicated by the VMP 131, for each sample.

In this manner, the encoding device 100 makes it possible to skip the transmission of invalid data by encoding the straight binary input data in the VMP-applied PCM mode. Accordingly, the encoding device 100 can suppress a drop in encoding efficiency more than when encoding all bits of each sample in the PCM mode. As described above, the invalid data has a bit pattern according to the binary type, and can therefore be restored without respect to the valid data. In other words, the encoding device 100 can suppress a drop in the encoding efficiency through a lossless method.

Note that the encoding device 100 may quantize the valid data extracted by the valid data extraction unit 102. In this case, the encoding is lossy. For example, in the data unit 120 illustrated in FIG. 6, quantizing the valid data may result in the bit part indicated by white not being transmitted. In this case, the bits indicated by the hatching are transmitted as valid data. Doing so makes it possible for the encoding device 100 to further suppress a drop in the encoding efficiency.

<Flow of Encoding Processing>

An example of the flow of encoding processing executed by the encoding device 100 will be described with reference to the flowchart in FIG. 8.

When the encoding processing starts, in step S101 of FIG. 8, the VMP calculation unit 101 calculates the valid most significant bit position (VMP) of the straight binary input data.

In step S102, the valid data extraction unit 102 extracts valid data (the bit string below the VMP) from the input data based on the VMP calculated in step S101.

In step S103, the multiplexing unit 103 generates a bitstream including (i) information indicating the VMP calculated in step S101 and (ii) the valid data extracted in step S102. The multiplexing unit 103 outputs the generated bitstream to the exterior of the encoding device 100.

Once the processing of step S103 ends, the encoding processing ends. As described above, by executing the encoding processing, the encoding device 100 can suppress a drop in encoding efficiency more than when encoding all bits of each sample in the PCM mode.

<Flow of VMP Calculation Processing>

An example of the flow of the VMP calculation processing executed in step S101 of FIG. 8 will be described with reference to the flowchart in FIG. 9. Note that in this VMP calculation processing, as illustrated in FIG. 10, a parameter indicating the bit position is represented by j, a parameter indicating a sample index is represented by i, and the value of the bit at the bit position j and the sample index i is represented by pel(i, j). For example, the value of a bit at a bit position of 8 and a sample index of 3 is represented by pel(3, 8).

Figure 9:
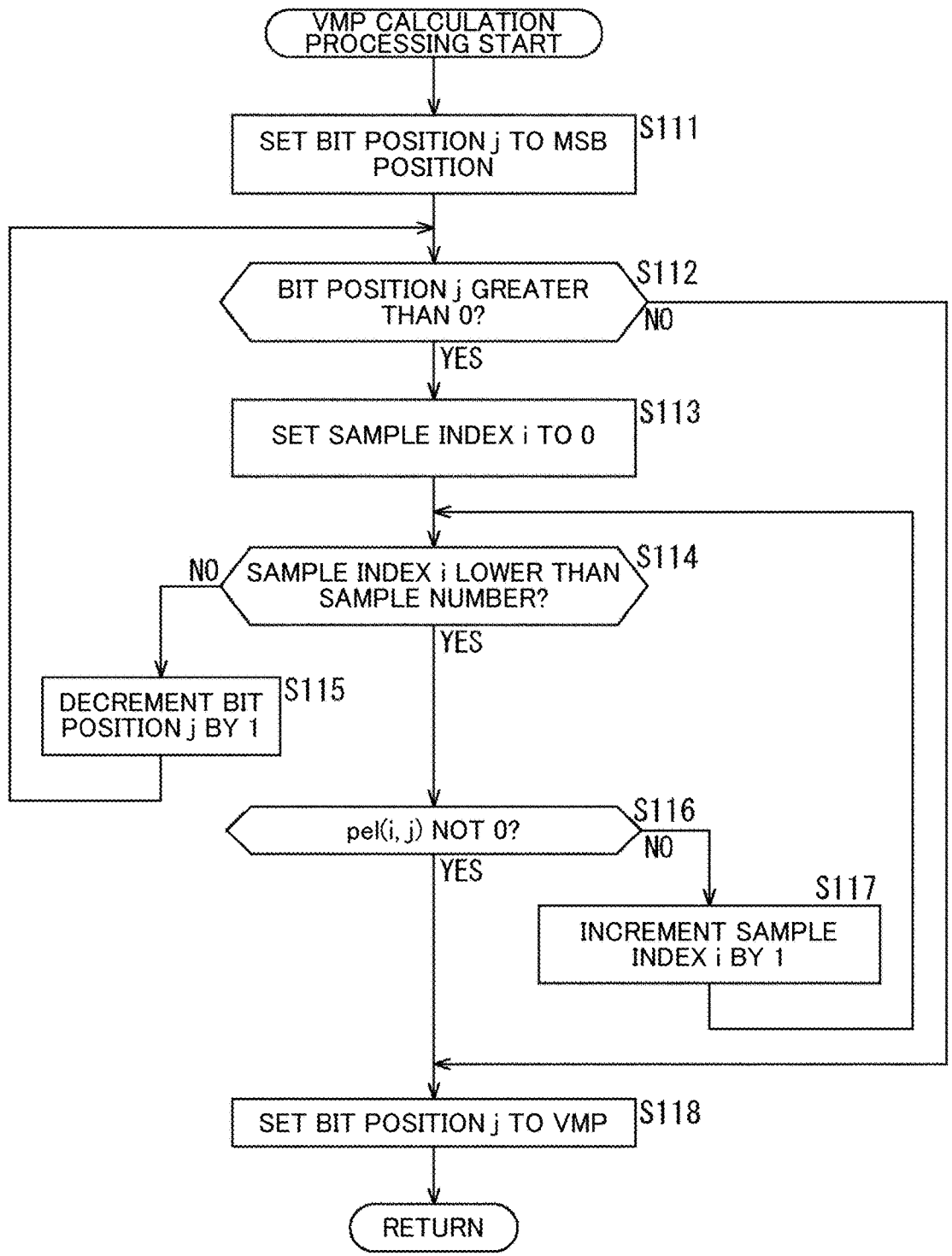
FIG. 9 is a flowchart illustrating an example of the flow of VMP calculation processing.
Figure 10:
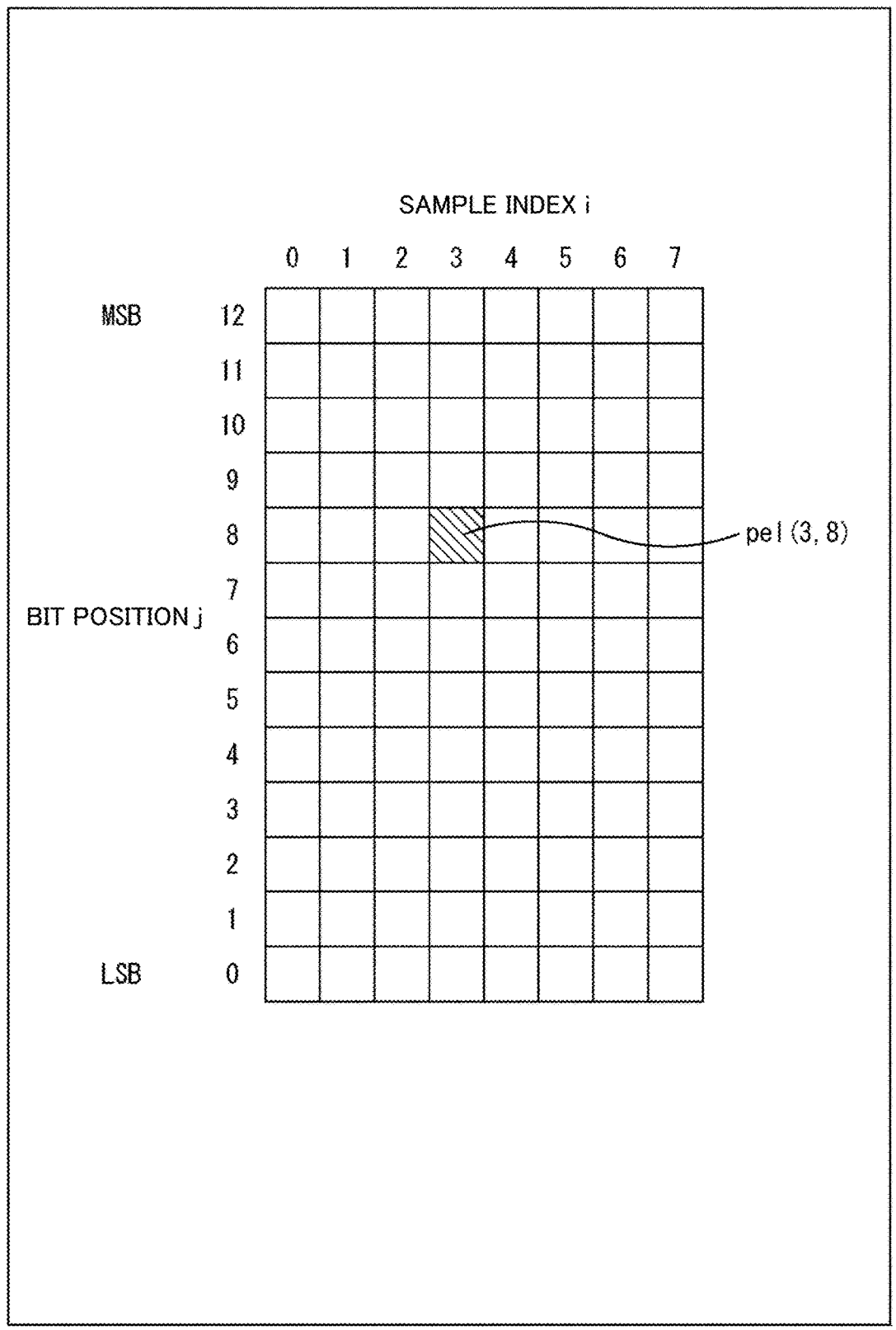
FIG. 10 is a diagram illustrating p (i, j).

When the VMP calculation processing starts, in step S111 of FIG. 9, the VMP calculation unit 101 sets the bit position j to the MSB position of the sample.

In step S112, the VMP calculation unit 101 determines whether the bit position j is greater than 0 (the LSB position of the sample). If the bit position j is determined to be greater than 0, the sequence moves to step S113.

In step S113, the VMP calculation unit 101 sets the sample index i to 0, which is the index of the first sample in the data unit to be processed.

In step S114, the VMP calculation unit 101 determines whether the sample index i is less than the number of samples constituting the data unit to be processed (8, in the case of the data unit 120 in FIG. 6). If it is determined that the sample index i has not reached the stated number of samples (i.e., that there is an unprocessed sample for the bit position j), the sequence moves to step S116.

In step S116, the VMP calculation unit 101 determines whether pel(i, j)=0. If the value of the bit (i, j) to be processed is 0, i.e., if a bit pattern according to the binary type contiguous with the most significant bit is determined to be present, the sequence moves to step S117.

In step S117, the VMP calculation unit 101 increments (+1) the sample index i. The sequence then returns to step S114, and the processing following thereafter is repeated. In other words, by repeating the processing of steps S114, S116, and S117, a bit having a value of "1" (a bit having a value different from the bit pattern according to the binary type) is searched for among all the samples at the bit position j.

In step S116, if it is determined that pel(i, j) is not 0, i.e., if a bit having a value of "1" is found, the sequence moves to step S118.

If in step S114 it is determined that the sample index i has reached the number of samples, i.e., if the search has ended for all samples at the bit position j, the sequence moves to step S115.

In step S115, the VMP calculation unit 101 decrements (−1) the bit position j. The sequence then returns to step S112, and the processing following thereafter is repeated. In other words, by repeating the processing of steps S112 to S115, a bit having a value of "1" (a bit having a value different from the bit pattern according to the binary type) is searched for among all the samples at all bit positions (from the MSB to the LSB).

If in step S112 the bit position j has reached 0, i.e., if the search has ended for all the samples at all the bit positions (from the MSB to the LSB), the sequence moves to step S118.

In step S118, the VMP calculation unit 101 sets the bit position j at that point in time to the valid most significant bit position (VMP).

Once the processing of step S118 ends, the VMP calculation processing ends, and the processing returns to FIG. 8. By executing the VMP calculation processing in this manner, the VMP calculation unit 101 can set the position of the most significant bit among the bits having a value of "1" to the VMP. In other words, in the data unit, the VMP calculation unit 101 can set the position of the most significant bit, among the bits having a value different from the bit pattern according to the binary type, to the VMP. To rephrase, the VMP calculation unit 101 can set the position of the most significant bit among the valid bits of each sample in the data unit to the VMP. To rephrase again, the VMP calculation unit 101 can set the position of the most significant bit plane among the bit plane in which at least one bit has a value different from the bit pattern according to the binary type, in a data unit constituted by a plurality of samples, to the VMP.

<Decoding Device>

For example, the binary type may be straight binary, the bit pattern may be constituted only by values of "0", and the valid most significant bit position (VMP) may be the position of the most significant bit among the bits having a value of "1".

Figure 11:
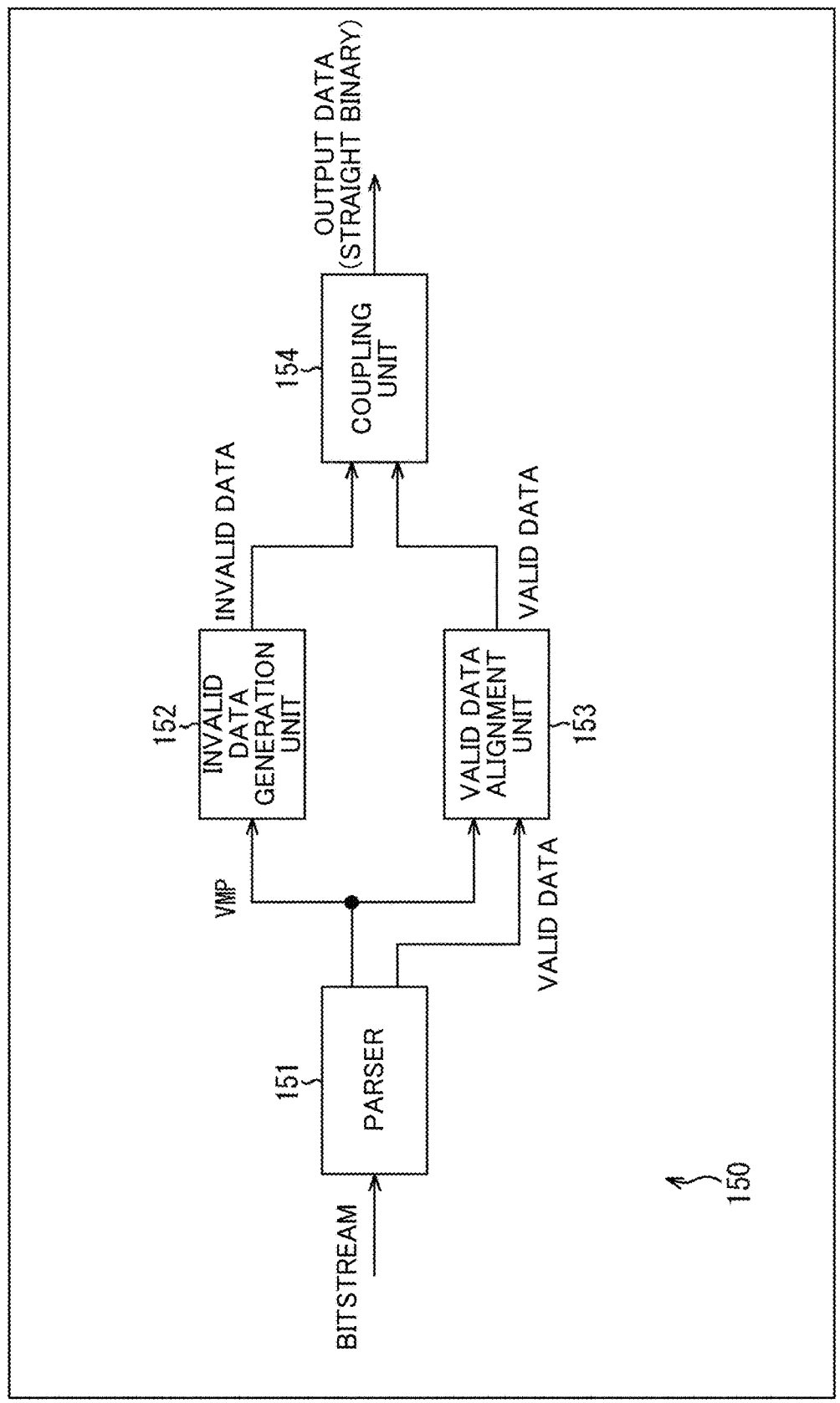
FIG. 11 is a block diagram illustrating an example of the main configuration of a decoding device.

The present technique can be applied in a decoding device. FIG. 11 is a block diagram illustrating an example of the configuration of a decoding device serving as one aspect of an information processing device in which the present technique is applied. Note that FIG. 11 illustrates the main processing units, data flows, and the like, and the items illustrated in FIG. 11 are not necessarily all the items. That is, processing units not illustrated in FIG. 11 as blocks and processing and data flows not illustrated in FIG. 11 as arrows or the like may be present in a decoding device 150.

The decoding device 150 illustrated in FIG. 11 is a device that decodes a bitstream generated by the encoding device 100, restores input data to the state the data was in before being encoded by the encoding device 100, and outputs the input data as output data. At this time, the decoding device 150 performs the decoding by applying the present technique (Method 1-1-1). In other words, the decoding device 150 decodes a bitstream in which straight binary input data has been encoded in the VMP-applied PCM mode.

As illustrated in FIG. 11, the decoding device 150 includes a parser 151, an invalid data generation unit 152, a valid data alignment unit 153, and a coupling unit 154. For example, the bitstream output from the encoding device 100 (a bitstream encoded in the VMP-applied PCM mode) is supplied to the parser 151. The bitstream has a configuration such as that described with reference to FIG. 7.

The parser 151 analyzes the bitstream and extracts (i) information indicating the valid most significant bit position (VMP) and (ii) valid data. In other words, the parser 151 extracts, from the bitstream, (i) information indicating the valid most significant bit position, which is the position of the most significant bit among the bits having a value different from the bit pattern according to the binary type, in a data unit constituted by a plurality of samples, and (ii) valid data, which is a bit string below the valid most significant bit position in each sample. That is, the parser 151 can also be called an "extraction unit". The parser 151 supplies the extracted information indicating the VMP to the invalid data generation unit 152 and the valid data alignment unit 153. The parser 151 also supplies the extracted valid data to the valid data alignment unit 153.

The invalid data generation unit 152 generates invalid data using the information indicating the VMP, supplied from the parser 151. The invalid data is a bit string contiguous with the most significant bit having a bit pattern according to the binary type. Because the bitstream input to the decoding device 150 is a bitstream of encoded data in which straight binary data is encoded, the invalid data generation unit 152 generates the straight binary invalid data. The straight binary invalid data is a bit string higher than the VMP, constituted only by values of "0". In other words, the invalid data generation unit 152 generates a bit string of a bit length (MSB-VMP), constituted only by values of "0". The invalid data generation unit 152 supplies the generated invalid data to the coupling unit 154.

Based on the information indicating the VMP supplied from the parser 151, the valid data alignment unit 153 aligns the valid data so that the valid data supplied from the parser 151 is a bit string below the valid most significant bit position (VMP) of the sample. In other words, the valid data alignment unit 153 aligns the most significant bit of the valid data to the VMP (sets the position of the most significant bit of the valid data to the VMP). The valid data alignment unit 153 supplies the aligned valid data to the coupling unit 154.

The coupling unit 154 generates a straight binary sample by coupling the invalid data supplied from the invalid data generation unit 152 with the aligned valid data supplied from the valid data alignment unit 153. The coupling unit 154 performs the same processing for each sample to generate a straight binary data unit. In other words, the coupling unit 154 can also be called a "data unit generation unit". If the valid data was not quantized at the time of encoding, i.e., if the data was losslessly encoded, the coupling unit 154 can restore the input data that was input to the encoding device 100. The coupling unit 154 outputs the generated straight binary data unit as output data to the exterior of the decoding device 150.

In this manner, the decoding device 150 can correctly decode a bitstream in which straight binary input data has been encoded in the VMP-applied PCM mode. In other words, the transmission of invalid data can be skipped as described above. Accordingly, the decoding device 150 can suppress a drop in encoding efficiency more than when decoding a bitstream in which all bits of each sample have been encoded in the PCM mode. At this time, the invalid data generation unit 152 can restore the invalid data that has not been transmitted, regardless of the valid data. In other words, the decoding device 150 can suppress a drop in the encoding efficiency through a lossless method.

Note that if the valid data has been quantized by the encoding device 100, i.e., if the sample has been lossily encoded by the encoding device 100, the valid data alignment unit 153 fills the missing less significant bits with bits of a predetermined value (e.g., a value of "0") after aligning the most significant bit of the valid data to the VMP. For example, in the data unit 120 in FIG. 6, if the bit part indicated by hatching is transmitted as valid data, the valid data alignment unit 153 fills the bit part indicated by white with bits having a value of "0", for example. Doing so makes it possible for the decoding device 150 to decode a bitstream encoded using a lossy method, which in turn makes it possible to further suppress a drop in encoding efficiency.

<Flow of Decoding Processing>

An example of a flow of the decoding processing executed by the decoding device 150 will be described with reference to the flowchart in FIG. 12.

Figure 12:
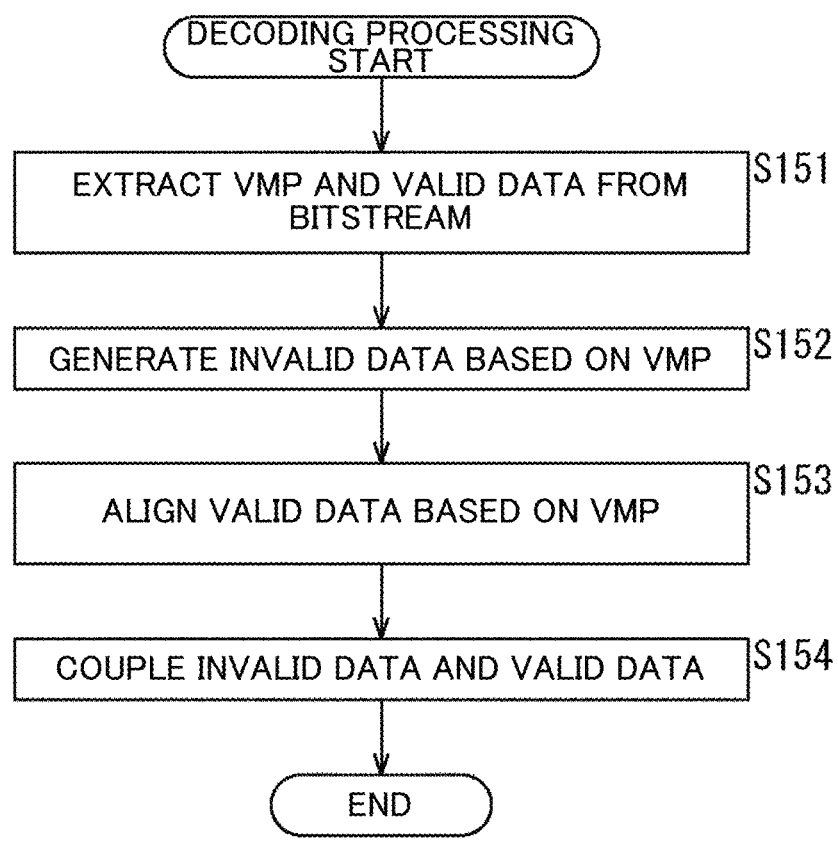
FIG. 12 is a flowchart illustrating an example of the flow of decoding processing.

When the decoding processing starts, in step S151 of FIG. 12, the parser 151 extracts, from the bitstream, (i) information indicating the VMP and (ii) the valid data.

In step S152, the invalid data generation unit 152 generates the invalid data based on the information indicating the VMP extracted in step S151. In other words, the invalid data generation unit 152 generates a bit string which has a bit pattern according to the binary type and which is contiguous with the most significant bit (because this is straight binary, a bit string which is constituted only by values of "0" and which is contiguous with the most significant bit).

In step S153, the valid data alignment unit 153 aligns the valid data extracted in step S151 with the VMP based on the information indicating the VMP extracted in step S151.

In step S154, the coupling unit 154 generates a sample by coupling the invalid data generated in step S152 with the valid data aligned in step S153. The coupling unit 154 performs this coupling for each sample to generate a data unit. The data type of this data unit is straight binary. The coupling unit 154 outputs the generated straight binary data unit to the exterior of the decoding device 150.

Once the processing of step S154 ends, the decoding processing ends. As described above, by executing the decoding processing, the decoding device 150 can suppress a drop in encoding efficiency more than when decoding a bitstream in which all bits of each sample have been encoded in the PCM mode.

<2-2. Two's Complement Binary>

When the foregoing Method 1-1 is applied, for example, the binary type of each sample may be two's complement binary, as indicated in the fourth row from the top of the table in FIG. 4. Additionally, the MSB may be transmitted (Method 1-1-2).

<Encoding Device>

For example, the binary type may be two's complement binary, the bit pattern may be constituted only by values of "0" or only by values of "1", and the valid most significant bit position (VMP) may be the position of the most significant bit among the bits having a value different from the value of the most significant bit of the samples. The most significant bit (MSB) of (each sample in) the data unit may then be transmitted. In other words, the information processing device may further include a most significant bit extraction unit that extracts the most significant bit from each of the samples, and the bitstream generation unit may generate the bitstream further including the most significant bit of each of the samples.

Figure 13:
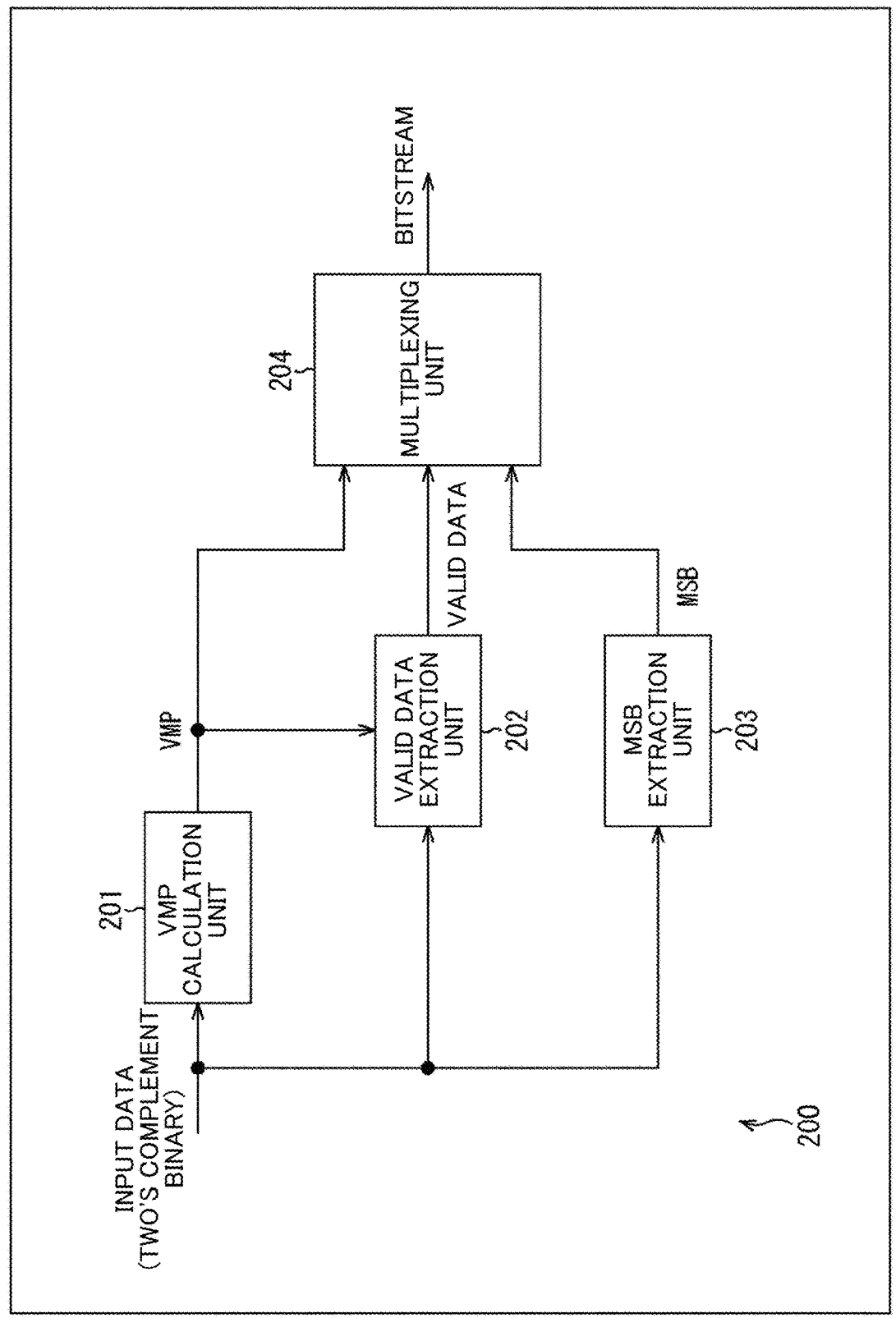
FIG. 13 is a block diagram illustrating an example of the main configuration of an encoding device.

FIG. 13 is a block diagram illustrating an example of the configuration of an encoding device serving as one aspect of an information processing device to which the present technique is applied. Note that FIG. 13 illustrates the main processing units, data flows, and the like, and the items illustrated in FIG. 13 are not necessarily all the items. In other words, an encoding device 200 may include processing units not illustrated as blocks in FIG. 13, and processing and data flows not indicated as arrows or the like in FIG. 13.

The encoding device 200 illustrated in FIG. 13 is a device that encodes input data supplied for each of data units, the data unit being a predetermined unit of data constituted by a plurality of samples, and outputs the resulting encoded data as a bitstream. At this time, the encoding device 200 performs the encoding by applying the present technique (Method 1-1-2). In other words, the encoding device 200 encodes two's complement binary input data, which uses two's complement representation, using the VMP-applied PCM mode.

Figure 14:
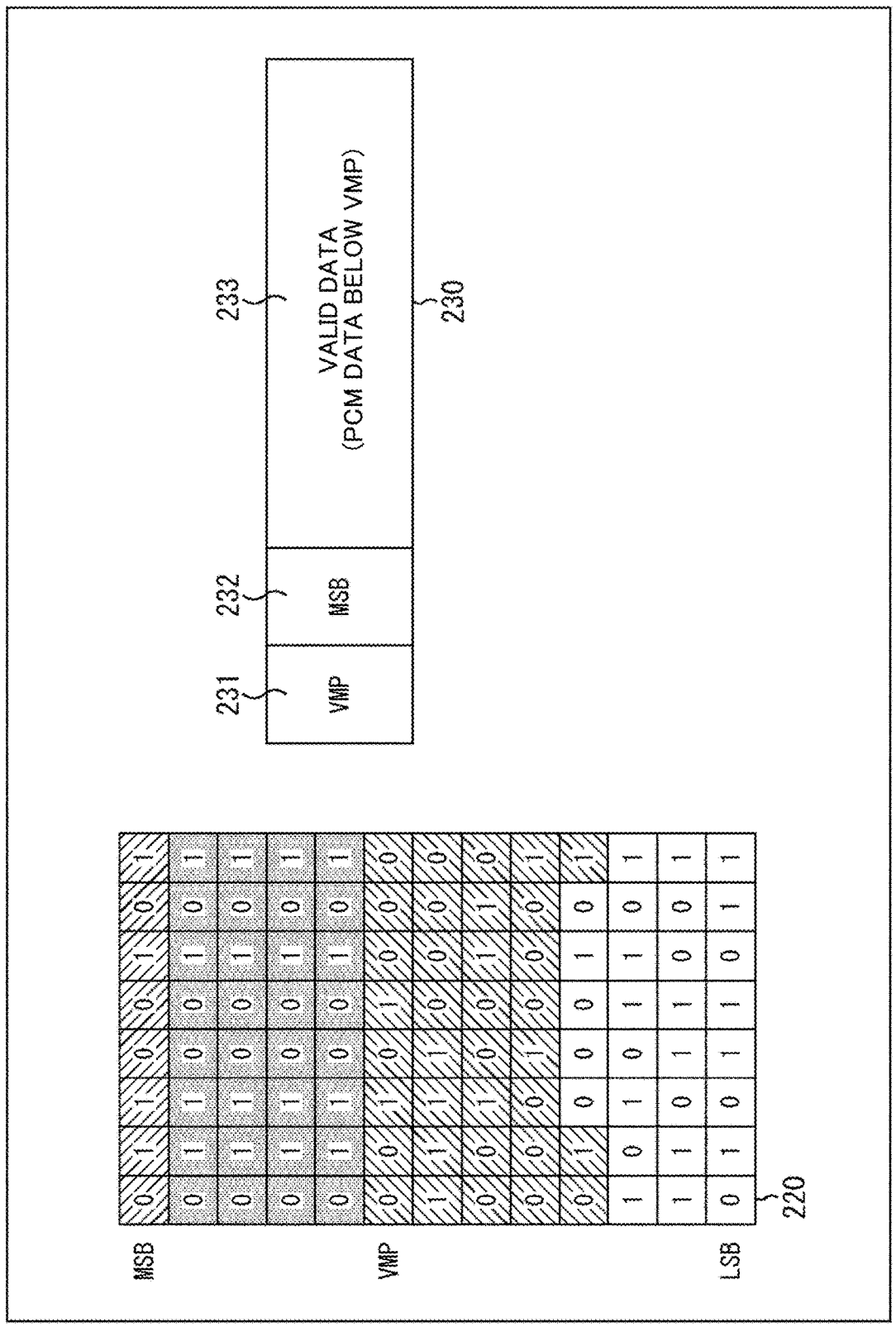
FIG. 14 is a diagram illustrating an example of a two's complement binary data unit and bitstream.

A data unit 220 illustrated on the left side of FIG. 14 is an example of the bit structure of one data unit in the input data. In the data unit 220, each square represents a bit, and the number in the square (0 or 1) represents the value of the bit. Additionally, one column in the vertical direction represents a bit string for one sample. In other words, in the figure, the number of squares in the vertical direction represents the bit depth (bit length). The uppermost bit in the figure is the most significant bit (MSB) of the sample. The lowermost bit in the figure is the least significant bit (LSB) of the sample. The number of squares in the horizontal direction in the figure indicates the number of samples included in the data unit 220.

In other words, in the example in FIG. 14, the data unit 220 is constituted by eight samples, each having a bit length of 13 bits. Note that the bit length of the sample and the number of samples constituting the data unit can be determined as desired, and are not limited to this example.

In the case of two's complement binary, the most significant bit (MSB) of the sample is a sign bit. If the sample has a positive value, the MSB has a value of "0". If the sample has a negative value, the MSB has a value of "1". The bits from the bit one less significant than the MSB to the bit one more significant than the VMP have the same value as the MSB of each sample. In other words, a bit pattern according to two's complement binary is constituted only by values of "0" or only by values of "1". The bits of the invalid data therefore have the same value as the MSB of each sample.

Accordingly, with two's complement binary, the valid most significant bit position (VMP) is the position of the most significant bit among bits having a value different from the value of the most significant bit in that sample. In other words, the position of the most significant bit plane among bit planes in which any bit has a value different from the value of the most significant bit in that sample is set to the VMP.

As in straight binary, the valid data is a bit string below the VMP.

In the data unit 220 illustrated in FIG. 14, the bit plane of the MSB, indicated by the upper-leftward and lower-rightward hatching, is constituted by sign bits. With two's complement binary, the invalid data is constituted by the MSB (sign bit) indicated by the upper-leftward and lower-rightward hatching, and an invalid bit (a bit constituting a part for which no value is indicated) indicated by gray. The invalid bits indicated by gray have the same value as the most significant bit (MSB) of the sample. The sixth bit from the MSB, which, in any one sample, has a value different from the value of the most significant bit in that sample, is the VMP. The bit string below the VMP (indicated by the lower-leftward and upper-rightward hatching and white) is the valid data. As with straight binary, the valid data can include valid bits as well as invalid bits.

Returning to FIG. 13, the encoding device 200 to which input data having such a configuration (the two's complement binary input data) is supplied includes a VMP calculation unit 201, a valid data extraction unit 202, an MSB extraction unit 203, and a multiplexing unit 204. The input data to be encoded is supplied to the VMP calculation unit 201, the valid data extraction unit 202, and the MSB extraction unit 203 for each data unit.

The VMP calculation unit 201 obtains the valid most significant bit position (VMP) for the supplied input data. In other words, the VMP calculation unit 201 detects the valid most significant bit position (VMP), which is the position of the most significant bit among the bits having a value different from the bit pattern according to the binary type, in a data unit constituted by a plurality of samples. The VMP calculation unit 201 can therefore also be called a "valid most significant bit position detection unit". Since the input data is two's complement binary, the VMP calculation unit 201 searches for a bit having a value different from the value of the most significant bit in that sample, having the most significant value in the data unit, and takes that bit position as the VMP. The VMP calculation unit 201 supplies information indicating the detected VMP to the valid data extraction unit 202 and the multiplexing unit 204.

The valid data extraction unit 202 extracts the bit string below the VMP from each sample of the input data as the valid data, based on the information supplied by the VMP calculation unit 201. The valid data extraction unit 202 supplies the extracted valid data to the multiplexing unit 204.

The MSB extraction unit 203 extracts the most significant bit (MSB) of each sample from the supplied input data. Since the input data is two's complement binary, the value of this MSB indicates the sign (+, −) of the sample, as described above. If the sample has a positive value, the MSB has a value of "0". If the sample has a negative value, the MSB has a value of "1". The MSB extraction unit 203 supplies the bit plane of the extracted MSB to the multiplexing unit 204.

The multiplexing unit 204 generates a bitstream including (i) information indicating the valid most significant bit position, (ii) the valid data of each sample, and (iii) the MSB of each sample by multiplexing the information indicating the VMP supplied by the VMP calculation unit 201, the valid data supplied by the valid data extraction unit 202, and the bit plane of the MSB (the MSB of each sample) supplied by the MSB extraction unit 203. In other words, the multiplexing unit 204 generates a bitstream of encoded data obtained by encoding the two's complement binary input data in the VMP-applied PCM mode. The multiplexing unit 204 can therefore also be called a "bitstream generation unit". The multiplexing unit 204 outputs the generated bitstream to the exterior of the encoding device 200.

A bitstream 230 illustrated in FIG. 14 is a bitstream of encoded data, generated by the multiplexing unit 204, in which the two's complement binary input data is encoded in the VMP-applied PCM mode. As illustrated in FIG. 14, the bitstream 230 includes a VMP 231, an MSB 232, and valid data 233. The VMP 231 is information indicating the VMP in the data unit to be processed. The MSB 232 is the MSB of each sample of the data unit to be processed (i.e., the bit plane of the MSB). The valid data 233 is the valid data of each sample that constitutes that data unit. In other words, the valid data 233 is constituted by a bit string (PCM data) below the VMP indicated by the VMP 231, for each sample.

In this manner, the encoding device 200 makes it possible to suppress the transmission of invalid data (reduce the transmission amount for invalid data) by encoding the two's complement binary input data in the VMP-applied PCM mode. Accordingly, the encoding device 200 can suppress a drop in encoding efficiency more than when encoding all bits of each sample in the PCM mode. As described above, the invalid data has a bit pattern according to the binary type, and can therefore be restored without respect to the valid data. In other words, the encoding device 200 can suppress a drop in the encoding efficiency through a lossless method.

Note that the encoding device 200 may quantize the valid data extracted by the valid data extraction unit 202. In this case, the encoding is lossy. For example, in the data unit 220 illustrated in FIG. 14, quantizing the valid data may result in the bit part indicated by white not being transmitted. In this case, the bits indicated by the hatching are transmitted as valid data. Doing so makes it possible for the encoding device 200 to further suppress a drop in the encoding efficiency.

<Flow of Encoding Processing>

An example of the flow of encoding processing executed by the encoding device 200 will be described with reference to the flowchart in FIG. 15.

Figure 15:
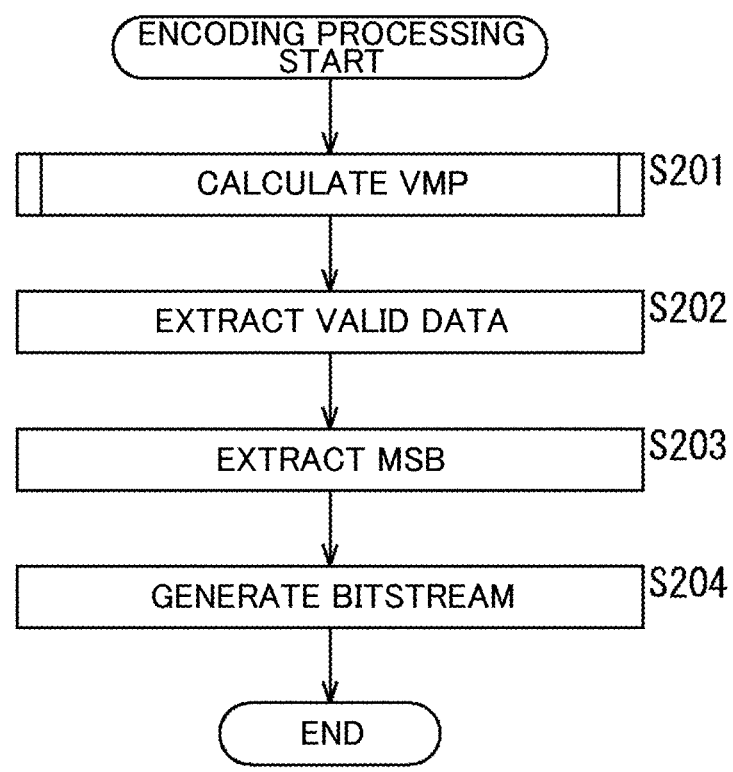
FIG. 15 is a flowchart illustrating an example of the flow of encoding processing.

When the encoding processing starts, in step S201 of FIG. 15, the VMP calculation unit 201 calculates the valid most significant bit position (VMP) of the two's complement binary input data.

In step S202, the valid data extraction unit 202 extracts valid data (the bit string below the VMP) from the input data based on the VMP calculated in step S201.

In step S203, the MSB extraction unit 203 extracts the MSB of each sample (the bit plane of the MSB).

In step S204, the multiplexing unit 204 generates a bitstream including (i) information indicating the VMP calculated in step S201, (ii) the valid data extracted in step S202, and (iii) the bit plane of the MSB extracted in step S203. The multiplexing unit 204 outputs the generated bitstream to the exterior of the encoding device 200.

When the processing of step S204 ends, the encoding processing ends. As described above, by executing the encoding processing, the encoding device 200 can suppress a drop in encoding efficiency more than when encoding all bits of each sample in the PCM mode.

<Flow of VMP Calculation Processing>

An example of the flow of the VMP calculation processing executed in step S201 of FIG. 15 will be described with reference to the flowchart in FIG. 16. Note that in this VMP calculation processing, the bit position j, the sample index i, and pel(i, j) are the same as those described with reference to FIG. 10.

Figure 16:
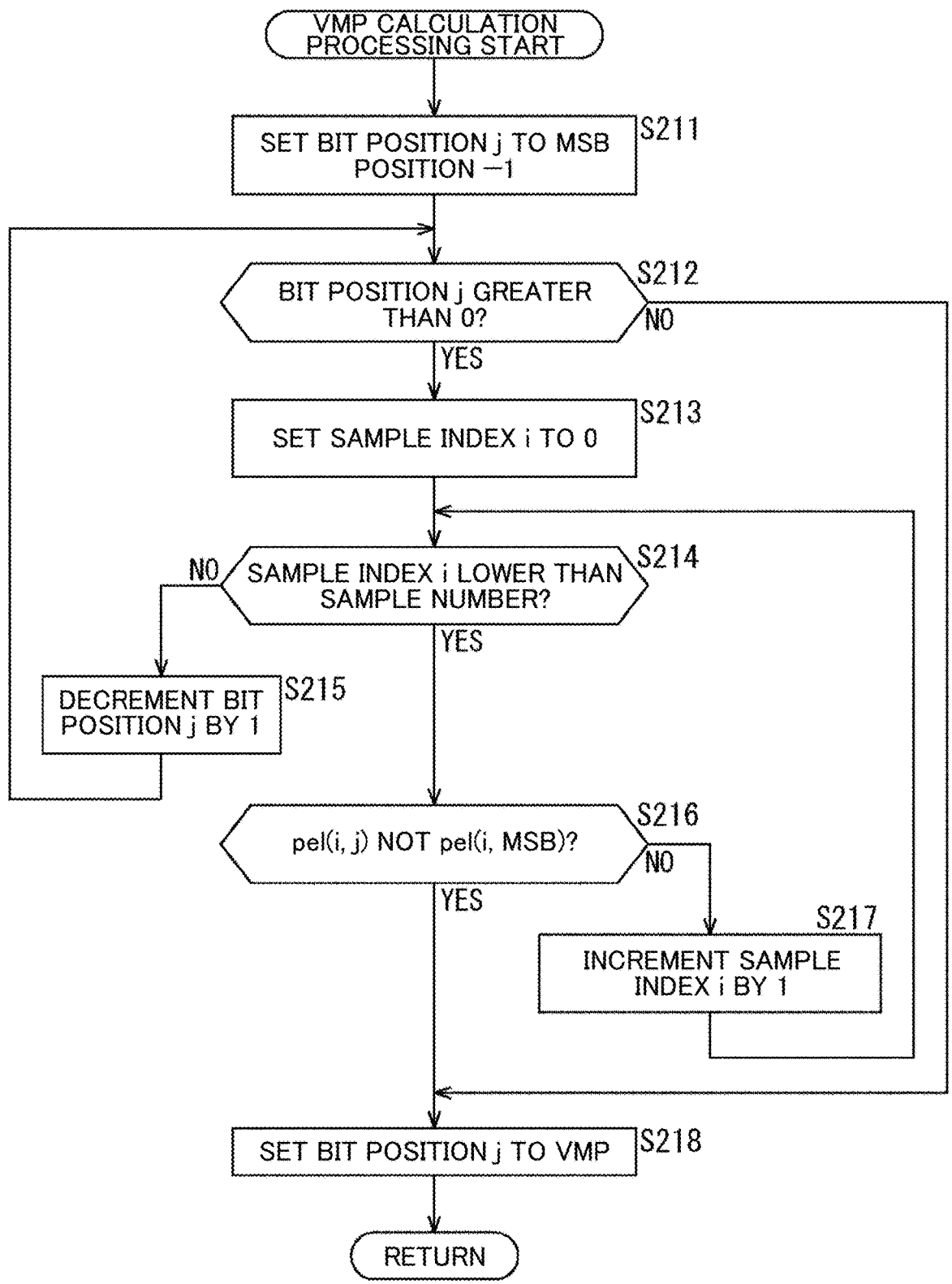
FIG. 16 is a flowchart illustrating an example of the flow of VMP calculation processing.

When the VMP calculation processing starts, in step S211 of FIG. 16, the VMP calculation unit 201 sets the bit position j to (the MSB position of the sample−1).

In step S212, the VMP calculation unit 201 determines whether the bit position j is greater than 0 (the LSB position of the sample). If the bit position j is determined to be greater than 0, the sequence moves to step S213.

In step S213, the VMP calculation unit 201 sets the sample index i to 0, which is the index of the first sample in the data unit to be processed.

In step S214, the VMP calculation unit 201 determines whether the sample index i is less than the number of samples constituting the data unit to be processed (8, in the case of the data unit 220 in FIG. 14). If it is determined that the sample index i has not reached the stated number of samples (i.e., that there is an unprocessed sample for the bit position j), the sequence moves to step S216.

In step S216, the VMP calculation unit 201 determines whether pel(i, j) is not equal to pel(i, MSB). pel(i, j)=pel(i, MSB) indicates that the value of the bit (i, j) being processed is the same as the value pel(i, MSB) of the most significant bit in the sample. In other words, in step S216, a bit having a value different from the most significant bit of the sample is searched for. If the value of the bit (i, j) being processed is the same as the most significant bit of the sample, i.e., if the bit (i, j) being processed has a value corresponding to the bit pattern according to the binary type, contiguous with the most significant bit, the bit (i, j) being processed is a bit constituting invalid data. If the bit (i, j) being processed is determined to be a bit constituting invalid data, the sequence moves to step S217.

In step S217, the VMP calculation unit 201 increments (+1) the sample index i. The sequence then returns to step S214, and the processing following thereafter is repeated. In other words, by repeating the processing of steps S214, S216, and S217, a bit having a value different from the most significant bit of the sample (a bit having a value different from the bit pattern according to the binary type) is searched for among all the samples at the bit position j.

If in step S216 it is determined that pel(i, j) is not equal to pel(i, MSB), i.e., if a bit having a value different from the most significant bit of the sample is found, the sequence moves to step S218.

If in step S214 it is determined that the sample index i has reached the number of samples, i.e., if the search has ended for all samples at the bit position j, the sequence moves to step S215.

In step S215, the VMP calculation unit 201 decrements (−1) the bit position j. The sequence then returns to step S212, and the processing following thereafter is repeated. In other words, by repeating the processing of steps S212 to S215, a bit having a value different from the most significant bit of the sample (a bit having a value different from the bit pattern according to the binary type) is searched for among all the samples (from the MSB to the LSB) at all bit positions.

If in step S212 the bit position j has reached 0, i.e., if the search has ended for all the samples at all the bit positions (from the MSB to the LSB), the sequence moves to step S218.

In step S218, the VMP calculation unit 201 sets the bit position j at that point in time to the valid most significant bit position (VMP).

Once the processing of step S218 ends, the VMP calculation processing ends, and the processing returns to FIG. 15. By executing the VMP calculation processing in this manner, the VMP calculation unit 201 can set the position of the most significant bit among the bits having a value different from the most significant bit of the sample to the VMP. In other words, in the data unit, the VMP calculation unit 201 can set the position of the most significant bit, among the bits having a value different from the bit pattern according to the binary type, to the VMP. To rephrase, the VMP calculation unit 201 can set the position of the most significant bit among the valid bits of each sample in the data unit to the VMP. To rephrase again, the VMP calculation unit 201 can set the position of the most significant bit plane among the bit plane in which at least one bit has a value different from the bit pattern according to the binary type, in a data unit constituted by a plurality of samples, to the VMP.

<Decoding Device>

For example, the binary type may be two's complement binary, the bit pattern may be constituted only by values of "0" or only by values of "1", and the valid most significant bit position (VMP) may be the position of the most significant bit among the bits having a value different from the value of the most significant bit of the samples. The most significant bit (MSB) of (each sample in) the data unit may then be transmitted. In other words, the extraction unit may further extract the most significant bit of the sample from the bitstream, and the invalid data generation unit may generate the invalid data using the most significant bit of the sample.

Figure 17:
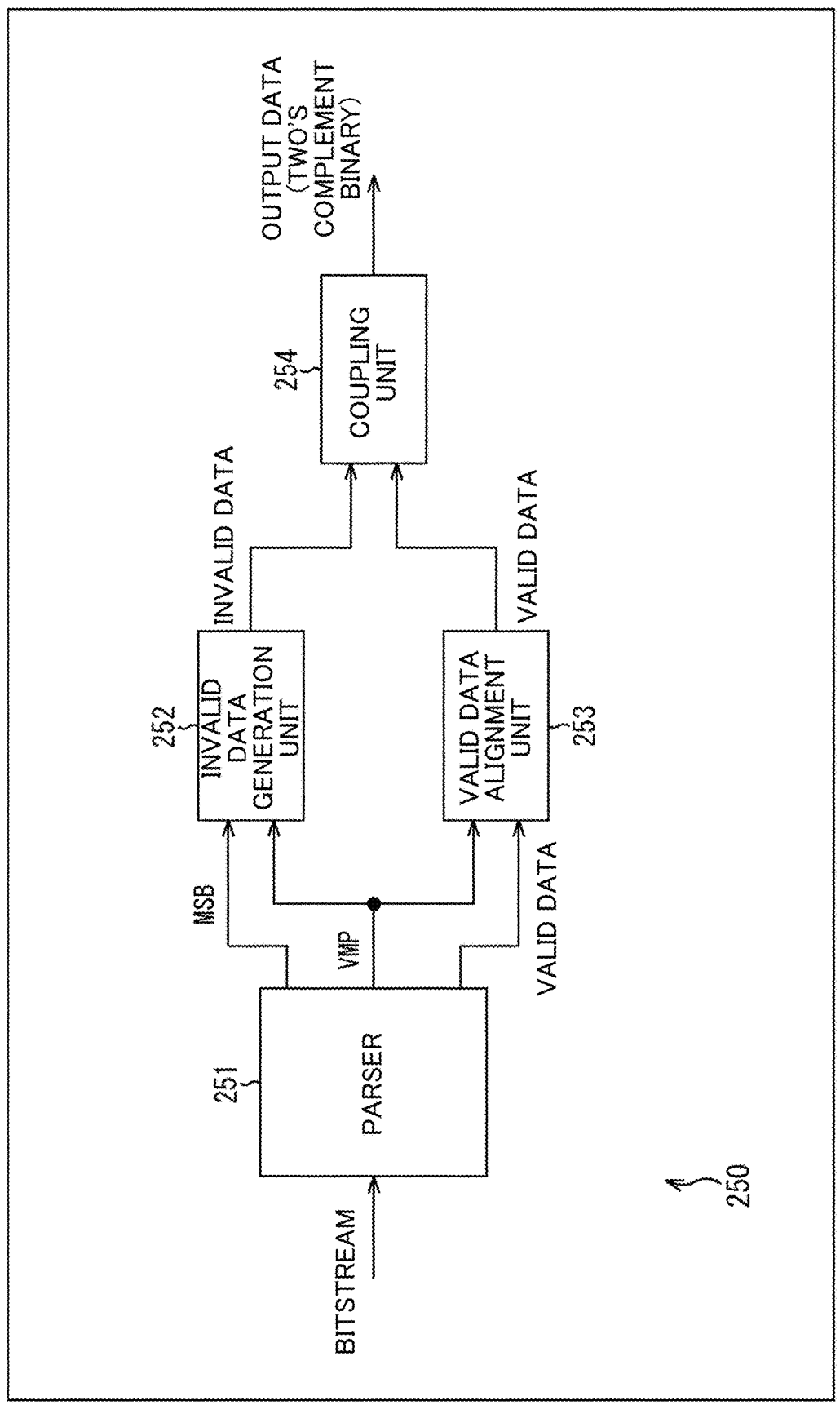
FIG. 17 is a block diagram illustrating an example of the main configuration of a decoding device.

The present technique can be applied in a decoding device. FIG. 17 is a block diagram illustrating an example of the configuration of a decoding device serving as one aspect of an information processing device in which the present technique is applied. Note that FIG. 17 illustrates the main processing units, data flows, and the like, and the items illustrated in FIG. 17 are not necessarily all the items. That is, processing units not illustrated in FIG. 17 as blocks and processing and data flows not illustrated in FIG. 17 as arrows or the like may be present in a decoding device 250.

The decoding device 250 illustrated in FIG. 17 is a device that decodes a bitstream generated by the encoding device 200, restores input data to the state the data was in before being encoded by the encoding device 200, and outputs the input data as output data. At this time, the decoding device 250 performs the decoding by applying the present technique (Method 1-1-2). In other words, the decoding device 250 decodes a bitstream in which two's complement binary input data has been encoded in the VMP-applied PCM mode.

As illustrated in FIG. 17, the decoding device 250 includes a parser 251, an invalid data generation unit 252, a valid data alignment unit 253, and a coupling unit 254. For example, the bitstream output from the encoding device 200 (a bitstream encoded in the VMP-applied PCM mode) is supplied to the parser 251. The bitstream has a configuration such as that described with reference to FIG. 14.

The parser 251 analyzes the bitstream and extracts (i) information indicating the valid most significant bit position (VMP), (ii) the bit plane of the MSB, and (iii) valid data. In other words, the parser 251 extracts, from the bitstream, (i)

information indicating the valid most significant bit position, which is the position of the most significant bit among the bits having a value different from the bit pattern according to the binary type, in a data unit constituted by a plurality of samples, (ii) the most significant bit (MSB) of each sample, and (iii) valid data, which is a bit string below the valid most significant bit position in each sample. That is, the parser 251 can also be called an "extraction unit". The parser 251 supplies the extracted information indicating the VMP to the invalid data generation unit 252 and the valid data alignment unit 253. The parser 251 also supplies the extracted bit plane of the MSB to the invalid data generation unit 252. The parser 251 also supplies the extracted valid data to the valid data alignment unit 253.

The invalid data generation unit 252 generates invalid data using the information indicating the VMP, supplied from the parser 251, and the bit plane of the MSB. The invalid data is a bit string contiguous with the most significant bit having a bit pattern according to the binary type. The bitstream input to the decoding device 250 is a bitstream of encoded data in which two's complement binary data is encoded. Accordingly, for each sample, the invalid data generation unit 252 generates, by copying the MSB, a bit string (invalid data) from the MSB to a bit position one bit higher than the VMP, constituted only by values of "0" or only by values of "1". The invalid data generation unit 252 supplies the generated invalid data to the coupling unit 254.

Based on the information indicating the VMP supplied from the parser 251, the valid data alignment unit 253 aligns the valid data so that the valid data supplied from the parser 251 is a bit string below the valid most significant bit position (VMP) of the sample. In other words, the valid data alignment unit 253 aligns the most significant bit of the valid data to the VMP (sets the position of the most significant bit of the valid data to the VMP). The valid data alignment unit 253 supplies the aligned valid data to the coupling unit 254.

The coupling unit 254 generates a two's complement binary sample by coupling the invalid data supplied from the invalid data generation unit 252 with the aligned valid data supplied from the valid data alignment unit 253. The coupling unit 254 performs the same processing for each sample to generate a two's complement binary data unit. In other words, the coupling unit 254 can also be called a "data unit generation unit". If the valid data was not quantized at the time of encoding, i.e., if the data was losslessly encoded, the coupling unit 254 can restore the input data that was input to the encoding device 200. The coupling unit 254 outputs the generated two's complement binary data unit as output data to the exterior of the decoding device 250.

In this manner, the decoding device 250 can correctly decode a bitstream in which two's complement binary input data has been encoded in the VMP-applied PCM mode. In other words, the transmission of invalid data can be suppressed (the transmission amount for invalid data can be reduced) as described above. Accordingly, the decoding device 250 can suppress a drop in encoding efficiency more than when decoding a bitstream in which all bits of each sample have been encoded in the PCM mode. At this time, the invalid data generation unit 252 can restore the invalid data that has not been transmitted, regardless of the valid data. In other words, the decoding device 250 can suppress a drop in the encoding efficiency through a lossless method.

Note that if the valid data has been quantized by the encoding device 200, i.e., if the sample has been lossily encoded by the encoding device 200, the valid data alignment unit 253 fills the missing less significant bits with bits of a predetermined value (e.g., a value of "0") after aligning the most significant bit of the valid data to the VMP. For example, in the data unit 220 in FIG. 14, if the bit part indicated by hatching is transmitted as valid data, the valid data alignment unit 253 fills the bit part indicated by white with bits having a value of "0", for example. Doing so makes it possible for the decoding device 250 to decode a bitstream encoded using a lossy method, which in turn makes it possible to further suppress a drop in encoding efficiency.

<Flow of Decoding Processing>

An example of a flow of the decoding processing executed by the decoding device 250 will be described with reference to the flowchart in FIG. 18.

Figure 18:
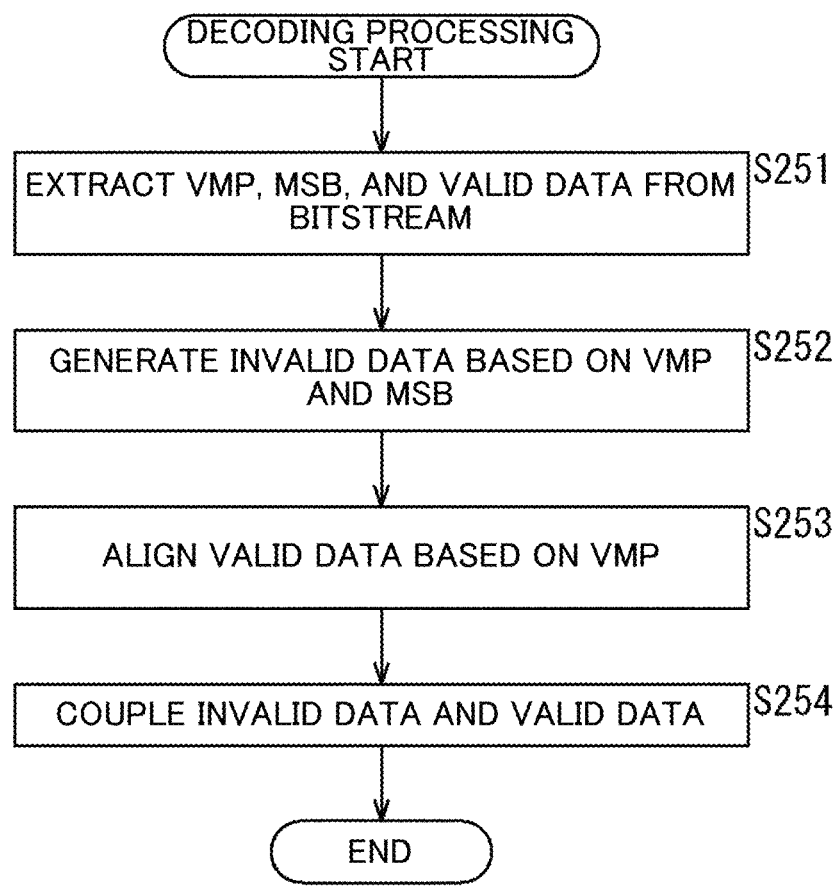
FIG. 18 is a flowchart illustrating an example of the flow of decoding processing.

When the decoding processing starts, in step S251 of FIG. 18, the parser 251 extracts, from the bitstream, (i) information indicating the VMP, (ii) the MSB bit plane, and (iii) the valid data.

In step S252, the invalid data generation unit 252 generates the invalid data based on the information indicating the VMP and the MSB bit plane extracted in step S251. In other words, the invalid data generation unit 252 generates a bit string which has a bit pattern according to the binary type and which is contiguous with the most significant bit (because this is two's complement binary, a bit string which is constituted only by values of "0" or only by values of "1", and which is contiguous with the most significant bit).

In step S253, the valid data alignment unit 253 aligns the valid data extracted in step S251 with the VMP based on the information indicating the VMP extracted in step S251.

In step S254, the coupling unit 254 generates a sample by coupling the invalid data generated in step S252 with the valid data aligned in step S253. The coupling unit 254 performs this coupling for each sample to generate a data unit. The data type of this data unit is two's complement binary. The coupling unit 254 outputs the generated two's complement binary data unit to the exterior of the decoding device 250.

Once the processing of step S254 ends, the decoding processing ends. As described above, by executing the decoding processing, the decoding device 250 can suppress a drop in encoding efficiency more than when decoding a bitstream in which all bits of each sample have been encoded in the PCM mode.

<2-3. Offset Binary>

When the foregoing Method 1-1 is applied, for example, the binary type of each sample may be offset binary, as indicated in the fifth row from the top of the table in FIG. 4. Additionally, the MSB may be transmitted (Method 1-1-3).

<Encoding Device>

For example, the binary type may be offset binary, the bit pattern may be constituted by a value of "0" for the most significant bit and a value of "1" for other bits, or may be constituted by a value of "1" for the most significant bit and a value of "0" for other bits, and the valid most significant bit position (VMP) may be the position of the most significant bit among bits having a value that is the same as the value of the most significant bit in the sample. The most significant bit (MSB) of (each sample in) the data unit may then be transmitted. In other words, the information processing device may further include a most significant bit extraction unit that extracts the most significant bit from each of the samples, and the bitstream generation unit may generate the bitstream further including the most significant bit of each of the samples.

Figure 19:
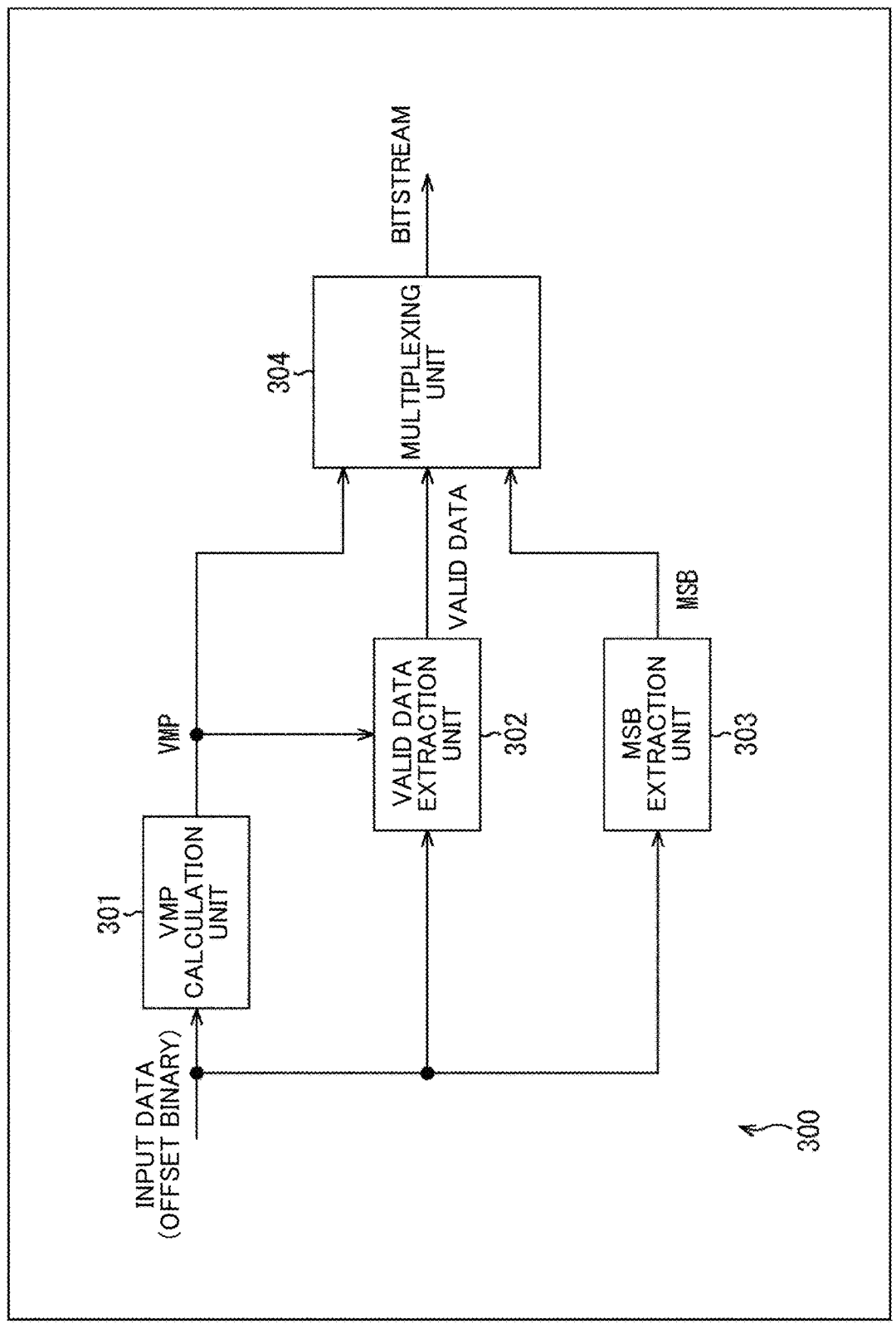
FIG. 19 is a block diagram illustrating an example of the main configuration of an encoding device.

FIG. 19 is a block diagram illustrating an example of the configuration of an encoding device serving as one aspect of an information processing device to which the present technique is applied. Note that FIG. 19 illustrates the main processing units, data flows, and the like, and the items illustrated in FIG. 19 are not necessarily all the items. In other words, an encoding device 300 may include processing units not illustrated as blocks in FIG. 19, and processing and data flows not indicated as arrows or the like in FIG. 19.

The encoding device 300 illustrated in FIG. 19 is a device that encodes input data supplied for each of data units, the data unit being a predetermined unit of data constituted by a plurality of samples, and outputs the resulting encoded data as a bitstream. At this time, the encoding device 300 performs the encoding by applying the present technique (Method 1-1-3). In other words, the encoding device 300 encodes offset binary input data, which represents a predetermined positive integer as the bias value (offset), using the VMP-applied PCM mode.

Figure 20:
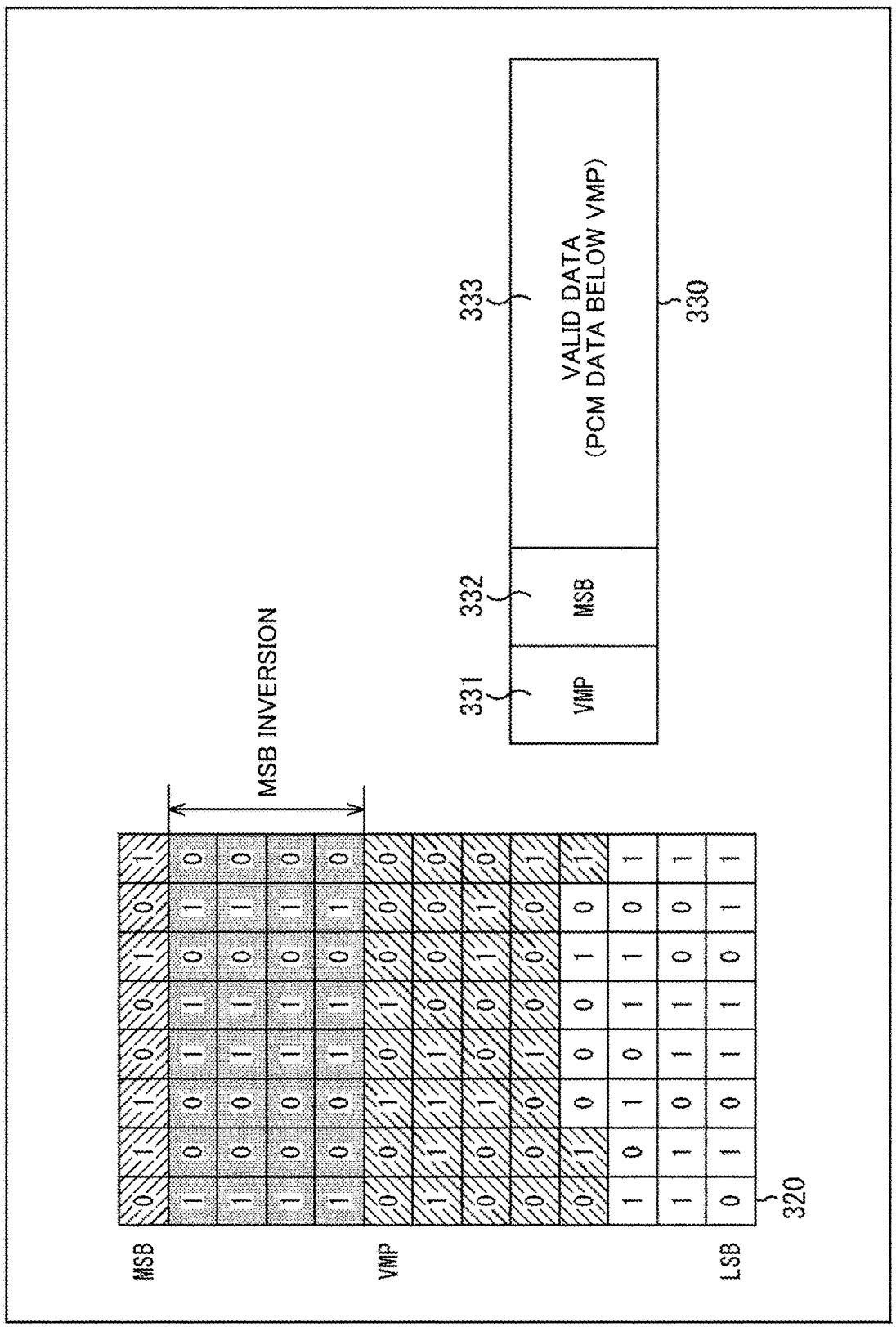
FIG. 20 is a diagram illustrating an example of an offset binary data unit and bitstream.

A data unit 320 illustrated on the left side of FIG. 20 is an example of the bit structure of one data unit in the input data. In the data unit 320, each square represents a bit, and the number in the square (0 or 1) represents the value of the bit. Additionally, one column in the vertical direction represents a bit string for one sample. In other words, in the figure, the number of squares in the vertical direction represents the bit depth (bit length). The uppermost bit in the figure is the most significant bit (MSB) of the sample. The lowermost bit in the figure is the least significant bit (LSB) of the sample. The number of squares in the horizontal direction in the figure indicates the number of samples included in the data unit 320.

In other words, in the example in FIG. 20, the data unit 320 is constituted by eight samples, each having a bit length of 13 bits. Note that the bit length of the sample and the number of samples constituting the data unit can be determined as desired, and are not limited to this example.

In the case of offset binary, the most significant bit (MSB) of the sample is a sign bit. If the sample has a positive value, the MSB has a value of "1". If the sample has a negative value, the MSB has a value of "0". The bits from the bit one less significant than the MSB to the bit one more significant than the VMP have a value different from that of the MSB of each sample ("0", when the MSB is "1", and "1", when the MSB is "0"). In other words, the bit pattern according to offset binary is constituted by a value of "0" for the most significant bit and a value of "1" for other bits, or is constituted by a value of "1" for the most significant bit and a value of "0" for other bits.

Accordingly, with offset binary, the valid most significant bit position (VMP) is the position of the most significant bit among bits having a value that is the same as the value of the most significant bit in that sample. In other words, the position of the most significant bit plane among bit planes in which any bit has a value that is the same as the value of the most significant bit in that sample is set to the VMP.

As in straight binary, the valid data is a bit string below the VMP.

In the data unit 320 illustrated in FIG. 20, the bit plane of the MSB, indicated by the upper-leftward and lower-rightward hatching, is constituted by sign bits. With offset binary, the invalid data is constituted by the MSB (sign bit) indicated by the upper-leftward and lower-rightward hatching, and an invalid bit (a bit constituting a part for which no value is indicated) indicated by gray. The invalid bits indicated by gray have a value different from the most significant bit (MSB) of the sample. The sixth bit from the MSB, which, in any one sample, has a value that is the same as the value of the most significant bit in that sample, is the VMP. The bit string below the VMP (indicated by the lower-leftward and upper-rightward hatching and white) is the valid data. As with straight binary, the valid data can include valid bits as well as invalid bits.

Returning to FIG. 19, the encoding device 300 to which input data having such a configuration (the offset binary input data) is supplied includes a VMP calculation unit 301, a valid data extraction unit 302, an MSB extraction unit 303, and a multiplexing unit 304. The input data to be encoded is supplied to the VMP calculation unit 301, the valid data extraction unit 302, and the MSB extraction unit 303 for each data unit.

The VMP calculation unit 301 obtains the valid most significant bit position (VMP) for the supplied input data. In other words, the VMP calculation unit 301 detects the valid most significant bit position (VMP), which is the position of the most significant bit among the bits having a value different from the bit pattern according to the binary type, in a data unit constituted by a plurality of samples. The VMP calculation unit 301 can therefore also be called a "valid most significant bit position detection unit". Since the input data is offset binary, the VMP calculation unit 301 searches for a bit having a value that is the same as the value of the most significant bit in that sample, having the most significant value in the data unit, and takes that bit position as the VMP. The VMP calculation unit 301 supplies information indicating the detected VMP to the valid data extraction unit 302 and the multiplexing unit 304.

The valid data extraction unit 302 extracts the bit string below the VMP from each sample of the input data as the valid data, based on the information supplied by the VMP calculation unit 301. The valid data extraction unit 302 supplies the extracted valid data to the multiplexing unit 304.

The MSB extraction unit 303 extracts the most significant bit (MSB) of each sample from the supplied input data. Since the input data is offset binary, the value of this MSB indicates the sign (+, −) of the sample, as described above. If the sample has a positive value, the MSB has a value of "1". If the sample has a negative value, the MSB has a value of "0". The MSB extraction unit 303 supplies the bit plane of the extracted MSB to the multiplexing unit 304.

The multiplexing unit 304 generates a bitstream including (i) information indicating the valid most significant bit position, (ii) the valid data of each sample, and (iii) the MSB of each sample by multiplexing the information indicating the VMP supplied by the VMP calculation unit 301, the valid data supplied by the valid data extraction unit 302, and the bit plane of the MSB (the MSB of each sample) supplied by the MSB extraction unit 303. In other words, the multiplexing unit 304 generates a bitstream of encoded data obtained by encoding the offset binary input data in the VMP-applied PCM mode. The multiplexing unit 304 can therefore also be called a "bitstream generation unit". The multiplexing unit 304 outputs the generated bitstream to the exterior of the encoding device 300.

A bitstream 330 illustrated in FIG. 20 is a bitstream of encoded data, generated by the multiplexing unit 304, in which the offset binary input data is encoded in the VMP-applied PCM mode. As illustrated in FIG. 20, the bitstream 330 includes a VMP 331, an MSB 332, and valid data 333. The VMP 331 is information indicating the VMP in the data unit to be processed. The MSB 332 is the MSB of each sample of the data unit to be processed (i.e., the bit plane of the MSB). The valid data 333 is the valid data of each sample that constitutes that data unit. In other words, the valid data 333 is constituted by a bit string (PCM data) below the VMP indicated by the VMP 331, for each sample.

In this manner, the encoding device 300 makes it possible to suppress the transmission of invalid data (reduce the transmission amount for invalid data) by encoding the offset binary input data in the VMP-applied PCM mode. Accordingly, the encoding device 300 can suppress a drop in encoding efficiency more than when encoding all bits of each sample in the PCM mode. As described above, the invalid data has a bit pattern according to the binary type, and can therefore be restored without respect to the valid data. In other words, the encoding device 300 can suppress a drop in the encoding efficiency through a lossless method.

Note that the encoding device 300 may quantize the valid data extracted by the valid data extraction unit 302. In this case, the encoding is lossy. For example, in the data unit 320 illustrated in FIG. 20, quantizing the valid data may result in the bit part indicated by white not being transmitted. In this case, the bits indicated by the hatching are transmitted as valid data. Doing so makes it possible for the encoding device 300 to further suppress a drop in the encoding efficiency.

<Flow of Encoding Processing>

An example of the flow of encoding processing executed by the encoding device 300 will be described with reference to the flowchart in FIG. 21.

Figure 21:
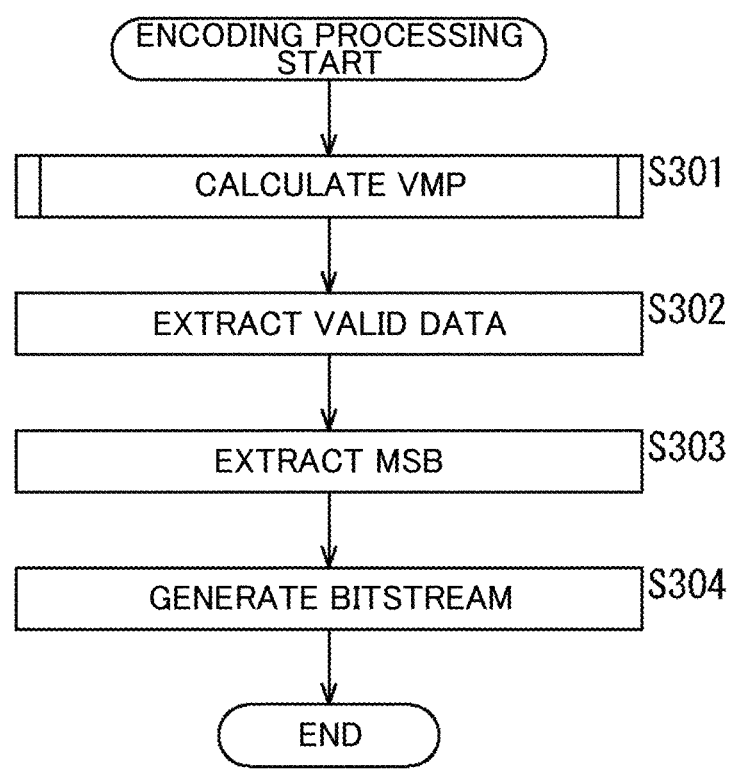
FIG. 21 is a flowchart illustrating an example of the flow of encoding processing.

When the encoding processing starts, in step S301 of FIG. 21, the VMP calculation unit 301 calculates the valid most significant bit position (VMP) of the offset binary input data.

In step S302, the valid data extraction unit 302 extracts valid data (the bit string below the VMP) from the input data based on the VMP calculated in step S301.

In step S303, the MSB extraction unit 303 extracts the MSB of each sample (the bit plane of the MSB).

In step S304, the multiplexing unit 304 generates a bitstream including (i) information indicating the VMP calculated in step S301, (ii) the valid data extracted in step S302, and (iii) the bit plane of the MSB extracted in step S303. The multiplexing unit 304 outputs the generated bitstream to the exterior of the encoding device 300.

When the processing of step S304 ends, the encoding processing ends. As described above, by executing the encoding processing, the encoding device 300 can suppress a drop in encoding efficiency more than when encoding all bits of each sample in the PCM mode.

<Flow of VMP Calculation Processing>

An example of the flow of the VMP calculation processing executed in step S301 of FIG. 21 will be described with reference to the flowchart in FIG. 22. Note that in this VMP calculation processing, the bit position j, the sample index i, and pel(i, j) are the same as those described with reference to FIG. 10.

Figure 22:
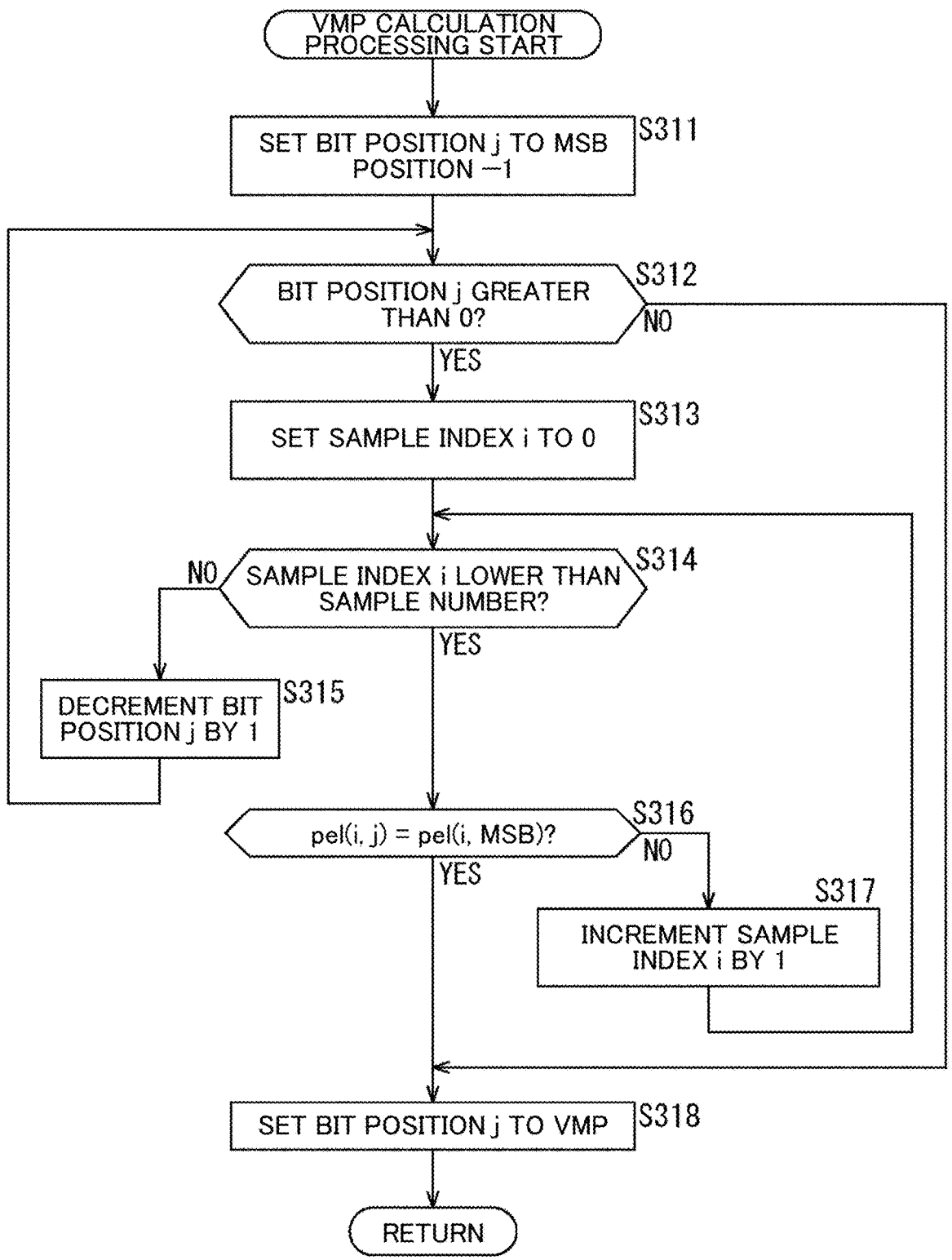
FIG. 22 is a flowchart illustrating an example of the flow of VMP calculation processing.

When the VMP calculation processing starts, in step S311 of FIG. 22, the VMP calculation unit 301 sets the bit position j to (the MSB position of the sample−1).

In step S312, the VMP calculation unit 301 determines whether the bit position j is greater than 0 (the LSB position of the sample). If the bit position j is determined to be greater than 0, the sequence moves to step S313.

In step S313, the VMP calculation unit 301 sets the sample index i to 0, which is the index of the first sample in the data unit to be processed.

In step S314, the VMP calculation unit 301 determines whether the sample index i is less than the number of samples constituting the data unit to be processed (8, in the case of the data unit 320 in FIG. 20). If it is determined that the sample index i has not reached the stated number of samples (i.e., that there is an unprocessed sample for the bit position j), the sequence moves to step S316.

In step S316, the VMP calculation unit 301 determines whether pel(i, j)=pel(i, MSB). pel(i, j)=pel(i, MSB) indicates that the value of the bit (i, j) being processed is the same as the value pel(i, MSB) of the most significant bit in the sample. In other words, in step S316, a bit having a value that is the same as the most significant bit of the sample is searched for. If the value of the bit (i, j) being processed is different from the most significant bit of the sample, i.e., if the bit (i, j) being processed has a value corresponding to the bit pattern according to the binary type, contiguous with the most significant bit, the bit (i, j) being processed is a bit constituting invalid data. If the bit (i, j) being processed is determined to be a bit constituting invalid data, the sequence moves to step S317.

In step S317, the VMP calculation unit 301 increments (+1) the sample index i. The sequence then returns to step S314, and the processing following thereafter is repeated. In other words, by repeating the processing of steps S314, S316, and S317, a bit having a value that is the same as the most significant bit of the sample (a bit having a value different from the bit pattern according to the binary type) is searched for among all the samples at the bit position j.

If in step S316 it is determined that pel(i, j)=pel(i, MSB), i.e., if a bit having a value that is the same as the most significant bit of the sample is found, the sequence moves to step S318.

If in step S314 it is determined that the sample index i has reached the number of samples, i.e., if the search has ended for all samples at the bit position j, the sequence moves to step S315.

In step S315, the VMP calculation unit 301 decrements (−1) the bit position j. The sequence then returns to step S312, and the processing following thereafter is repeated. In other words, by repeating the processing of steps S312 to S315, a bit having a value different from the most significant bit of the sample (a bit having a value different from the bit pattern according to the binary type) is searched for among all the samples (from the MSB to the LSB) at all bit positions.

If in step S312 the bit position j has reached 0, i.e., if the search has ended for all the samples at all the bit positions (from the MSB to the LSB), the sequence moves to step S318.

In step S318, the VMP calculation unit 301 sets the bit position j at that point in time to the valid most significant bit position (VMP).

Once the processing of step S318 ends, the VMP calculation processing ends, and the processing returns to FIG. 21. By executing the VMP calculation processing in this manner, the VMP calculation unit 301 can set the position of the most significant bit among the bits having the same value as the most significant bit of the sample to the VMP. In other words, in the data unit, the VMP calculation unit 301 can set the position of the most significant bit, among the bits having a value different from the bit pattern according to the binary type, to the VMP. To rephrase, the VMP calculation unit 301 can set the position of the most significant bit among the valid bits of each sample in the data unit to the VMP. To rephrase again, the VMP calculation unit 301 can set the position of the most significant bit plane among the bit plane in which at least one bit has a value different from the bit pattern according to the binary type, in a data unit constituted by a plurality of samples, to the VMP.

<Decoding Device>

For example, the binary type may be offset binary, the bit pattern may be constituted by a value of "0" for the most significant bit and a value of "1" for other bits, or may be constituted by a value of "1" for the most significant bit and a value of "0" for other bits, and the valid most significant bit position (VMP) may be the position of the most significant bit among bits having a value that is the same as the value of the most significant bit in the sample. The most significant bit (MSB) of (each sample in) the data unit may then be transmitted. In other words, the extraction unit may further extract the most significant bit of the sample from the bitstream, and the invalid data generation unit may generate the invalid data using the most significant bit of the sample.

Figure 23:
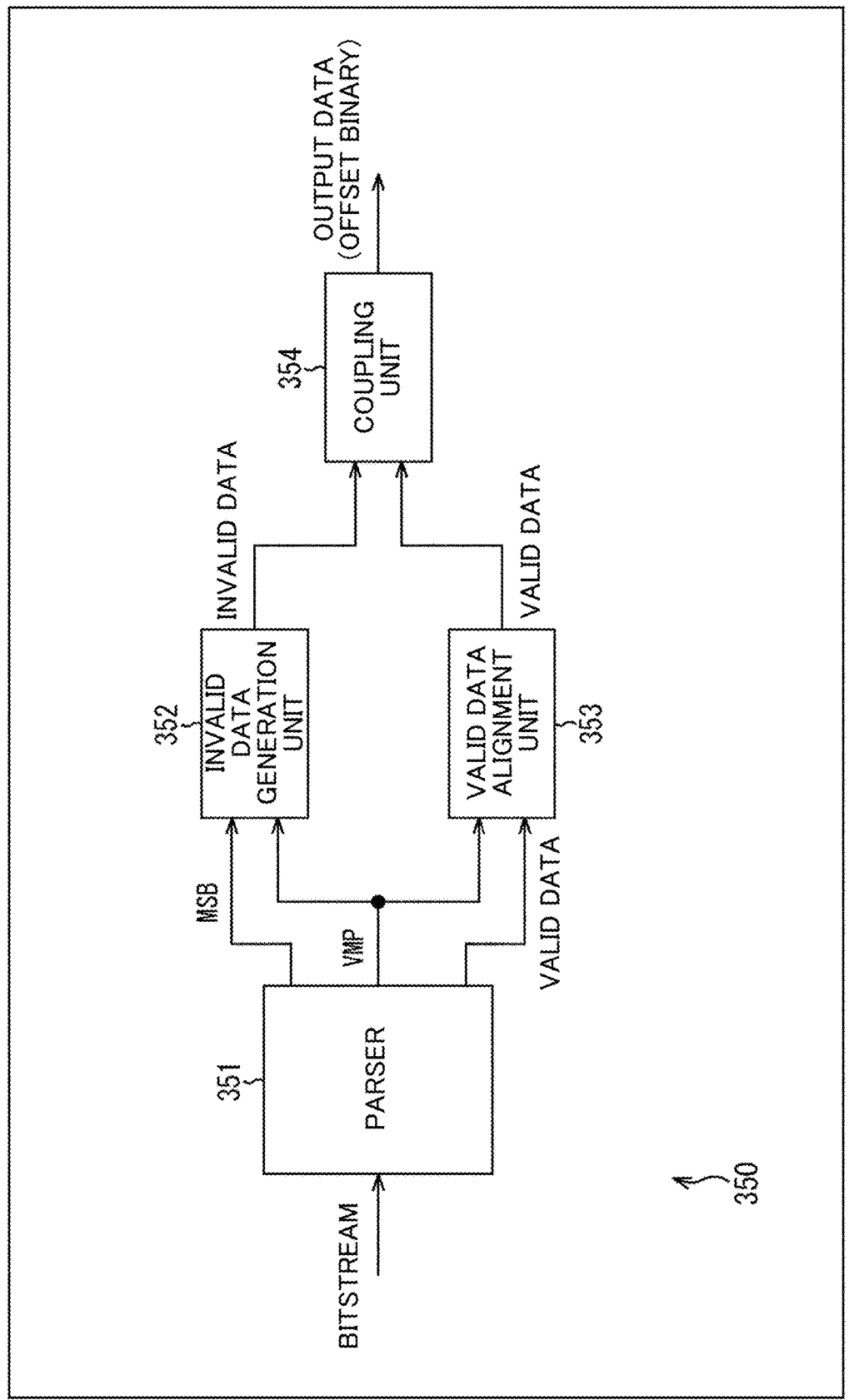
FIG. 23 is a block diagram illustrating an example of the main configuration of a decoding device.

The present technique can be applied in a decoding device. FIG. 23 is a block diagram illustrating an example of the configuration of a decoding device serving as one aspect of an information processing device in which the present technique is applied. Note that FIG. 23 illustrates the main processing units, data flows, and the like, and the items illustrated in FIG. 23 are not necessarily all the items. That is, processing units not illustrated in FIG. 23 as blocks and processing and data flows not illustrated in FIG. 23 as arrows or the like may be present in a decoding device 350.

The decoding device 350 illustrated in FIG. 23 is a device that decodes a bitstream generated by the encoding device 300, restores input data to the state the data was in before being encoded by the encoding device 300, and outputs the input data as output data. At this time, the decoding device 350 performs the decoding by applying the present technique (Method 1-1-3). In other words, the decoding device 350 decodes a bitstream in which offset binary input data has been encoded in the VMP-applied PCM mode.

As illustrated in FIG. 23, the decoding device 350 includes a parser 351, an invalid data generation unit 352, a valid data alignment unit 353, and a coupling unit 354. For example, the bitstream output from the encoding device 300 (a bitstream encoded in the VMP-applied PCM mode) is supplied to the parser 351. The bitstream has a configuration such as that described with reference to FIG. 20.

The parser 351 analyzes the bitstream and extracts (i) information indicating the valid most significant bit position (VMP), (ii) the bit plane of the MSB, and (iii) valid data. In other words, the parser 351 extracts, from the bitstream, (i) information indicating the valid most significant bit position, which is the position of the most significant bit among the bits having a value different from the bit pattern according to the binary type, in a data unit constituted by a plurality of samples, (ii) the most significant bit (MSB) of each sample, and (iii) valid data, which is a bit string below the valid most significant bit position in each sample. That is, the parser 351 can also be called an "extraction unit". The parser 351 supplies the extracted information indicating the VMP to the invalid data generation unit 352 and the valid data alignment unit 353. The parser 351 also supplies the extracted bit plane of the MSB to the invalid data generation unit 352. The parser 351 also supplies the extracted valid data to the valid data alignment unit 353.

The invalid data generation unit 352 generates invalid data using the information indicating the VMP, supplied from the parser 351, and the bit plane of the MSB. The invalid data is a bit string contiguous with the most significant bit having a bit pattern according to the binary type. The bitstream input to the decoding device 350 is a bitstream of encoded data in which offset binary data is encoded. Accordingly, for each sample, the invalid data generation unit 352 generates, by copying the MSB and inverting the values, a bit string (invalid data) from the MSB to a bit position one bit higher than the VMP, constituted by a value of "0" for the MSB and values of "1" for the other bits, or constituted by a value of "1" for the MSB and values of "0" for the other bits. The invalid data generation unit 352 supplies the generated invalid data to the coupling unit 354.

Based on the information indicating the VMP supplied from the parser 351, the valid data alignment unit 353 aligns the valid data so that the valid data supplied from the parser 351 is a bit string below the valid most significant bit position (VMP) of the sample. In other words, the valid data alignment unit 353 aligns the most significant bit of the valid data to the VMP (sets the position of the most significant bit of the valid data to the VMP). The valid data alignment unit 353 supplies the aligned valid data to the coupling unit 354.

The coupling unit 354 generates an offset binary sample by coupling the invalid data supplied from the invalid data generation unit 352 with the aligned valid data supplied from the valid data alignment unit 353. The coupling unit 354 performs the same processing for each sample to generate an offset binary data unit. In other words, the coupling unit 354 can also be called a "data unit generation unit". If the valid data was not quantized at the time of encoding, i.e., if the data was losslessly encoded, the coupling unit 354 can restore the input data that was input to the encoding device 300. The coupling unit 354 outputs the generated offset binary data unit as output data to the exterior of the decoding device 350.

In this manner, the decoding device 350 can correctly decode a bitstream in which offset binary input data has been encoded in the VMP-applied PCM mode. In other words, the transmission of invalid data can be suppressed (the transmission amount for invalid data can be reduced) as described above. Accordingly, the decoding device 350 can suppress a drop in encoding efficiency more than when decoding a bitstream in which all bits of each sample have been encoded in the PCM mode. At this time, the invalid data generation unit 352 can restore the invalid data that has not been transmitted, regardless of the valid data. In other words, the decoding device 350 can suppress a drop in the encoding efficiency through a lossless method.

Note that if the valid data has been quantized by the encoding device 300, i.e., if the sample has been lossily encoded by the encoding device 300, the valid data alignment unit 353 fills the missing less significant bits with bits of a predetermined value (e.g., a value of "0") after aligning the most significant bit of the valid data to the VMP. For example, in the data unit 320 in FIG. 20, if the bit part indicated by hatching is transmitted as valid data, the valid data alignment unit 353 fills the bit part indicated by white with bits having a value of "0", for example. Doing so makes it possible for the decoding device 350 to decode a bitstream encoded using a lossy method, which in turn makes it possible to further suppress a drop in encoding efficiency.

<Flow of Decoding Processing>

An example of a flow of the decoding processing executed by the decoding device 350 will be described with reference to the flowchart in FIG. 24.

Figure 24:
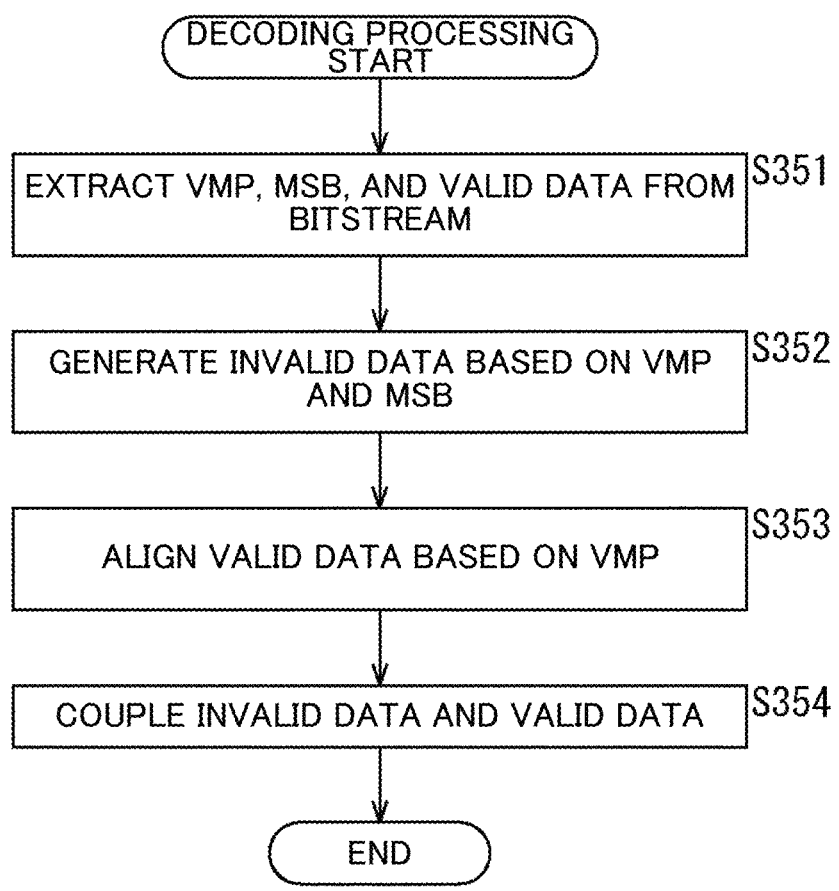
FIG. 24 is a flowchart illustrating an example of the flow of decoding processing.

When the decoding processing starts, in step S351 of FIG. 24, the parser 351 extracts, from the bitstream, (i) information indicating the VMP, (ii) the MSB bit plane, and (iii) the valid data.

In step S352, the invalid data generation unit 352 generates the invalid data based on the information indicating the VMP and the MSB bit plane extracted in step S351. In other words, the invalid data generation unit 352 generates a bit string which has a bit pattern according to the binary type and which is contiguous with the most significant bit (because this is offset binary, a bit string constituted by a value of "0" for the most significant bit and values of "1" for the other bits, or constituted by a value of "1" for the most significant bit and values of "0" for the other bits, and which is contiguous with the most significant bit).

In step S353, the valid data alignment unit 353 aligns the valid data extracted in step S351 with the VMP based on the information indicating the VMP extracted in step S351.

In step S354, the coupling unit 354 generates a sample by coupling the invalid data generated in step S352 with the valid data aligned in step S353. The coupling unit 354 performs this coupling for each sample to generate a data unit. The data type of this data unit is offset binary. The coupling unit 354 outputs the generated offset binary data unit to the exterior of the decoding device 350.

Once the processing of step S354 ends, the decoding processing ends. As described above, by executing the decoding processing, the decoding device 350 can suppress a drop in encoding efficiency more than when decoding a bitstream in which all bits of each sample have been encoded in the PCM mode.

<2-4. Selective Application of Encoding Method>

Although the foregoing describes a case where the encoding is performed in the VMP-applied PCM mode, the VMP-applied PCM mode may be combined with another encoding mode and applied selectively. In other words, when applying Method 1, a plurality of encoding methods may be applied selectively, for example, as indicated in the sixth row from the top of the table in FIG. 4. In other words, a plurality of encoding modes including the VMP-applied PCM mode may be prepared as candidates, and one encoding mode (encoding method) among those candidates may be applied selectively. In this case, selection information indicating the encoding method applied may be transmitted (Method 1-2). The number of candidates may be any number greater than or equal to 2. Additionally, the encoding mode aside from the VMP-applied PCM mode may be any encoding mode.

For example, when applying Method 1-2, the VMP-applied PCM mode and a DPCM mode may be prepared as candidates, and one thereof may be applied selectively, as indicated in the seventh row from the top of the table in FIG. 4 (Method 1-2-1).

For example, when applying Method 1-2, the selection of the encoding mode (the encoding method) may be made based on a result of comparing the efficiency, as indicated in the eighth row from the top of the table in FIG. 4 (Method 1-2-2).

<Encoding Device>

The present technique can be applied in any desired device. For example, the present technique can be applied in an encoding device. For example, the information processing device may further include an encoding unit that encodes the data unit using a second encoding method different from a first encoding method, the first encoding method using pulse code modulation; and an encoding method selection unit that selects an encoding method to be applied. The bitstream generation unit may generate the bitstream including (i) information indicating the encoding method selected, (ii) the valid most significant bit position (VMP), and (iii) the valid data of each of the samples, when the first encoding method is selected. Additionally, the bitstream generation unit may generate the bitstream including (i) information indicating the encoding method selected and (ii) encoded data of the data unit encoded using the second encoding method, when the second encoding method is selected.

The second encoding method may be an encoding method using differential pulse code modulation. The encoding unit may calculate a difference between a sample which is not a reference sample and another sample, and generate the encoded data including the difference from the reference sample.

The information processing device may further include an efficiency comparison unit that compares an efficiency of each of candidates for the encoding method to be applied, and the encoding method selection unit may select the encoding method to be applied based on a comparison result for the efficiency.

Figure 25:
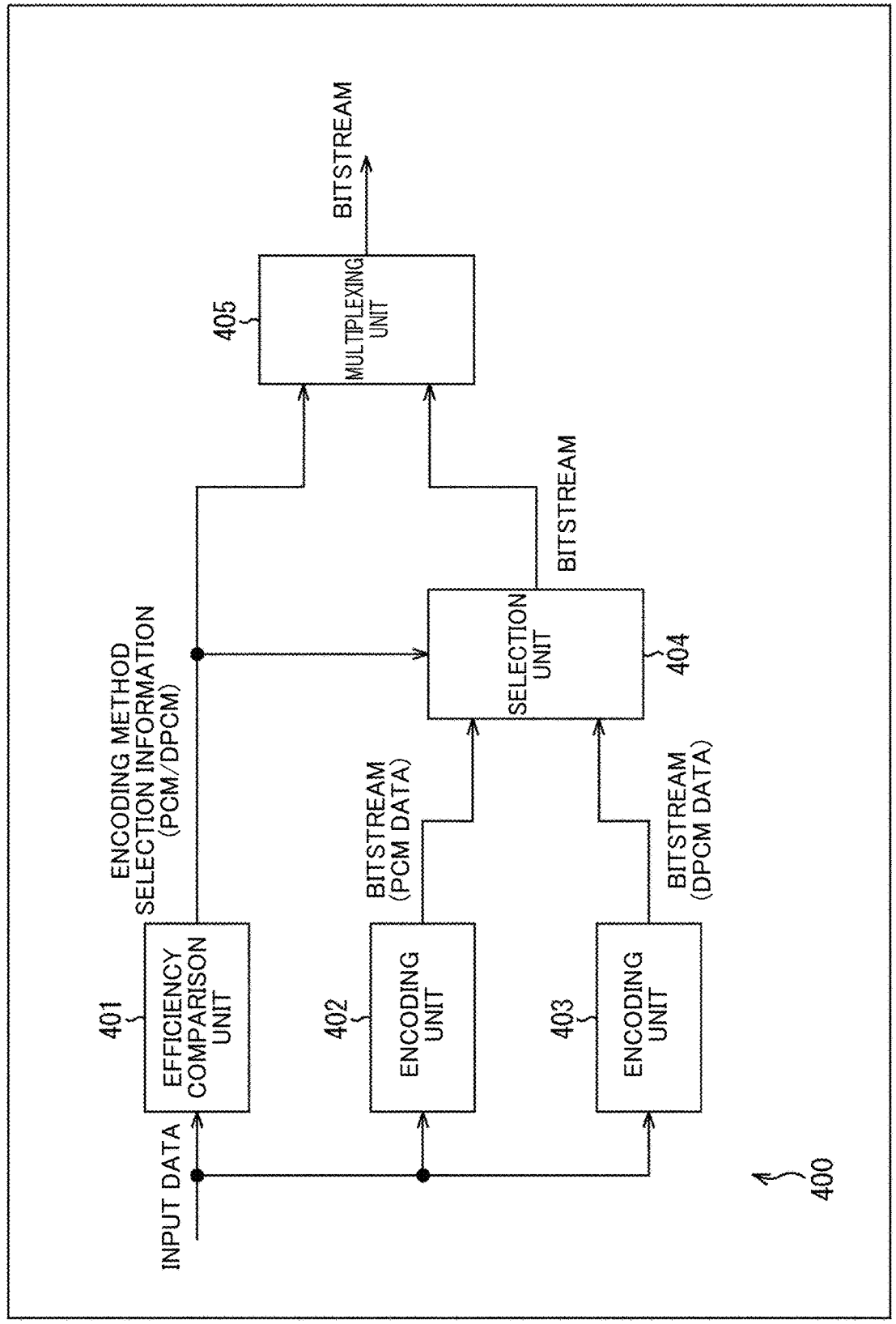
FIG. 25 is a block diagram illustrating an example of the main configuration of an encoding device.

FIG. 25 is a block diagram illustrating an example of the configuration of an encoding device serving as one aspect of an information processing device to which the present technique is applied. Note that FIG. 25 illustrates the main processing units, data flows, and the like, and the items illustrated in FIG. 25 are not necessarily all the items. In other words, an encoding device 400 may include processing units not illustrated as blocks in FIG. 25, and processing and data flows not indicated as arrows or the like in FIG. 25.

The encoding device 400 illustrated in FIG. 25 is a device that encodes input data supplied for each of data units, the data unit being a predetermined unit of data constituted by a plurality of samples, and outputs the resulting encoded data as a bitstream. At this time, the encoding device 400 performs the encoding by applying the present technique (Method 1-2, Method 1-2-1, and Method 1-2-2). In other words, the encoding device 400 selects the most efficient mode among the VMP-applied PCM mode and the DPCM mode, and encodes the input data by applying the selected encoding mode.

Note that the binary type of the input data supplied to the encoding device 400 may be any binary type. For example, the binary type may be straight binary. The binary type may also be two's complement binary. Alternatively, the binary type may be offset binary.

As illustrated in FIG. 25, the encoding device 400 includes an efficiency comparison unit 401, an encoding unit 402, an encoding unit 403, a selection unit 404, and a multiplexing unit 405. The input data to be encoded is supplied to the efficiency comparison unit 401, the encoding unit 402, and the encoding unit 403 for each data unit.

The efficiency comparison unit 401 compares the efficiencies of the candidates for the encoding method to be applied (the efficiencies of the VMP-applied PCM mode and the DPCM mode) using the supplied input data. The efficiency comparison unit 401 then generates encoding method selection information indicating the more efficient encoding method as the result of the comparison. The efficiency comparison unit 401 supplies the encoding method selection information to the selection unit 404 and the multiplexing unit 405.

The encoding unit 402 encodes the input data in the VMP-applied PCM mode (the first encoding method), and generates a bitstream of the encoded data. For example, if the input data is straight binary, the encoding unit 402 has a configuration similar to that of the encoding device 100, performs the same processing, and generates the bitstream 130. On the other hand, if the input data is two's complement binary, the encoding unit 402 has a configuration similar to that of the encoding device 200, performs the same processing, and generates the bitstream 230. Furthermore, if the input data is offset binary, the encoding unit 402 has a configuration similar to that of the encoding device 300, performs the same processing, and generates the bitstream 330. The encoding unit 402 supplies the generated bitstream to the selection unit 404.

The encoding unit 403 encodes the input data in the second encoding method, which is different from the first encoding method of the encoding unit 402, and generates a bitstream of the encoded data. For example, the encoding unit 403 encodes the input data in the DPCM mode. In other words, the encoding unit 403 takes one sample in the data unit as the reference sample, and calculates a difference from the other samples for each sample aside from the reference sample. The encoding unit 403 then generates a bitstream including the reference sample and the differences therefrom. The encoding unit 403 supplies the generated bitstream to the selection unit 404.

The selection unit 404 selects one of the VMP-applied PCM mode and the DPCM mode based on the encoding method selection information (the efficiency comparison result) supplied by the efficiency comparison unit 401. In other words, the selection unit 404 selects the encoding mode indicated by the encoding method selection information, from among the bitstream of the encoded data obtained by encoding the input data in the VMP-applied PCM mode, supplied by the encoding unit 402, and the bitstream of the encoded data obtained by encoding the input data in the DPCM mode, supplied by the encoding unit 403. The selection unit 404 can therefore be called an "encoding method selection unit". The selection unit 404 supplies the selected bitstream to the multiplexing unit 405. For example, if the VMP-applied PCM mode is selected based on the encoding method selection information (if the VMP-applied PCM mode is more efficient than the DPCM mode), the selection unit 404 selects the bitstream supplied by the encoding unit 402 and supplies that bitstream to the multiplexing unit 405. On the other hand, if the DPCM mode is selected based on the encoding method selection information (if the DPCM mode is more efficient than the VMP-applied PCM mode), the selection unit 404 selects the bitstream supplied by the encoding unit 403 and supplies that bitstream to the multiplexing unit 405.

The multiplexing unit 405 multiplexes the bitstream supplied by the selection unit 404 and the encoding method selection information supplied by the efficiency comparison unit 401, and generates the bitstream. In other words, the multiplexing unit 405 stores the encoding method selection information supplied by the efficiency comparison unit 401 in the bitstream supplied by the selection unit 404. For example, if the VMP-applied PCM mode (the first encoding method) is selected by the selection unit 404, the multiplexing unit 405 generates the bitstream including at least (i) the information indicating the encoding method selected (the encoding method selection information), (ii) the valid most significant bit position (VMP), and (iii) the valid data of each of the samples. On the other hand, if the DPCM mode (the second encoding method) is selected by the selection unit 404, the multiplexing unit 405 generates the bitstream including at least (i) the information indicating the encoding method selected (the encoding method selection information) and (ii) the encoded data of the data unit encoded using the DPCM mode (the second encoding method). In other words, the multiplexing unit 405 can also be called a "bitstream generation unit".

Figure 26:
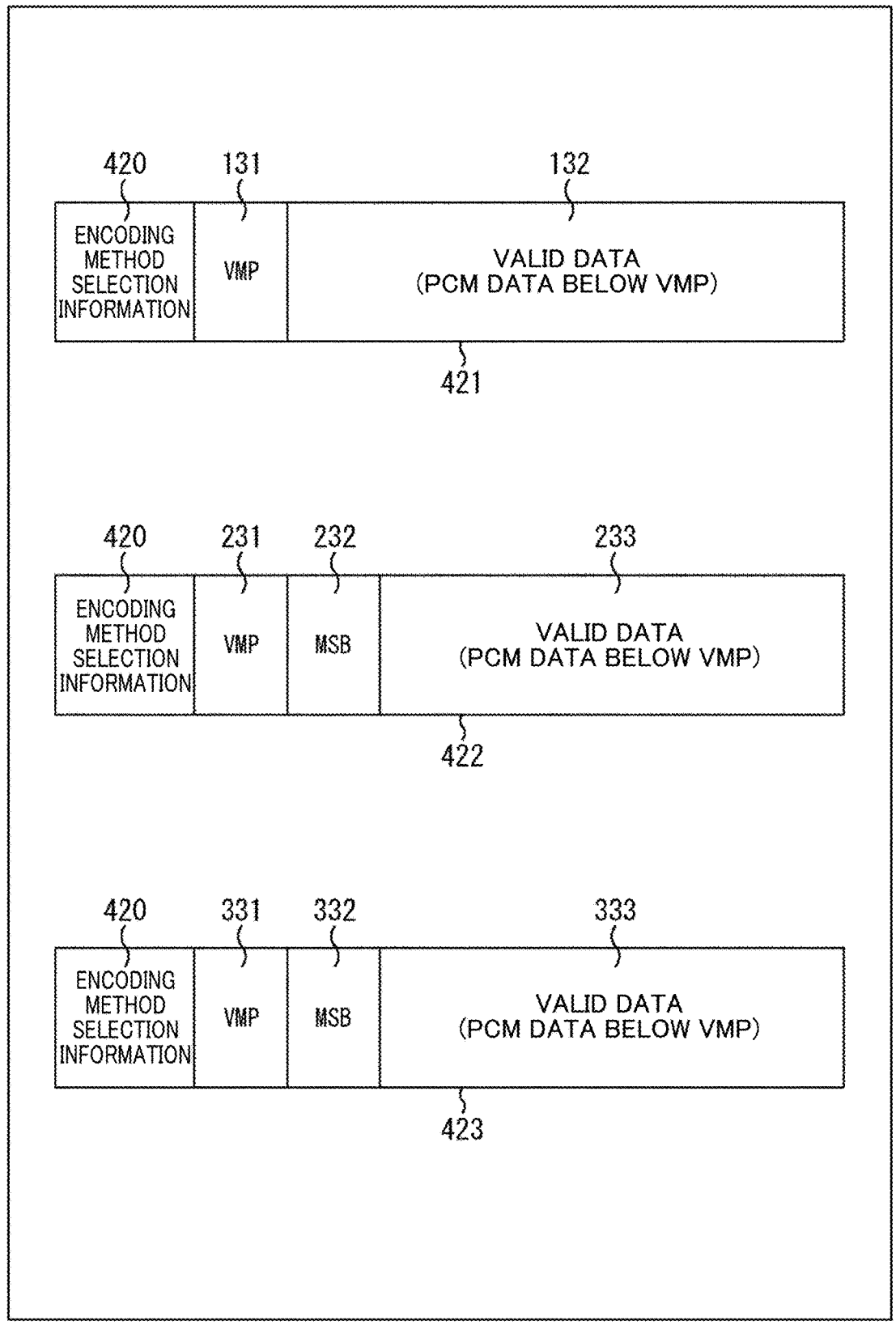
FIG. 26 is a diagram illustrating an example of a bitstream.

For example, if the bitstream 130 is supplied by the selection unit 404, the multiplexing unit 405 stores the encoding method selection information in that bitstream 130, and generates a bitstream 421 including encoding method selection information 420, the VMP 131, and the valid data 132, as illustrated in FIG. 26.

If the bitstream 230 is supplied by the selection unit 404, the multiplexing unit 405 stores the encoding method selection information in that bitstream 230, and generates a bitstream 422 including the encoding method selection information 420, the VMP 231, the MSB 232, and the valid data 233, as illustrated in FIG. 26.

If the bitstream 330 is supplied by the selection unit 404, the multiplexing unit 405 stores the encoding method selection information in that bitstream 330, and generates a bitstream 423 including the encoding method selection information 420, the VMP 331, the MSB 332, and the valid data 333, as illustrated in FIG. 26.

The multiplexing unit 405 outputs the generated bitstream to the exterior of the encoding device 400.

In this manner, the encoding device 400 can encode the input data having selectively applied a plurality of encoding modes (encoding methods), including the VMP-applied PCM mode, based on the efficiency of each encoding mode. Accordingly, the encoding device 400 can apply a more efficient encoding mode, which makes it possible to further suppress a drop in the encoding efficiency.

<Flow of Encoding Processing>

An example of the flow of encoding processing executed by the encoding device 400 will be described with reference to the flowchart in FIG. 27.

Figure 27:
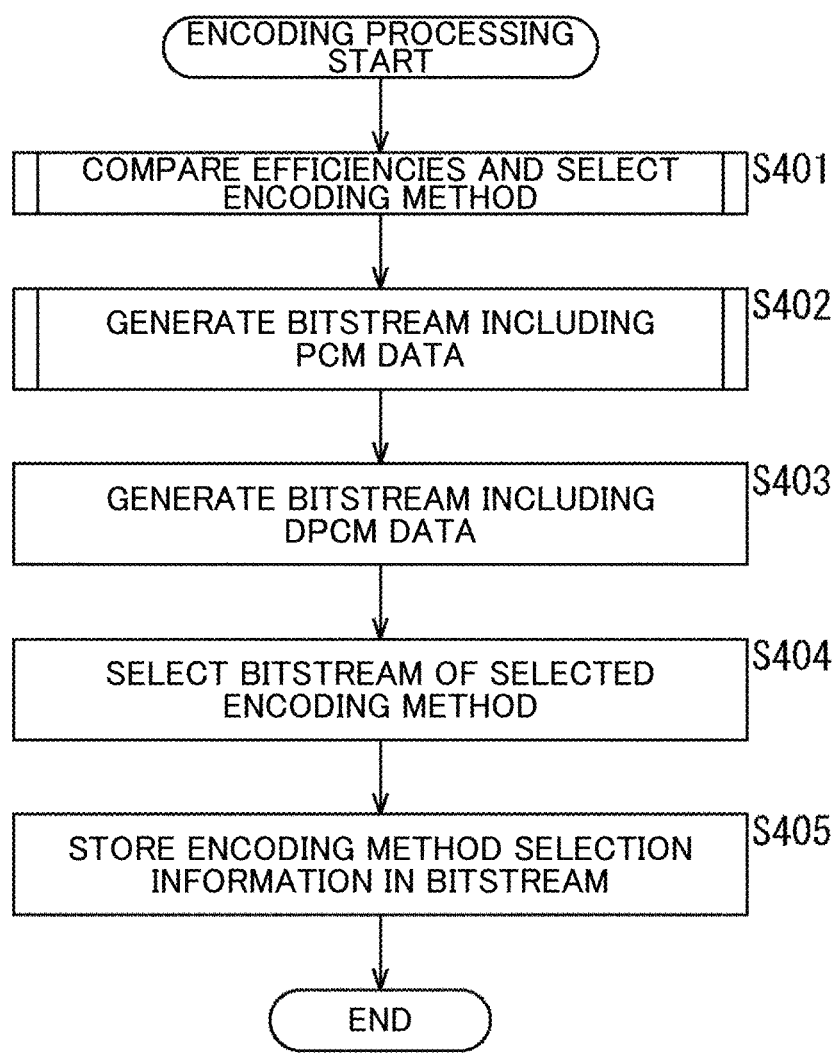
FIG. 27 is a flowchart illustrating an example of the flow of encoding processing.

When the encoding processing starts, in step S401 of FIG. 27, the efficiency comparison unit 401 compares the efficiencies and selects an encoding method.

In step S402, the encoding unit 402 encodes the input data having applied the VMP-applied PCM mode, and generates a bitstream including PCM data (valid data).

In step S403, the encoding unit 403 encodes the input data having applied the DPCM mode, and generates a bitstream including DPCM data.

In step S404, the selection unit 404 selects the bitstream of the encoding method selected in step S402, from among the bitstream generated through the processing of step S402 and the bitstream generated through the processing of step S403.

In step S405, the multiplexing unit 405 stores the encoding method selection information in the bitstream by multiplexing the encoding method selection information indicating the encoding method selected in step S401 and the bitstream selected in step S404.

When the processing of step S405 ends, the encoding processing ends.

By executing the encoding processing as described above, the encoding device 400 can encode the input data having selectively applied a plurality of encoding modes (encoding methods), including the VMP-applied PCM mode, based on the efficiency of each encoding mode. Accordingly, the encoding device 400 can apply a more efficient encoding mode, which makes it possible to further suppress a drop in the encoding efficiency.

<Coverage Comparison>

A method for comparing the efficiency, performed by the efficiency comparison unit 401, will be described next. Any method may be used to compare the efficiency. For example, when applying Method 1-2-2, the coverage, which indicates the amount of bits that have been successfully transmitted through encoding and decoding, may be compared (Method 1-2-2-1), as indicated in the ninth row from the top of the table in FIG. 4. In a normal PCM mode, the coverage is a fixed value. However, in the VMP-applied PCM mode, the coverage can vary according to the VMP, which depends on the input data. An optimal selection can therefore be made by performing the calculation each time. For example, the efficiency comparison unit 401 may compare amounts of bits that can be transmitted by each of the candidates.

Figure 28:
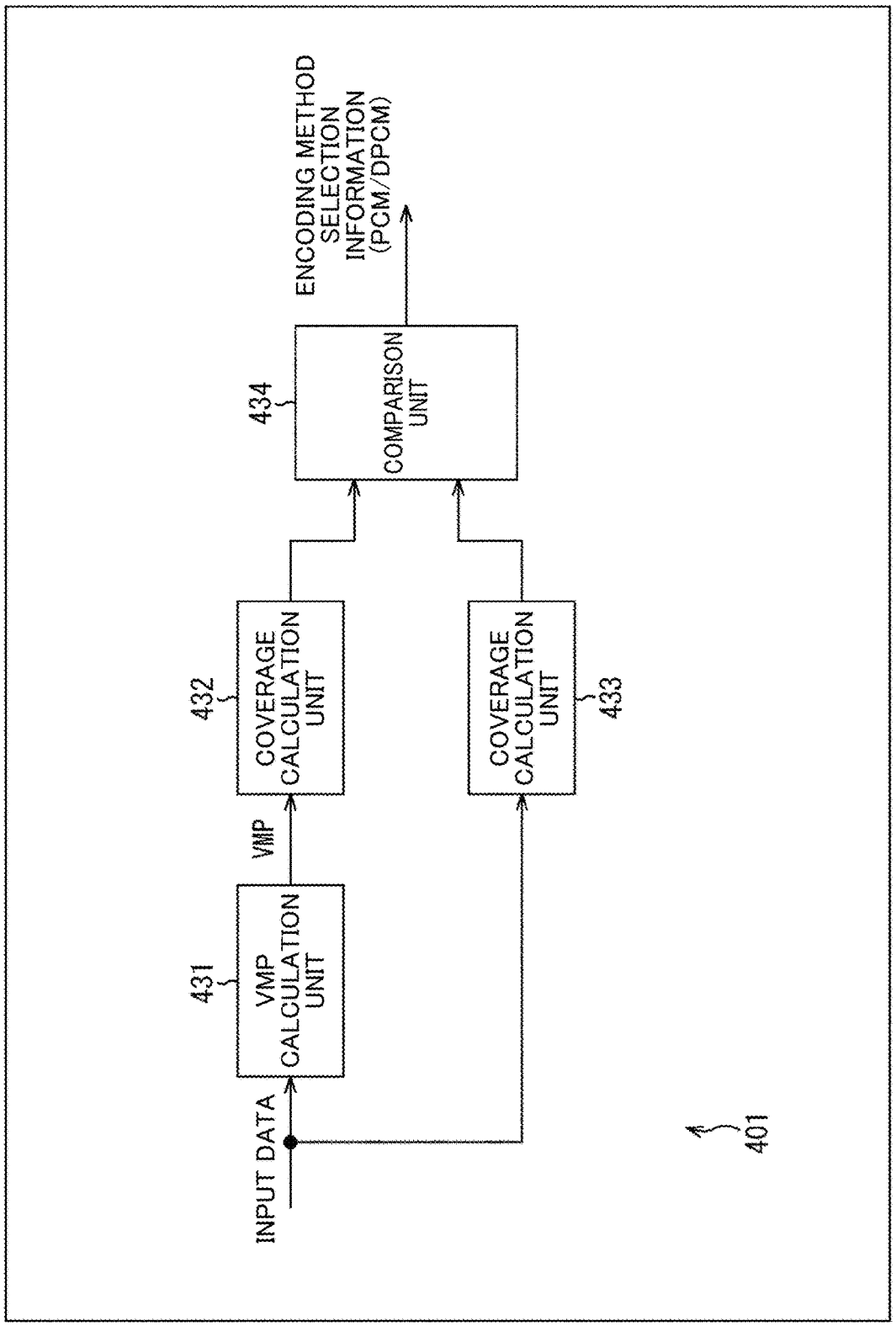
FIG. 28 is a block diagram illustrating an example of the main configuration of an efficiency comparison unit.

FIG. 28 is a block diagram illustrating an example of the main configuration of the efficiency comparison unit 401 in this case. In FIG. 28, the efficiency comparison unit 401 includes a VMP calculation unit 431, a coverage calculation unit 432, a coverage calculation unit 433, and a comparison unit 434.

The VMP calculation unit 431 obtains the valid most significant bit position (VMP) for the supplied input data. For example, if the input data is straight binary, the VMP calculation unit 431 is a processing unit similar to the VMP calculation unit 101, and performs similar processing. If the input data is two's complement binary, the VMP calculation unit 431 is a processing unit similar to the VMP calculation unit 201, and performs similar processing. If the input data is offset binary, the VMP calculation unit 431 is a processing unit similar to the VMP calculation unit 301, and performs similar processing. The VMP calculation unit 431 can therefore also be called a "valid most significant bit position detection unit". The VMP calculation unit 431 supplies information indicating the detected VMP to the coverage calculation unit 432. The efficiency comparison unit 401 may share a single VMP calculation unit with the encoding unit 402. In other words, the information indicating the VMP obtained by the VMP calculation unit 431 may be supplied to the encoding unit 402. Alternatively, the VMP calculation unit 431 may be omitted, and the information indicating the VMP detected by the VMP calculation unit in the encoding unit 402 may be supplied to the coverage calculation unit 432.

The coverage calculation unit 432 calculates the coverage in the case of the VMP-applied PCM mode based on the information indicating the VMP supplied by the VMP calculation unit 431. The coverage calculation unit 432 supplies the calculated coverage to the comparison unit 434.

The coverage calculation unit 433 calculates the coverage in the case of the DPCM mode based on the input data. The coverage calculation unit 433 supplies the calculated coverage to the comparison unit 434.

The comparison unit 434 compares the coverage in the case of the VMP-applied PCM mode, supplied by the coverage calculation unit 432, with the coverage in the case of the DPCM mode, supplied by the coverage calculation unit 433, and supplies the encoding method selection information, which indicates the more efficient encoding mode, to the selection unit 404 and the multiplexing unit 405.

By comparing the coverage in this manner, the efficiency comparison unit 401 can select the more efficient encoding mode.

Figure 29:
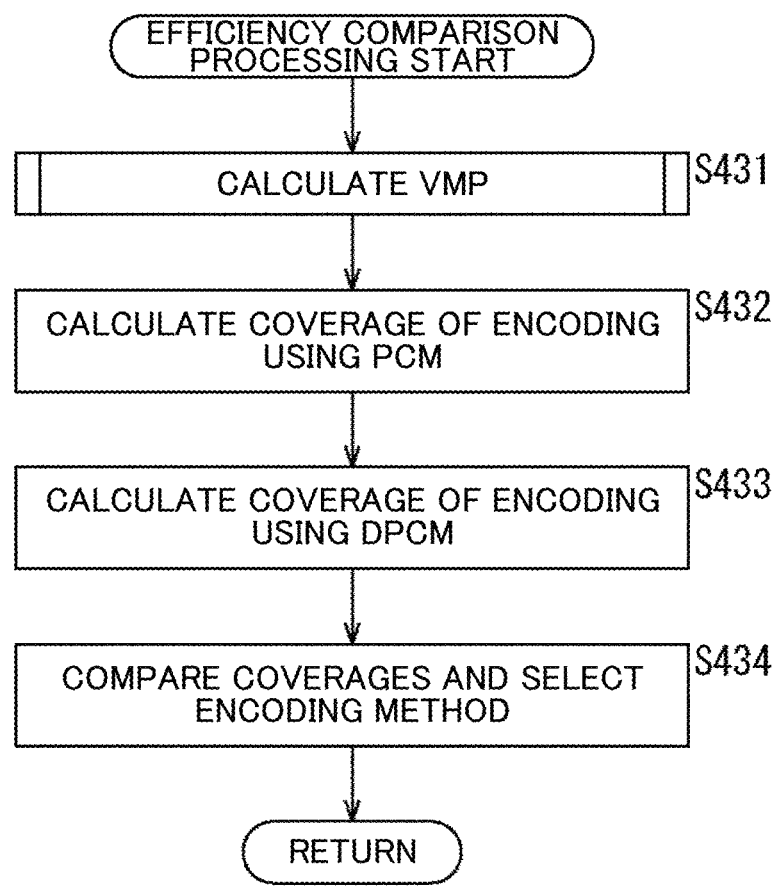
FIG. 29 is a flowchart illustrating an example of the flow of efficiency comparison processing.

An example of the flow of the efficiency comparison processing executed in step S401 of FIG. 27 will be described with reference to the flowchart in FIG. 29.

When the efficiency comparison processing starts, in step S431, the VMP calculation unit 431 of the efficiency comparison unit 401 calculates the VMP of the input data. For example, if the input data is straight binary, the VMP calculation unit 431 executes the VMP calculation processing in the flow described with reference to the flowchart in FIG. 9. If the input data is two's complement binary, the VMP calculation unit 431 executes the VMP calculation processing in the flow described with reference to the flowchart in FIG. 16. If the input data is offset binary, the VMP calculation unit 431 executes the VMP calculation processing in the flow described with reference to the flowchart in FIG. 22.

In step S432, the coverage calculation unit 432 calculates the coverage in the case of the VMP-applied PCM mode, in which encoding using PCM is performed, based on the VMP calculated in step S431.

In step S433, the coverage calculation unit 433 calculates the coverage in the case of the DPCM mode, in which encoding using DPCM is performed, based on the VMP calculated in step S431.

In step S434, the comparison unit 434 compares the coverage calculated in step S432 with the coverage calculated in step S433, and selects the more efficient encoding method.

Once the processing of step S434 ends, the efficiency comparison processing ends, and the processing returns to FIG. 27.

By executing the efficiency comparison processing as described above, the efficiency comparison unit 401 can select the more efficient encoding mode.

<Rate Distortion Comparison>

For example, when applying Method 1-2-2, the rate distortion, which indicates the magnitude of distortion that can arise during encoding and decoding, may be compared (Method 1-2-2-2), as indicated in the tenth row from the top of the table in FIG. 4. In a normal PCM mode, the rate distortion is a fixed value. However, in the VMP-applied PCM mode, the rate distortion can vary according to the VMP, which depends on the input data. An optimal selection can therefore be made by performing the calculation each time.

For example, the efficiency comparison unit 401 may compare the rate distortion of the candidates.

Figure 30:
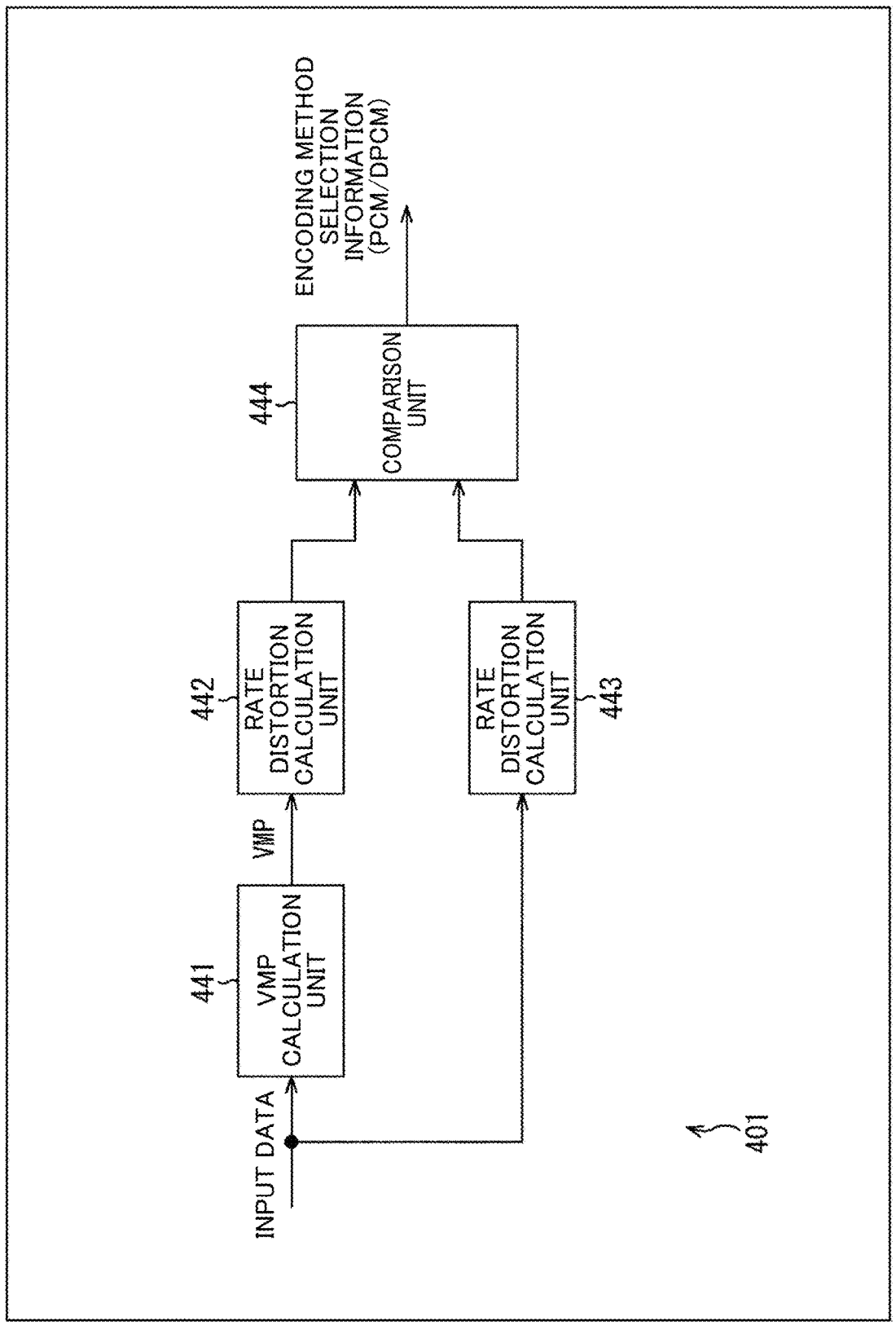
FIG. 30 is a block diagram illustrating an example of the main configuration of an efficiency comparison unit.

FIG. 30 is a block diagram illustrating an example of the main configuration of the efficiency comparison unit 401 in this case. In FIG. 30, the efficiency comparison unit 401 includes a VMP calculation unit 441, a rate distortion calculation unit 442, a rate distortion calculation unit 443, and a comparison unit 444.

The VMP calculation unit 441 is a processing unit similar to the VMP calculation unit 431, and executes similar processing. In other words, the VMP calculation unit 441 obtains the valid most significant bit position (VMP) for the supplied input data. The VMP calculation unit 441 can therefore also be called a "valid most significant bit position detection unit". The VMP calculation unit 441 supplies information indicating the detected VMP to the rate distortion calculation unit 442.

In this case too, the efficiency comparison unit 401 may share a single VMP calculation unit with the encoding unit 402.

The rate distortion calculation unit 442 calculates the rate distortion in the case of the VMP-applied PCM mode based on the information indicating the VMP supplied by the VMP calculation unit 441. The rate distortion calculation unit 442 supplies the calculated rate distortion to the comparison unit 444.

The rate distortion calculation unit 443 calculates the rate distortion in the case of the DPCM mode based on the input data. The rate distortion calculation unit 443 supplies the calculated rate distortion to the comparison unit 444.

The comparison unit 444 compares the rate distortion in the case of the VMP-applied PCM mode, supplied by the rate distortion calculation unit 442, with the rate distortion in the case of the DPCM mode, supplied by the rate distortion calculation unit 443, and supplies the encoding method selection information, which indicates the more efficient encoding mode, to the selection unit 404 and the multiplexing unit 405.

By comparing the rate distortion in this manner, the efficiency comparison unit 401 can select the more efficient encoding mode.

Figure 31:
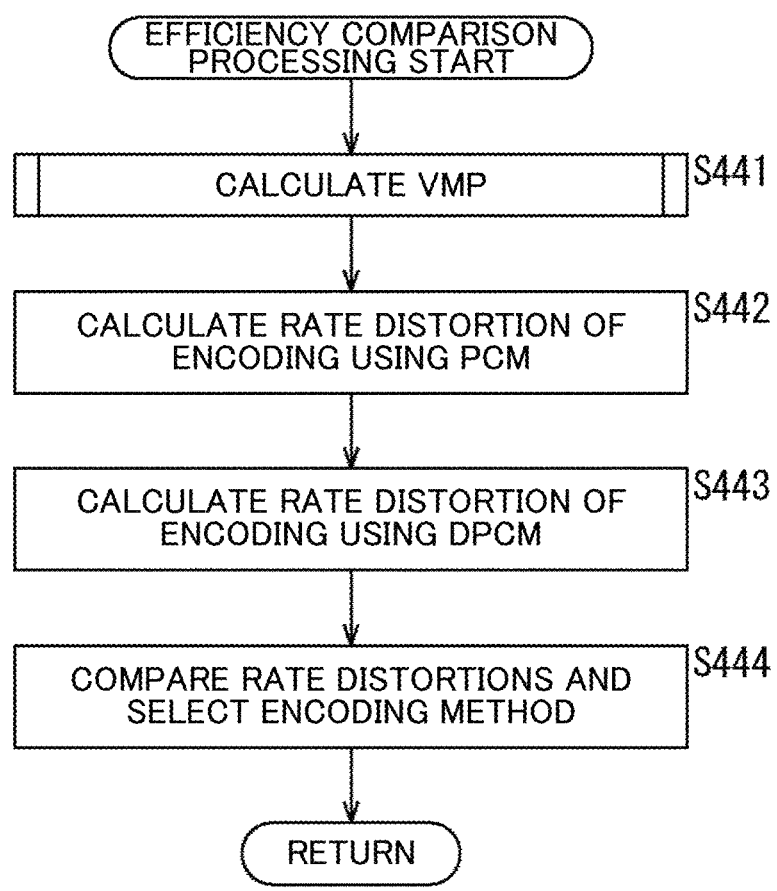
FIG. 31 is a flowchart illustrating an example of the flow of efficiency comparison processing.

An example of the flow of the efficiency comparison processing executed in step S401 of FIG. 27 will be described with reference to the flowchart in FIG. 31.

When the efficiency comparison processing starts, in step S441, the VMP calculation unit 441 of the efficiency comparison unit 401 calculates the VMP of the input data. For example, if the input data is straight binary, the VMP calculation unit 441 executes the VMP calculation processing in the flow described with reference to the flowchart in FIG. 9. If the input data is two's complement binary, the VMP calculation unit 441 executes the VMP calculation processing in the flow described with reference to the flowchart in FIG. 16. If the input data is offset binary, the VMP calculation unit 441 executes the VMP calculation processing in the flow described with reference to the flowchart in FIG. 22.

In step S442, the rate distortion calculation unit 442 calculates the rate distortion in the case of the VMP-applied PCM mode, in which encoding using PCM is performed, based on the VMP calculated in step S441.

In step S443, the rate distortion calculation unit 443 calculates the rate distortion in the case of the DPCM mode, in which encoding using DPCM is performed, based on the VMP calculated in step S441.

In step S444, the comparison unit 444 compares the rate distortion calculated in step S452 with the rate distortion calculated in step S443, and selects the more efficient encoding method.

Once the processing of step S444 ends, the efficiency comparison processing ends, and the processing returns to FIG. 27.

By executing the efficiency comparison processing as described above, the efficiency comparison unit 401 can select the more efficient encoding mode.

<Comparison of Other Parameters>

For example, when applying Method 1-2-2, parameters designated by the system or the like may be compared (Method 1-2-2-3), as indicated in the eleventh row from the top of the table in FIG. 4. For example, the efficiency comparison unit 401 may compare the designated parameters for each of the candidates.

<Decoding Device>

The present technique can be applied in a decoding device. For example, the extraction unit may further extract, from the bitstream, information indicating the encoding method applied to the data unit. The information processing device may further include a decoding unit that generates the data unit by extracting encoded data of the data unit from the bitstream and decoding the encoded data using a decoding method corresponding to a second encoding method different from a first encoding method, the first encoding method using pulse code modulation. The information processing device may further include a data unit selection unit that selects a data unit. If the data unit selection unit selects the first encoding method based on the information indicating the encoding method applied to the data unit, the data unit generated by the data unit generation unit may be selected. If the data unit selection unit selects the second encoding method based on the information indicating the encoding method applied to the data unit, the data unit generated by the decoding unit may be selected.

The second encoding method may be an encoding method using differential pulse code modulation. Additionally, the decoding unit may generate the data unit by adding a reference sample included in the encoded data with one of differences between two of the samples, and repeatedly adding a result of the adding to another one of the differences in a recursive manner.

Figure 32:
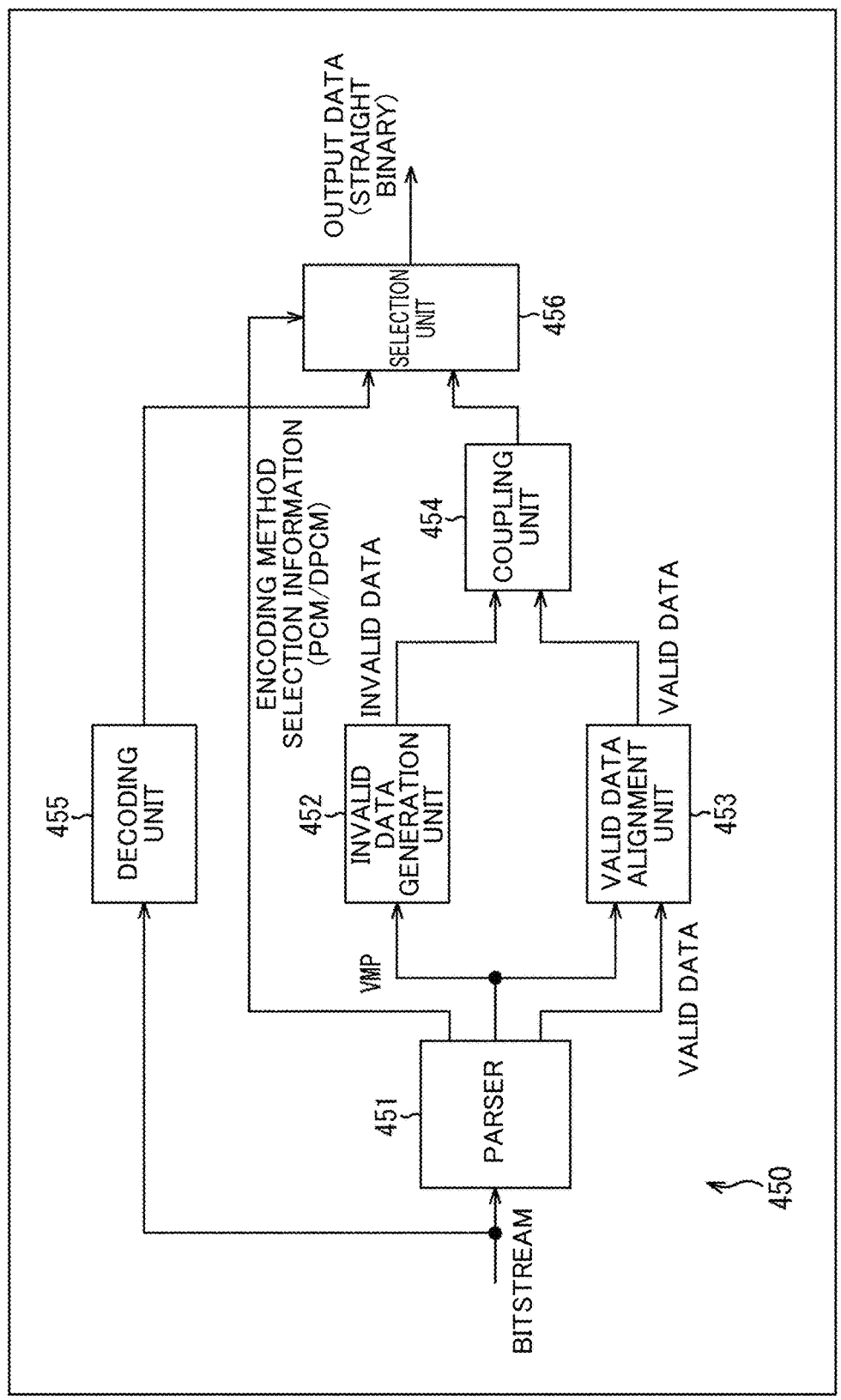
FIG. 32 is a block diagram illustrating an example of the main configuration of a decoding device.

FIG. 32 is a block diagram illustrating an example of the configuration of a decoding device serving as one aspect of an information processing device in which the present technique is applied. Note that FIG. 32 illustrates the main processing units, data flows, and the like, and the items illustrated in FIG. 32 are not necessarily all the items. That is, processing units not illustrated in FIG. 32 as blocks and processing and data flows not illustrated in FIG. 32 as arrows or the like may be present in a decoding device 450.

The decoding device 450 illustrated in FIG. 32 is a device that decodes a bitstream generated by the encoding device 400, restores input data to the state the data was in before being encoded by the encoding device 400, and outputs the input data as output data. At this time, the decoding device 450 performs the decoding by applying the present technique (Method 1-2 and Method 1-2-1). In other words, of the VMP-applied PCM mode and the DPCM mode, the decoding device 450 selects the mode applied by the encoding device 400 and decodes the bitstream by applying the selected encoding mode.

Note that the bitstream supplied to the decoding device 450 is a bitstream of encoded data in which data of any binary type is encoded. For example, the binary type may be straight binary. The binary type may also be two's complement binary. Alternatively, the binary type may be offset binary. FIG. 32 illustrates a case where a bitstream of encoded data obtained by encoding straight binary data is decoded.

As illustrated in FIG. 32, the decoding device 450 includes a parser 451, an invalid data generation unit 452, a valid data alignment unit 453, a coupling unit 454, a decoding unit 455, and a selection unit 456. The bitstream to be decoded is supplied to the parser 451 or the decoding unit 455. The bitstream has a configuration such as that of the bitstream 421 illustrated in FIG. 26.

The parser 451 analyzes the bitstream and extracts (i) the encoding method selection information, (ii) information indicating the valid most significant bit position (VMP), and (iii) valid data. In other words, the parser 451 extracts, from the bitstream, (i) information indicating the valid most significant bit position, which is the position of the most significant bit among the bits having a value different from the bit pattern according to the binary type, in a data unit constituted by a plurality of samples, (ii) information indicating the encoding method applied to that data unit, and (iii) valid data, which is a bit string below the valid most significant bit position in each sample. That is, the parser 451 can also be called an "extraction unit". The parser 451 supplies the extracted information indicating the VMP to the invalid data generation unit 452 and the valid data alignment unit 453. The parser 451 also supplies the extracted valid data to the valid data alignment unit 453. The parser 451 also supplies the extracted encoding method selection information to the selection unit 456.

The invalid data generation unit 452 generates invalid data using the information indicating the VMP, supplied from the parser 451. The bitstream input to the decoding device 450 is a bitstream of encoded data in which straight binary data is encoded. Accordingly, the invalid data generation unit 452 generates straight binary invalid data. In other words, the invalid data generation unit 452 generates a bit string of a bit length (MSB-VMP), constituted only by values of "0". The invalid data generation unit 452 supplies the generated invalid data to the coupling unit 454.

Based on the information indicating the VMP supplied from the parser 451, the valid data alignment unit 453 aligns the valid data so that the valid data supplied from the parser 451 is a bit string below the valid most significant bit position (VMP) of the sample. In other words, the valid data alignment unit 453 aligns the most significant bit of the valid data to the VMP (sets the position of the most significant bit of the valid data to the VMP). The valid data alignment unit 453 supplies the aligned valid data to the coupling unit 454.

The coupling unit 454 generates a straight binary sample by coupling the invalid data supplied from the invalid data generation unit 452 with the aligned valid data supplied from the valid data alignment unit 453. The coupling unit 454 performs the same processing for each sample to generate a straight binary data unit. In other words, the coupling unit 454 can also be called a "data unit generation unit". The coupling unit 454 supplies the generated straight binary data unit to the selection unit 456.

The decoding unit 455 generates the data unit by extracting the encoded data of the data unit from the supplied bitstream and decoding the encoded data using a decoding method corresponding to the second encoding method different from the first encoding method that uses pulse code modulation (the VMP-applied PCM mode). The second encoding method is an encoding method using differential pulse code modulation, for example (the DPCM mode). The decoding unit 455 generates (restores) the straight binary data unit by adding a reference sample included in the encoded data with one of differences between two of the samples, and repeatedly adding a result of the adding to another one of the differences in a recursive manner. The decoding unit 455 supplies the generated straight binary data unit to the selection unit 456.

Of the data unit supplied by the coupling unit 454 and the data unit supplied by the decoding unit 455, the selection unit 456 selects the data unit that has been decoded using the decoding method corresponding to the encoding method indicated by the encoding method selection information. For example, if the VMP-applied PCM mode is designated by the encoding method selection information, the selection unit 456 selects the data unit supplied by the coupling unit 454, and outputs that data unit as output data to the exterior of the decoding device 450. If the DPCM mode is designated by the encoding method selection information, the selection unit 456 selects the data unit supplied by the decoding unit 455, and outputs that data unit as output data to the exterior of the decoding device 450.

In this manner, the decoding device 450 can decode the bitstream by applying the decoding method corresponding to the encoding method designated by the encoding method selection information included in the bitstream to be decoded (the encoding method applied in the encoding), so as to handle a plurality of encoding modes (encoding methods) including the VMP-applied PCM mode. In other words, the encoding device 400 applies the more efficient encoding method, and the decoding device 450 can correctly decode the encoded data using the decoding method corresponding to that encoding method. Accordingly, the decoding device 450 can apply a more efficient encoding mode, which makes it possible to further suppress a drop in the encoding efficiency.

<Flow of Decoding Processing>

An example of a flow of the decoding processing executed by the decoding device 450 will be described with reference to the flowchart in FIG. 33.

Figure 33:
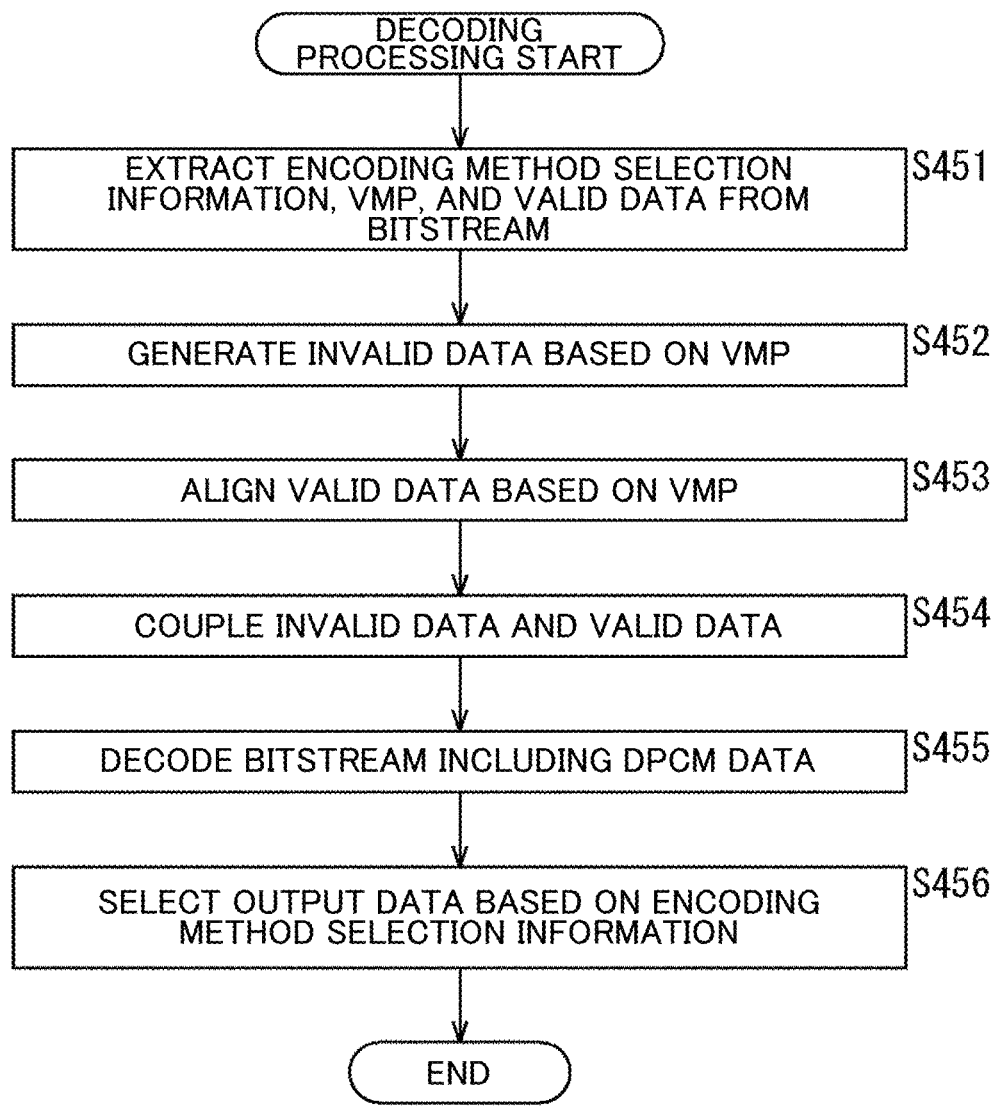
FIG. 33 is a flowchart illustrating an example of the flow of decoding processing.

When the decoding processing starts, in step S451 of FIG. 33, the parser 451 of the decoding device 450 extracts, from the supplied bitstream, the encoding method selection information, information indicating the VMP, and the valid data.

In step S452, the invalid data generation unit 452 generates the straight binary invalid data based on the information indicating the VMP extracted in step S451.

In step S453, the valid data alignment unit 453 aligns the valid data extracted in step S451 based on the information indicating the VMP extracted in step S451.

In step S454, the coupling unit 454 generates a data unit by coupling the invalid data generated in step S452 with the valid data aligned in step S453.

In step S455, the decoding unit 455 decodes the bitstream in DPCM mode and generates a data unit.

In step S456, the selection unit 456 selects the output data based on the encoding method selection information extracted in step S451. In other words, of the data unit generated in step S454 and the data unit generated in step S455, the selection unit 456 selects, as output data, the data unit corresponding to the encoding method designated by the encoding method selection information extracted in step S451. The selection unit 456 outputs the selected data unit as output data to the exterior of the decoding device 450.

Once the processing of step S456 ends, the decoding processing ends.

By executing the decoding processing as described above, the decoding device 450 can decode the bitstream by applying the decoding method corresponding to the encoding method designated by the encoding method selection information included in the bitstream to be decoded (the encoding method applied in the encoding), so as to handle a plurality of encoding modes (encoding methods) including the VMP-applied PCM mode. In other words, the encoding device 400 applies the more efficient encoding method, and the decoding device 450 can correctly decode the encoded data using the decoding method corresponding to that encoding method. Accordingly, the decoding device 450 can apply a more efficient encoding mode, which makes it possible to further suppress a drop in the encoding efficiency.

Application Example

Although the foregoing has described a case where the binary type is straight binary, any binary type may be used, such as two's complement binary or offset binary, for example.

Additionally, although the foregoing has described an example in which the DPCM mode is the second encoding method to be combined with the VMP-applied PCM mode, which is the first encoding method, the second encoding method and may be any method, and may be a method aside from DPCM. For example, conversion encoding based on frequency conversion, such as Discrete Cosine Transform (DCT), Wavelet, or the like, may be applied as the second encoding method. In addition, encoding based on motion prediction and frequency conversion, such as Moving Picture Experts Group (MPEG), Advanced Video Coding (AVC), High Efficiency Video Coding (HEVC), or the like, may be applied as the second encoding method.

<2-5. Handling Plurality of Binary Types>

When Method 1 is applied, the encoding device or the decoding device corresponding to the VMP-applied PCM mode described above (i.e., the encoding device capable of encoding in the VMP-applied PCM mode or the decoding device capable of decoding in the VMP-applied PCM mode) may handle a plurality of binary types, as indicated in the twelfth row from the top of the table in FIG. 4 (Method 1-3).

<2-5-1. Designation of Binary Type by System>

For example, when Method 1-3 is applied, the binary type of the input data or the output data may be designated by the system (Method 1-3-1).

<2-5-1-1. VMP-Applied PCM Mode>

For example, an information processing device that performs processing in the VMP-applied PCM mode may handle a plurality of binary types and process data of the binary type designated by the system.

<Encoding Device>

The present technique can be applied in an encoding device, for example. For example, the encoding device that encodes data in the VMP-applied PCM mode described in Method 1-1 (including Method 1-1-1 to Method 1-1-3) may handle a plurality of binary types and encode input data of the binary type designated by the system.

For example, the most significant bit position detection unit of the information processing device may detect the valid most significant bit position (VMP) through a method according to the binary type designated by the system or the like.

Figure 34:
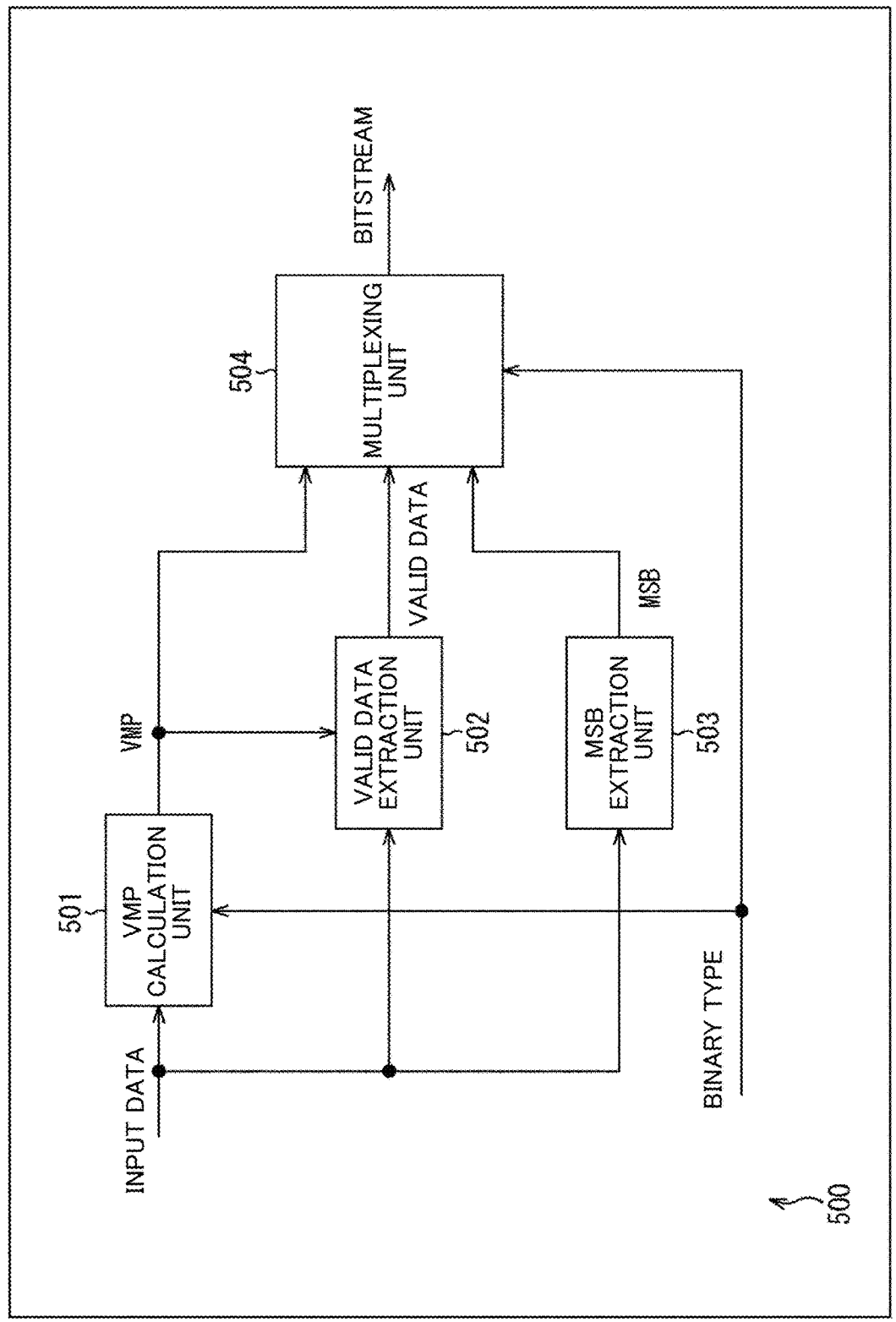
FIG. 34 is a block diagram illustrating an example of the main configuration of an encoding device.

FIG. 34 is a block diagram illustrating an example of the configuration of an encoding device serving as one aspect of an information processing device to which the present technique is applied. Note that FIG. 34 illustrates the main processing units, data flows, and the like, and the items illustrated in FIG. 34 are not necessarily all the items. In other words, an encoding device 500 may include processing units not illustrated as blocks in FIG. 34, and processing and data flows not indicated as arrows or the like in FIG. 34.

The encoding device 500 illustrated in FIG. 34 is a device that encodes input data supplied for each of data units, the data unit being a predetermined unit of data constituted by a plurality of samples, and outputs the resulting encoded data as a bitstream. At this time, the encoding device 400 performs the encoding by applying the present technique (Method 1-3-1). In other words, the encoding device 500 encodes input data of the binary type designated by the system.

As illustrated in FIG. 34, the encoding device 500 includes a VMP calculation unit 501, a valid data extraction unit 502, an MSB extraction unit 503, and a multiplexing unit 504. The input data to be encoded is supplied to the VMP calculation unit 501, the valid data extraction unit 502, and the MSB extraction unit 503 for each data unit.

The VMP calculation unit 501 obtains the valid most significant bit position (VMP) for the supplied input data. In other words, the VMP calculation unit 501 detects the valid most significant bit position (VMP), which is the position of the most significant bit among the bits having a value different from the bit pattern according to the binary type, in a data unit constituted by a plurality of samples. The system designates the binary type of the input data for the VMP calculation unit 501. The VMP calculation unit 501 detects the VMP through a method according to the designated binary type.

Any binary type may be used. For example, the binary may be straight binary, two's complement binary, or offset binary. For example, if straight binary is designated, the VMP calculation unit 501 detects the VMP by executing the VMP calculation processing in the flow described with reference to the flowchart in FIG. 9. In other words, the position of the most significant bit among bits having a value of "1" is detected as the VMP. If two's complement binary is designated, the VMP calculation unit 501 detects the VMP by executing the VMP calculation processing in the flow described with reference to the flowchart in FIG. 16. In other words, the position of the most significant bit among bits having a value different from the value of the most significant bit in the sample is detected as the VMP. If offset binary is designated, the VMP calculation unit 501 detects the VMP by executing the VMP calculation processing in the flow described with reference to the flowchart in FIG. 22. In other words, the position of the most significant bit among bits having a value that is the same as the value of the most significant bit in the sample is detected as the VMP.

The VMP calculation unit 501 supplies information indicating the detected VMP to the valid data extraction unit 502 and the multiplexing unit 504.

The valid data extraction unit 502 extracts the bit string below the VMP from each sample of the input data as the valid data, based on the information supplied by the VMP calculation unit 501. The valid data extraction unit 502 supplies the extracted valid data to the multiplexing unit 504.

The MSB extraction unit 503 extracts the most significant bit (MSB) of each sample from the supplied input data. The MSB extraction unit 503 supplies the bit plane of the extracted MSB to the multiplexing unit 504.

The multiplexing unit 504 generates a bitstream by appropriately multiplexing (i) information indicating the VMP, supplied by the VMP calculation unit 501, (ii) the valid data supplied by the valid data extraction unit 502, and (iii) the MSB bit plane (the MSB of each sample) supplied by the MSB extraction unit 503. The multiplexing unit 204 can therefore also be called a "bitstream generation unit". The system designates the binary type of the input data for the multiplexing unit 504. The multiplexing unit 504 detects the VMP through a method according to the designated binary type.

For example, if straight binary is designated, the multiplexing unit 504 multiplexes the information indicating the VMP and the valid data to generate a bitstream including those elements. In other words, the multiplexing unit 504 generates the bitstream 130 (FIG. 7). If two's complement binary or offset binary is designated, the multiplexing unit 504 multiplexes the information indicating the VMP, the bit plane of the MSB, and the valid data to generate a bitstream including those elements. In other words, if two's complement binary is designated, the multiplexing unit 504 generates the bitstream 230 (FIG. 14). If offset binary is designated, the multiplexing unit 504 generates the bitstream 330 (FIG. 20).

The multiplexing unit 504 outputs the bitstream generated as described above to the exterior of the encoding device 500.

In this manner, the encoding device 500 encodes input data of the binary type designated by the system or the like in the VMP-applied PCM mode. This makes it possible for the encoding device 500 to encode input data in a broader range of binary types. Additionally, the encoding device 500 can suppress the transmission of invalid data (reduce the transmission amount of invalid data) in the encoding. Accordingly, the encoding device 500 can suppress a drop in encoding efficiency more than when encoding all bits of each sample in the PCM mode. As described above, the invalid data has a bit pattern according to the binary type, and can therefore be restored without respect to the valid data. In other words, the encoding device 500 can suppress a drop in the encoding efficiency through a lossless method. Note that the encoding device 500 may quantize the valid data extracted by the valid data extraction unit 502. This makes it possible for the encoding device 500 to further suppress a drop in the encoding efficiency.

<Flow of Encoding Processing>

An example of the flow of encoding processing executed by the encoding device 500 will be described with reference to the flowchart in FIG. 35.

Figure 35:
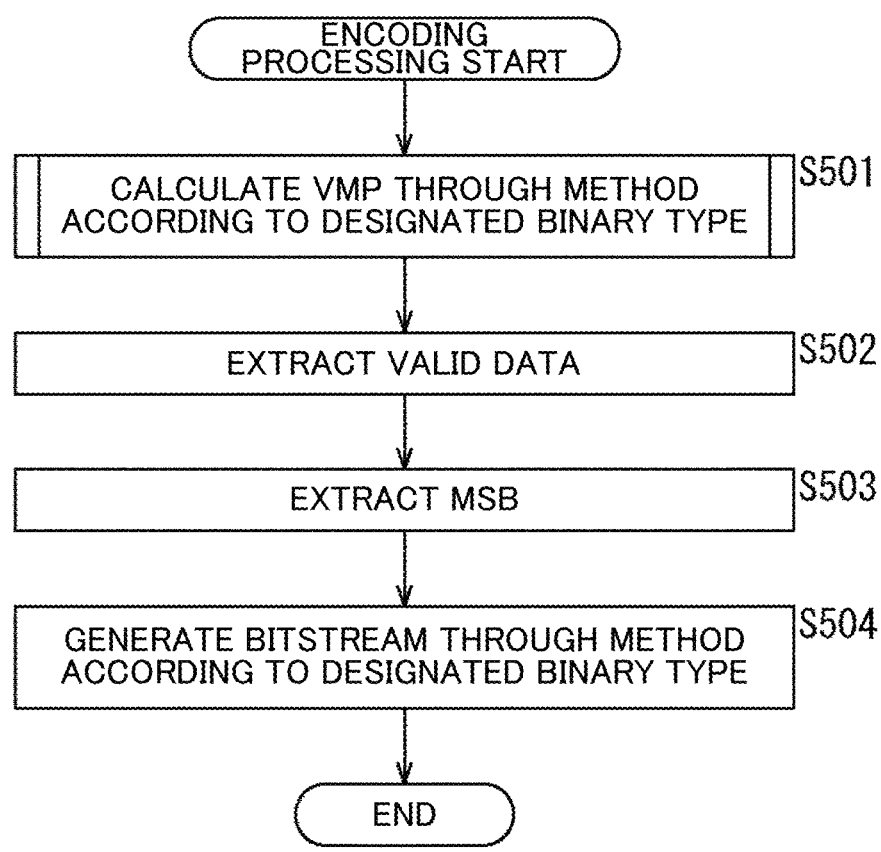
FIG. 35 is a flowchart illustrating an example of the flow of encoding processing.

When the encoding processing starts, in step S501 of FIG. 35, the VMP calculation unit 501 calculates the valid most significant bit position (VMP) of the input data of the binary type designated by the system or the like through a method according to the binary type. For example, if straight binary is designated, the VMP calculation unit 501 executes the VMP calculation processing in the flow described with reference to the flowchart in FIG. 9. If two's complement binary is designated, the VMP calculation unit 501 executes the VMP calculation processing in the flow described with reference to the flowchart in FIG. 16. If offset binary is designated, the VMP calculation unit 501 executes the VMP calculation processing in the flow described with reference to the flowchart in FIG. 22.

In step S502, the valid data extraction unit 502 extracts valid data (the bit string below the VMP) from the input data based on the VMP calculated in step S501.

In step S503, the MSB extraction unit 503 extracts the MSB of each sample (the bit plane of the MSB).

In step S504, the multiplexing unit 504 generates the bitstream through a method according to the binary type designated by the system or the like. For example, if straight binary is designated, the multiplexing unit 504 multiplexes the information indicating the VMP calculated in step S501 and the valid data extracted in step S502 to generate a bitstream including those elements. In other words, the multiplexing unit 504 generates the bitstream 130 (FIG. 7). If two's complement binary or offset binary is designated, the multiplexing unit 504 multiplexes the information indicating the VMP calculated in step S501, the bit plane of the MSB extracted in step S503, and the valid data extracted in step S502 to generate a bitstream including those elements. In other words, if two's complement binary is designated, the multiplexing unit 504 generates the bitstream 230 (FIG. 14). If offset binary is designated, the multiplexing unit 504 generates the bitstream 330 (FIG. 20). The multiplexing unit 504 outputs the generated bitstream to the exterior of the encoding device 500.

When the processing of step S504 ends, the encoding processing ends. Executing the encoding processing as described above makes it possible for the encoding device 500 to encode input data in a broader range of binary types.

<Decoding Device>

The present technique can be applied in a decoding device, for example. For example, a decoding device that decodes data in the VMP-applied PCM mode described in Method 1-1 (including Method 1-1-1 to Method 1-1-3) may handle a plurality of binary types, and may decode a bitstream and generate output data of the binary type designated by the system.

For example, the invalid data generation unit of the information processing device may generate the invalid data constituted by a bit pattern according to the binary type that has been designated.

Figure 36:
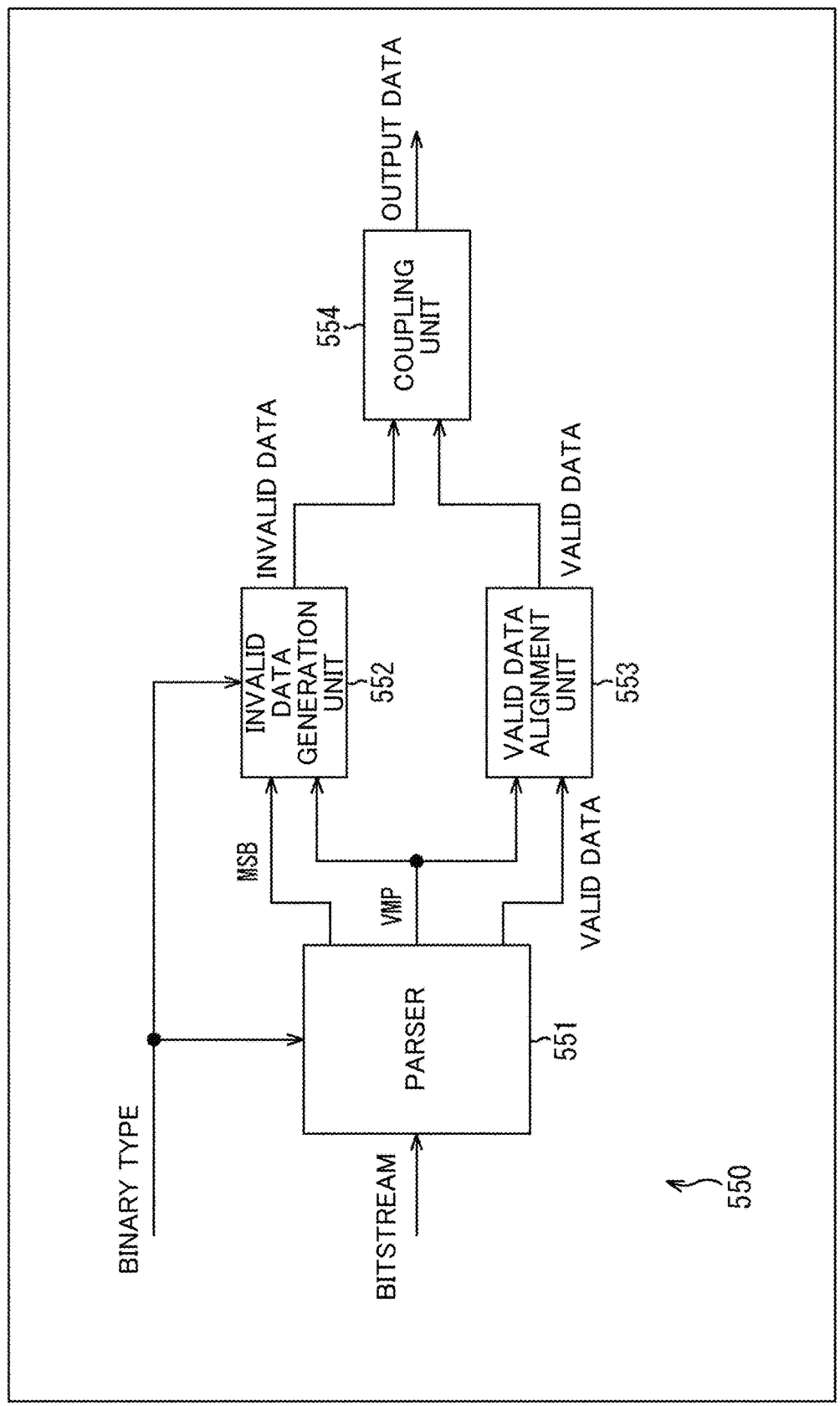
FIG. 36 is a block diagram illustrating an example of the main configuration of a decoding device.

FIG. 36 is a block diagram illustrating an example of the configuration of a decoding device serving as one aspect of an information processing device in which the present technique is applied. Note that FIG. 36 illustrates the main processing units, data flows, and the like, and the items illustrated in FIG. 36 are not necessarily all the items. That is, processing units not illustrated in FIG. 34 as blocks and processing and data flows not illustrated in FIG. 34 as arrows or the like may be present in a decoding device 550.

The decoding device 550 illustrated in FIG. 36 is a device that decodes a bitstream generated by the encoding device 500, restores input data to the state the data was in before being encoded by the encoding device 500, and outputs the input data as output data. At this time, the decoding device 550 performs the decoding by applying the present technique (Method 1-3-1). In other words, the decoding device 550 decodes a bitstream in which input data of the binary type designated by the system has been encoded in the VMP-applied PCM mode.

As illustrated in FIG. 36, the decoding device 550 includes a parser 551, an invalid data generation unit 552, a valid data alignment unit 553, and a coupling unit 554. For example, the bitstream output from the encoding device 500 (a bitstream encoded in the VMP-applied PCM mode) is supplied to the parser 551.

The parser 551 analyzes the bitstream and extracts information corresponding to the binary type designated by the system. That is, the parser 551 can also be called an "extraction unit". Any binary type may be used. For example, the binary may be straight binary, two's complement binary, or offset binary.

For example, if straight binary is designated, the bitstream 130 illustrated in FIG. 7 is supplied to the parser 551. In this case, the parser 551 extracts, from the bitstream, (i) information indicating the valid most significant bit position (VMP) and (ii) valid data. The parser 551 supplies the extracted information indicating the VMP to the invalid data generation unit 552 and the valid data alignment unit 553. The parser 551 also supplies the extracted valid data to the valid data alignment unit 553.

If two's complement binary is designated, the bitstream 230 illustrated in FIG. 14 is supplied to the parser 551. In this case, the parser 551 extracts, from the bitstream, (i) information indicating the valid most significant bit position (VMP), (ii) the bit plane of the MSB, and (iii) valid data. The parser 551 supplies the extracted information indicating the VMP to the invalid data generation unit 552 and the valid data alignment unit 553. The parser 551 also supplies the extracted bit plane of the MSB to the invalid data generation unit 552. The parser 551 also supplies the extracted valid data to the valid data alignment unit 553.

If offset binary is designated, the bitstream 330 illustrated in FIG. 20 is supplied to the parser 551. In this case, the parser 551 extracts, from the bitstream, (i) information indicating the valid most significant bit position (VMP), (ii) the bit plane of the MSB, and (iii) valid data. The parser 551 supplies the extracted information indicating the VMP to the invalid data generation unit 552 and the valid data alignment unit 553. The parser 551 also supplies the extracted bit plane of the MSB to the invalid data generation unit 552. The parser 551 also supplies the extracted valid data to the valid data alignment unit 553.

The invalid data generation unit 552 generates invalid data using the information indicating the VMP, supplied from the parser 551, and the bit plane of the MSB. The invalid data is a bit string contiguous with the most significant bit having a bit pattern according to the binary type. The invalid data generation unit 252 generates the invalid data constituted by a bit pattern according to the binary type designated by the system or the like.

For example, if straight binary is designated, the invalid data generation unit 552 generates invalid data constituted only by values of "0". If two's complement binary is designated, the invalid data generation unit 552 generates invalid data constituted only by values of "0" or only by values of "1". If offset binary is designated, the invalid data generation unit 552 generates invalid data constituted by a value of "0" for the most significant bit and a value of "1" for other bits, or constituted by a value of "1" for the most significant bit and a value of "0" for other bits.

The invalid data generation unit 552 supplies the generated invalid data to the coupling unit 554.

Based on the information indicating the VMP supplied from the parser 551, the valid data alignment unit 553 aligns the valid data so that the valid data supplied from the parser 551 is a bit string below the valid most significant bit position (VMP) of the sample. In other words, the valid data alignment unit 553 aligns the most significant bit of the valid data to the VMP (sets the position of the most significant bit of the valid data to the VMP). The valid data alignment unit 553 supplies the aligned valid data to the coupling unit 554.

The coupling unit 554 generates a sample by coupling the invalid data supplied from the invalid data generation unit 552 with the aligned valid data supplied from the valid data alignment unit 553. The coupling unit 554 performs the same processing for each sample to generate a data unit. In other words, the coupling unit 554 can also be called a "data unit generation unit". The data unit is a data unit of the binary type designated by the system or the like. The coupling unit 554 outputs the data unit as output data to the exterior of the decoding device 550.

In this manner, the decoding device 550 can correctly decode a bitstream in which input data of the binary type designated by the system has been encoded in the VMP-applied PCM mode. In other words, the decoding device 550 can process data of a broader range of binary types. Furthermore, the decoding device 550 can suppress the transmission of invalid data (reduce the transmission amount of invalid data) as described above in this encoding. Accordingly, the decoding device 550 can suppress a drop in encoding efficiency more than when decoding a bitstream in which all bits of each sample have been encoded in the PCM mode. At this time, the invalid data generation unit 552 can restore the invalid data that has not been transmitted, regardless of the valid data. In other words, the decoding device 550 can suppress a drop in the encoding efficiency through a lossless method.

<Flow of Decoding Processing>

An example of a flow of the decoding processing executed by the decoding device 550 will be described with reference to the flowchart in FIG. 37.

Figure 37:
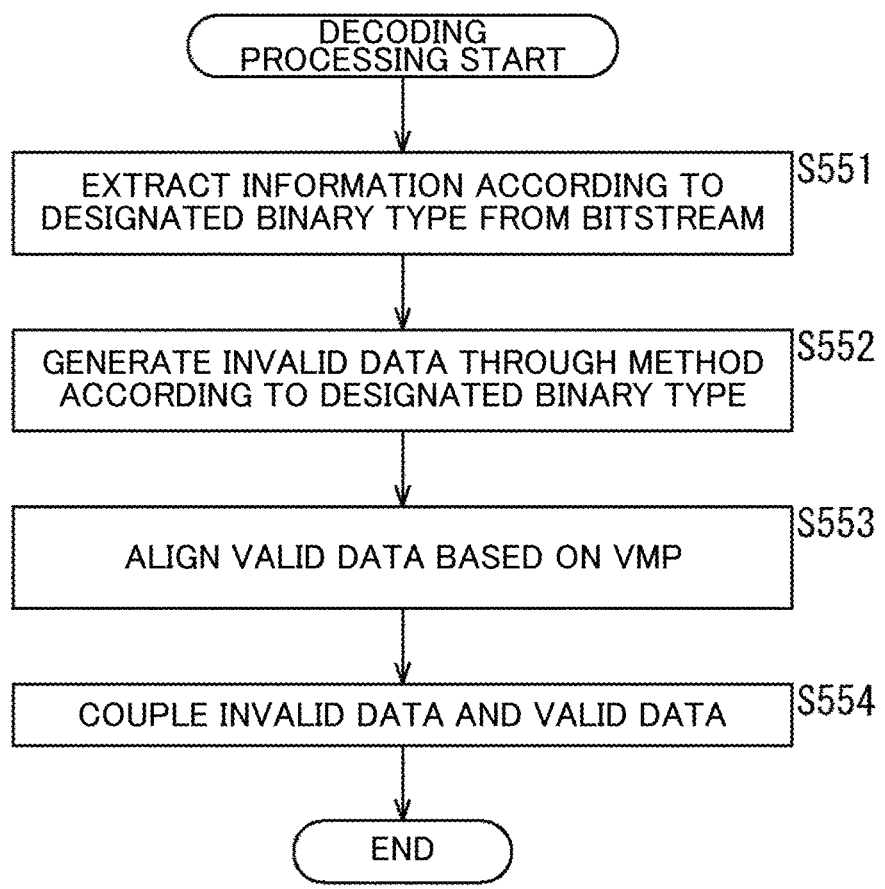
FIG. 37 is a flowchart illustrating an example of the flow of decoding processing.

When the decoding processing starts, in step S551 of FIG. 37, the parser 551 extracts, from the bitstream, information according to the binary type designated by the system or the like.

In step S552, the invalid data generation unit 552 generates the invalid data constituted by a bit pattern according to the binary type that has been designated.

In step S553, the valid data alignment unit 553 aligns the valid data extracted in step S551 with the VMP based on the information indicating the VMP extracted in step S551.

In step S554, the coupling unit 554 generates a sample by coupling the invalid data generated in step S552 with the valid data aligned in step S553. The coupling unit 554 performs this coupling for each sample to generate a data unit. The data unit has the binary type designated by the system or the like. The coupling unit 554 outputs the generated data unit to the exterior of the decoding device 550.

Once the processing of step S554 ends, the decoding processing ends. Executing the decoding processing as described above makes it possible for the decoding device 550 to encode input data in a broader range of binary types.

<2-5-1-2. Selective Application with DPCM Mode>

Note that the present technique (Method 1-3) can also be applied to Method 1-2. In other words, when selectively applying a plurality of encoding methods, the encoding device and the decoding device may handle a plurality of binary types.

<Encoding Device>

Figure 38:
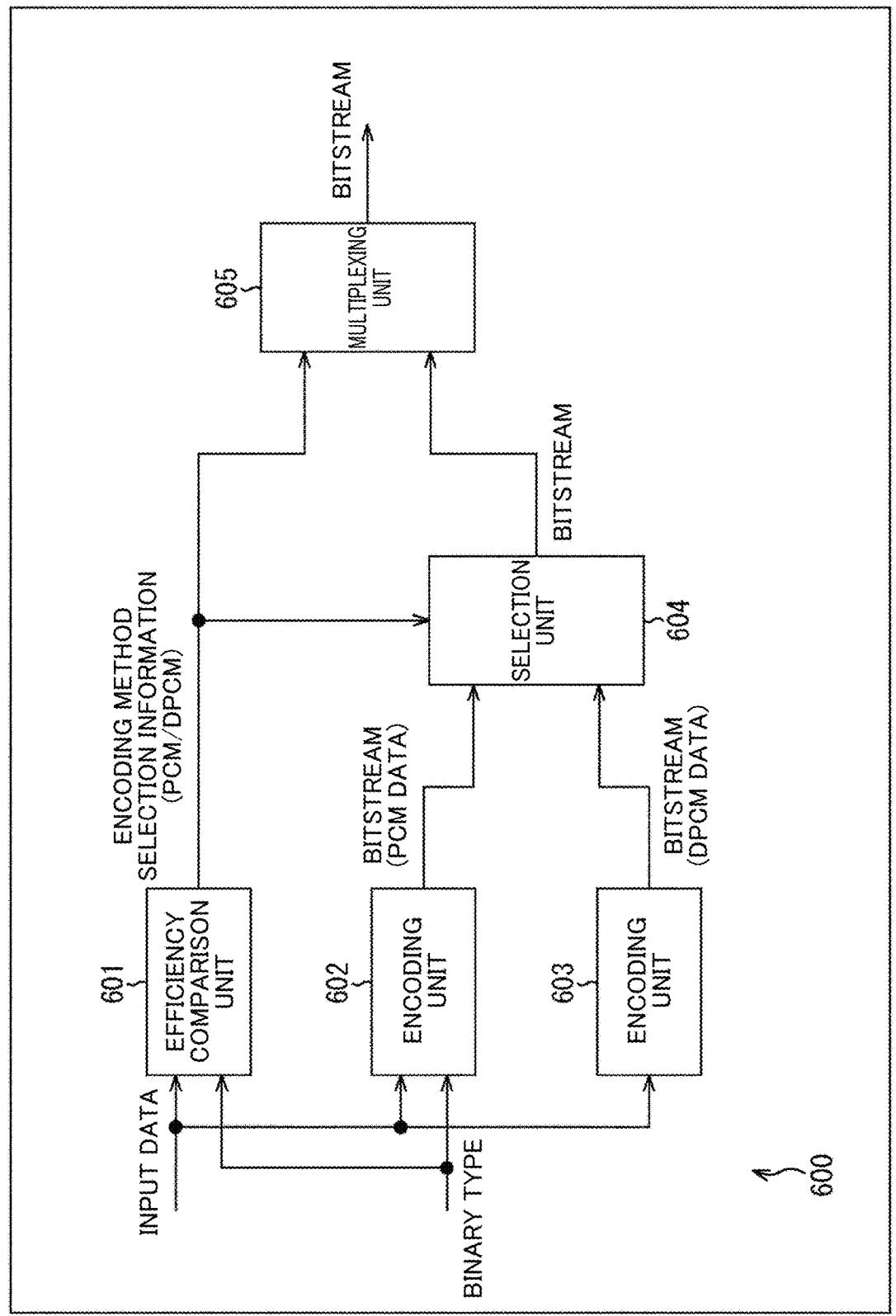
FIG. 38 is a block diagram illustrating an example of the main configuration of an encoding device.

FIG. 38 is a block diagram illustrating an example of the configuration of an encoding device serving as one aspect of an information processing device to which the present technique is applied. Note that FIG. 38 illustrates the main processing units, data flows, and the like, and the items illustrated in FIG. 38 are not necessarily all the items. In other words, an encoding device 600 may include processing units not illustrated as blocks in FIG. 38, and processing and data flows not indicated as arrows or the like in FIG. 38.

The encoding device 600 illustrated in FIG. 38 is a device that encodes input data supplied for each of data units, the data unit being a predetermined unit of data constituted by a plurality of samples, and outputs the resulting encoded data as a bitstream. At this time, the encoding device 600 performs the encoding by applying the present technique (Method 1-2, Method 1-2-1, and Method 1-2-2). In other words, the encoding device 600 selects the most efficient mode among the VMP-applied PCM mode and the DPCM mode, and encodes the input data by applying the selected encoding mode.

The encoding device 600 performs the encoding by applying the present technique (Method 1-3-1). In other words, the encoding device 600 encodes input data of the binary type designated by the system.

As illustrated in FIG. 38, the encoding device 600 includes an efficiency comparison unit 601, an encoding unit 602, an encoding unit 603, a selection unit 604, and a multiplexing unit 605. The input data to be encoded is supplied to the efficiency comparison unit 601, the encoding unit 602, and the encoding unit 603 for each data unit.

The efficiency comparison unit 601 compares the efficiencies of the candidates for the encoding method to be applied (the efficiencies of the VMP-applied PCM mode and the DPCM mode) using the supplied input data. At this time, the efficiency comparison unit 601 compares the efficiencies using input data of the binary type designated by the system or the like. For example, when detecting the VMP, the efficiency comparison unit 601 detects the VMP through a method according to the binary type designated by the system or the like. The efficiency comparison unit 601 then generates encoding method selection information indicating the more efficient encoding method as the result of the comparison. The efficiency comparison unit 601 supplies the encoding method selection information to the selection unit 604 and the multiplexing unit 605.

The encoding unit 602 encodes the input data in the VMP-applied PCM mode (the first encoding method), and generates a bitstream of the encoded data. At this time, the encoding unit 602 encodes input data of the binary type designated by the system. For example, the encoding unit 602 detects the VMP through a method according to the binary type designated by the system or the like. The encoding unit 602 supplies the generated bitstream to the selection unit 604.

The encoding unit 603 encodes the input data in the second encoding method, which is different from the first encoding method of the encoding unit 402, and generates a bitstream of the encoded data. For example, the encoding unit 603 encodes the input data in the DPCM mode. In other words, the encoding unit 603 takes one sample in the data unit as the reference sample, and calculates a difference from the other samples for each sample aside from the reference sample. The encoding unit 603 then generates a bitstream including the reference sample and the differences therefrom. The encoding unit 603 supplies the generated bitstream to the selection unit 604.

The selection unit 604 selects one of the VMP-applied PCM mode and the DPCM mode based on the encoding method selection information (the efficiency comparison result) supplied by the efficiency comparison unit 601. In other words, the selection unit 604 selects the encoding mode indicated by the encoding method selection information, from among the bitstream of the encoded data obtained by encoding the input data in the VMP-applied PCM mode, supplied by the encoding unit 602, and the bitstream of the encoded data obtained by encoding the input data in the DPCM mode, supplied by the encoding unit 603. The selection unit 604 can therefore be called an "encoding method selection unit". The selection unit 604 supplies the selected bitstream to the multiplexing unit 605.

The multiplexing unit 605 multiplexes the bitstream supplied by the selection unit 604 and the encoding method selection information supplied by the efficiency comparison unit 601, and generates the bitstream. In other words, the multiplexing unit 605 stores the encoding method selection information supplied by the efficiency comparison unit 601 in the bitstream supplied by the selection unit 604. For example, if the VMP-applied PCM mode (the first encoding method) is selected by the selection unit 604, the multiplexing unit 605 generates the bitstream including at least (i) the information indicating the encoding method selected (the encoding method selection information), (ii) the valid most significant bit position (VMP), and (iii) the valid data of each of the samples. On the other hand, if the DPCM mode (the second encoding method) is selected by the selection unit 604, the multiplexing unit 605 generates the bitstream including at least (i) the information indicating the encoding method selected (the encoding method selection information) and (ii) the encoded data of the data unit encoded using the DPCM mode (the second encoding method). In other words, the multiplexing unit 605 can also be called a "bitstream generation unit". The multiplexing unit 605 outputs the generated bitstream to the exterior of the encoding device 600.

In this manner, the encoding device 600 encodes input data of the binary type designated by the system or the like in the VMP-applied PCM mode. This makes it possible for the encoding device 600 to encode input data in a broader range of binary types.

<Flow of Encoding Processing>

An example of the flow of encoding processing executed by the encoding device 600 will be described with reference to the flowchart in FIG. 39.

Figure 39:
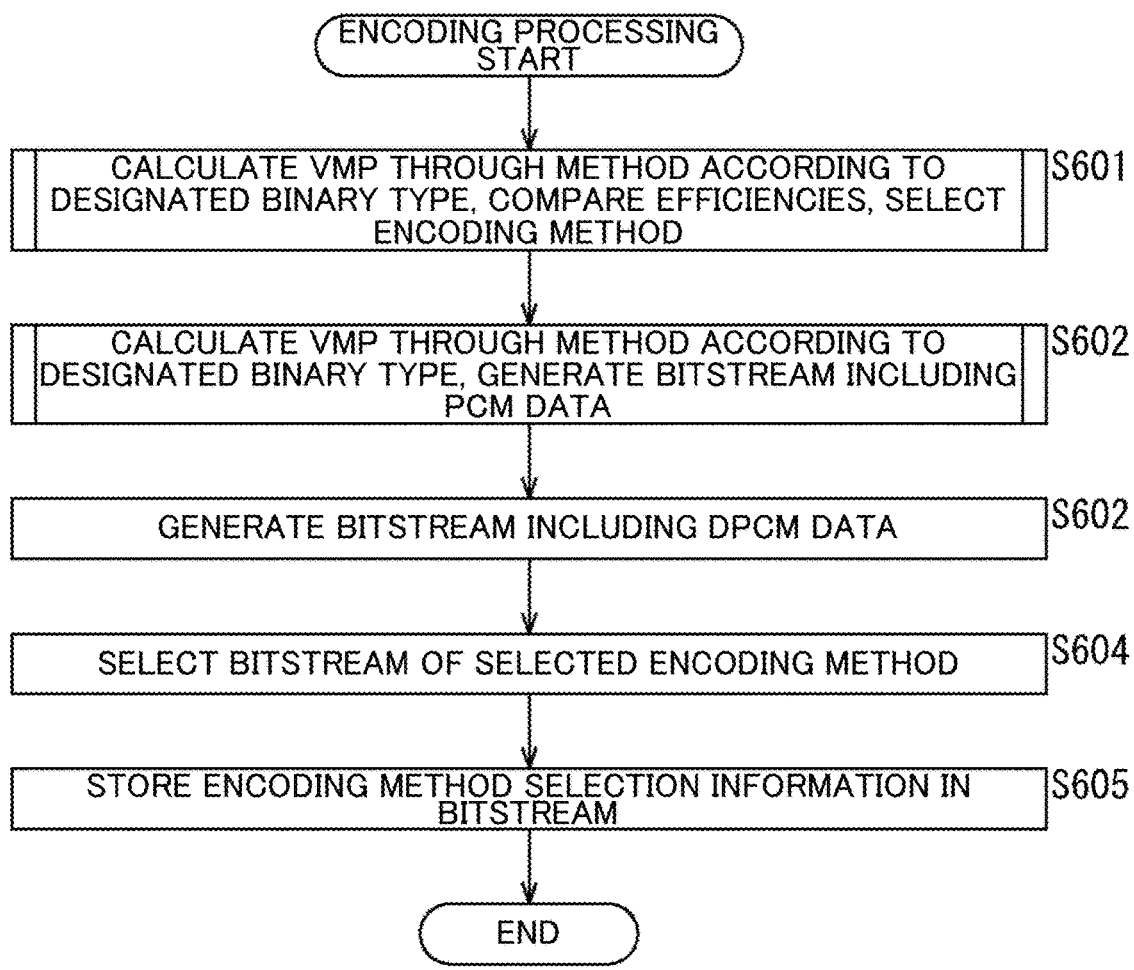
FIG. 39 is a flowchart illustrating an example of the flow of encoding processing.

When the encoding processing starts, in step S601 of FIG. 39, the efficiency comparison unit 601 calculates the VMP through a method according to the binary type designated by the system or the like, compares the efficiencies, and selects an encoding method.

In step S602, the encoding unit 602 calculates the VMP through a method according to the binary type that has been designated, encodes the input data having applied the VMP-applied PCM mode, and generates a bitstream including PCM data (valid data).

In step S603, the encoding unit 603 encodes the input data having applied the DPCM mode, and generates a bitstream including DPCM data.

In step S604, the selection unit 604 selects the bitstream of the encoding method selected in step S601, from among the bitstream generated through the processing of step S602 and the bitstream generated through the processing of step S603.

In step S605, the multiplexing unit 605 stores the encoding method selection information in the bitstream by multiplexing the encoding method selection information indicating the encoding method selected in step S601 and the bitstream selected in step S604.

When the processing of step S605 ends, the encoding processing ends.

Executing the encoding processing as described above makes it possible for the encoding device 600 to encode input data in a broader range of binary types.

<Decoding Device>

Figure 40:
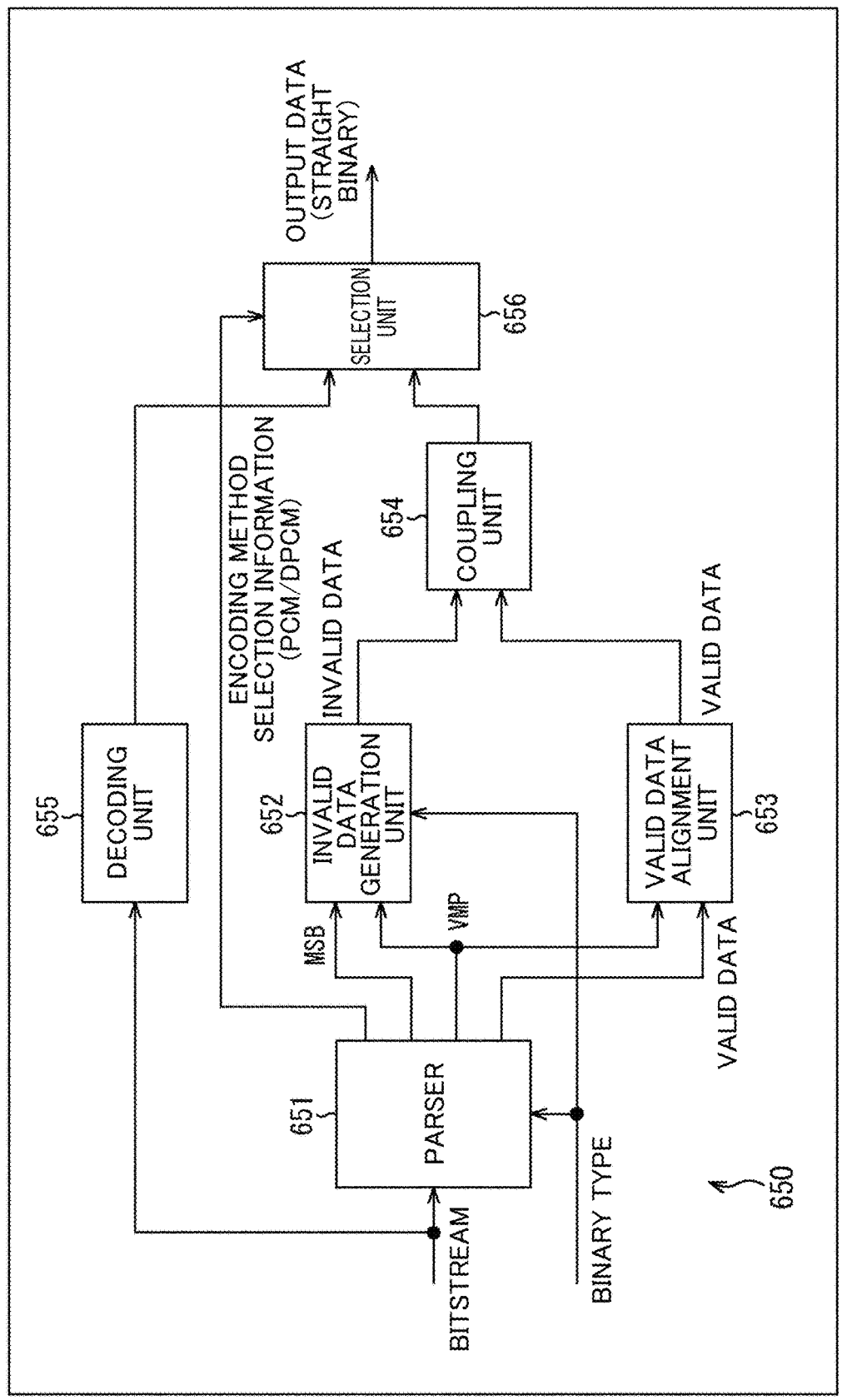
FIG. 40 is a block diagram illustrating an example of the main configuration of a decoding device.

The present technique can be applied in a decoding device, for example. FIG. 40 is a block diagram illustrating an example of the configuration of a decoding device serving as one aspect of an information processing device in which the present technique is applied. Note that FIG. 40 illustrates the main processing units, data flows, and the like, and the items illustrated in FIG. 40 are not necessarily all the items. That is, processing units not illustrated in FIG. 40 as blocks and processing and data flows not illustrated in FIG. 40 as arrows or the like may be present in a decoding device 650.

The decoding device 650 illustrated in FIG. 40 is a device that decodes a bitstream generated by the encoding device 600, restores input data to the state the data was in before being encoded by the encoding device 600, and outputs the input data as output data. At this time, the decoding device 650 performs the decoding by applying the present technique (Method 1-2 and Method 1-2-1). In other words, of the VMP-applied PCM mode and the DPCM mode, the decoding device 650 selects the mode applied by the encoding device 600 and decodes the bitstream by applying the selected encoding mode.

The decoding device 650 performs the decoding by applying the present technique (Method 1-3-1). In other words, the decoding device 650 decodes a bitstream in which input data of the binary type designated by the system has been encoded in the VMP-applied PCM mode.

As illustrated in FIG. 40, the decoding device 650 includes a parser 651, an invalid data generation unit 652, a valid data alignment unit 653, a coupling unit 654, a decoding unit 655, and a selection unit 656. The bitstream to be decoded is supplied to the parser 651 or the decoding unit 655.

The parser 651 analyzes the bitstream and extracts information according to the binary type designated by the system or the like. That is, the parser 651 can also be called an "extraction unit". For example, if straight binary is designated, the parser 651 extracts, from the bitstream, (i) the encoding method selection information, (ii) information indicating the valid most significant bit position (VMP), and (iii) valid data. The parser 651 supplies the extracted information indicating the VMP to the invalid data generation unit 652 and the valid data alignment unit 653. The parser 651 also supplies the extracted valid data to the valid data alignment unit 653. The parser 651 also supplies the extracted encoding method selection information to the selection unit 456.

If two's complement binary or offset binary is designated, the parser 651 extracts, from the bitstream, (i) the encoding method selection information, (ii) information indicating the valid most significant bit position (VMP), (iii) the bit plane of the MSB, and (iv) valid data. The parser 651 supplies the extracted information indicating the VMP to the invalid data generation unit 652 and the valid data alignment unit 653. The parser 651 also supplies the extracted bit plane of the MSB to the invalid data generation unit 652. The parser 651 also supplies the extracted valid data to the valid data alignment unit 653. The parser 651 also supplies the extracted encoding method selection information to the selection unit 656.

The invalid data generation unit 652 generates invalid data having a configuration according to the binary type designated by the system or the like, using the information indicating the VMP supplied from the parser 651. For example, if straight binary is designated, the invalid data generation unit 652 generates a bit string (invalid data having a bit length of (MSB-VMP), constituted only by values of "0". The invalid data generation unit 652 supplies the generated invalid data to the coupling unit 654.

Based on the information indicating the VMP supplied from the parser 651, the valid data alignment unit 653 aligns the valid data so that the valid data supplied from the parser 651 is a bit string below the valid most significant bit position (VMP) of the sample. In other words, the valid data alignment unit 653 aligns the most significant bit of the valid data to the VMP (sets the position of the most significant bit of the valid data to the VMP). The valid data alignment unit 653 supplies the aligned valid data to the coupling unit 654.

The coupling unit 654 generates a sample by coupling the invalid data supplied from the invalid data generation unit 652 with the aligned valid data supplied from the valid data alignment unit 653. The coupling unit 654 performs the same processing for each sample to generate a data unit. In other words, the coupling unit 654 can also be called a "data unit generation unit". The coupling unit 654 supplies the generated data unit to the selection unit 656.

The decoding unit 455 generates the data unit by extracting the encoded data of the data unit from the supplied bitstream and decoding the encoded data using a decoding method corresponding to the second encoding method different from the first encoding method that uses pulse code modulation (the VMP-applied PCM mode). The second encoding method is an encoding method using differential pulse code modulation, for example (the DPCM mode). The decoding unit 655 generates (restores) the data unit by adding a reference sample included in the encoded data with one of differences between two of the samples, and repeatedly adding a result of the adding to another one of the differences in a recursive manner. The decoding unit 455 supplies the generated data unit to the selection unit 656.

Of the data unit supplied by the coupling unit 654 and the data unit supplied by the decoding unit 655, the selection unit 656 selects the data unit that has been decoded using the decoding method corresponding to the encoding method indicated by the encoding method selection information. For example, if the VMP-applied PCM mode is designated by the encoding method selection information, the selection unit 656 selects the data unit supplied by the coupling unit 654, and outputs that data unit as output data to the exterior of the decoding device 650. If the DPCM mode is designated by the encoding method selection information, the selection unit 656 selects the data unit supplied by the decoding unit 655, and outputs that data unit as output data to the exterior of the decoding device 650.

In this manner, the decoding device 650 can correctly decode a bitstream in which input data of the binary type designated by the system has been encoded in the VMP-applied PCM mode. In other words, the decoding device 650 can process data of a broader range of binary types.

<Flow of Decoding Processing>

An example of a flow of the decoding processing executed by the decoding device 650 will be described with reference to the flowchart in FIG. 41.

Figure 41:
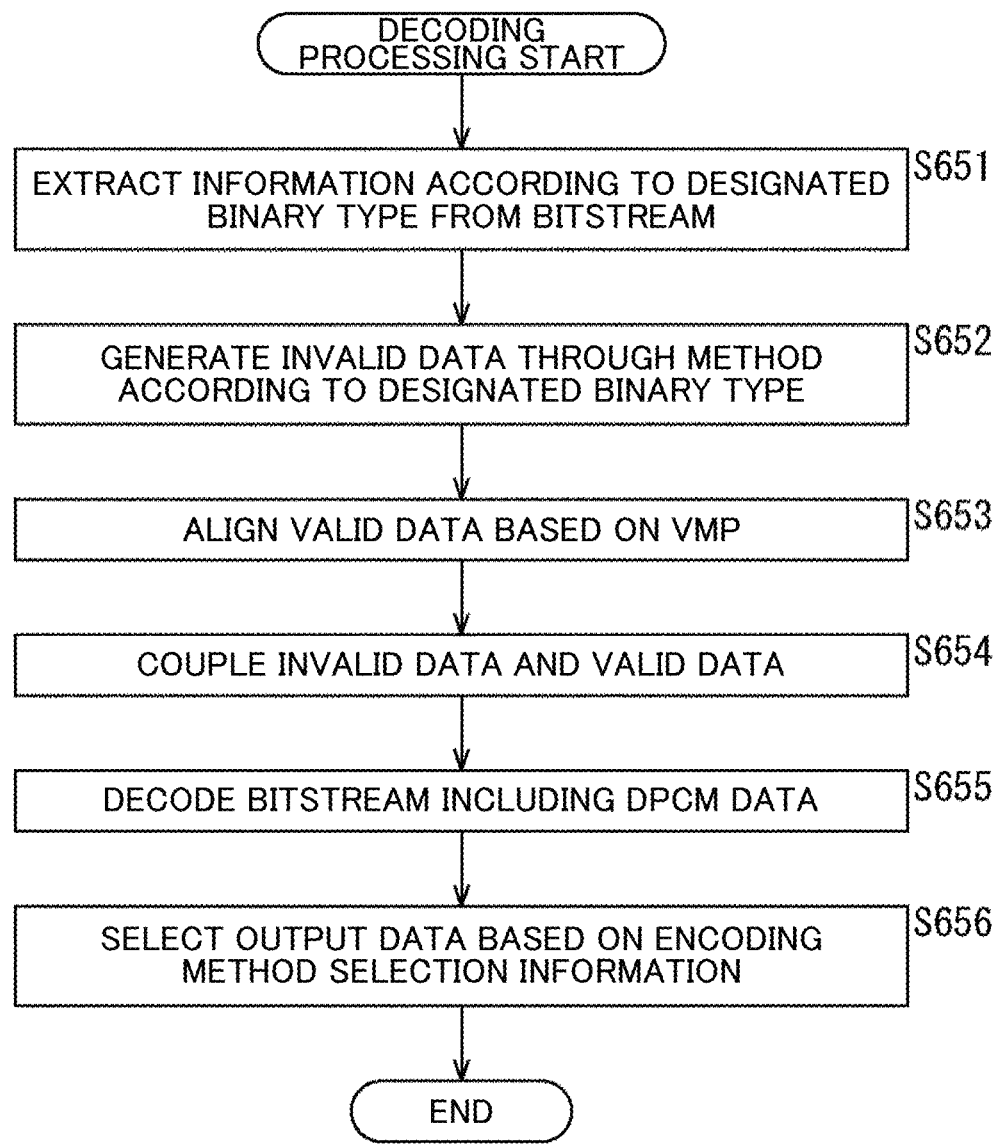
FIG. 41 is a flowchart illustrating an example of the flow of decoding processing.

When the decoding processing starts, in step S651 of FIG. 41, the parser 651 of the decoding device 650 extracts, from the supplied bitstream, information according to the binary type designated by the system or the like.

In step S652, the invalid data generation unit 652 generates the invalid data through a method according to the binary type designated by the system or the like.

In step S653, the valid data alignment unit 653 aligns the valid data extracted in step S651 based on the information indicating the VMP extracted in step S651.

In step S654, the coupling unit 654 generates a data unit by coupling the invalid data generated in step S652 with the valid data aligned in step S653.

In step S655, the decoding unit 655 decodes the bitstream in DPCM mode and generates a data unit.

In step S656, the selection unit 656 selects the output data based on the encoding method selection information extracted in step S651. In other words, of the data unit generated in step S654 and the data unit generated in step S655, the selection unit 656 selects, as output data, the data unit corresponding to the encoding method designated by the encoding method selection information extracted in step S651. The selection unit 656 outputs the selected data unit as output data to the exterior of the decoding device 650.

Once the processing of step S656 ends, the decoding processing ends.

By executing he decoding processing as described above, the decoding device 650 can correctly decode a bitstream in which input data of the binary type designated by the system has been encoded in the VMP-applied PCM mode. In other words, the decoding device 650 can process data of a broader range of binary types.

<2-5-2. Transmission of Binary Type Information>

When applying Method 1-3-1, binary type information indicating the applied binary type may be transmitted (Method 1-3-1-1), as indicated in the fourteenth row from the top of the table in FIG. 4.

<2-5-2-1. VMP-Applied PCM Mode>

<Encoding Device>

For example, the bitstream generation unit may generate the bitstream further including information indicating the binary type that has been designated.

Figure 42:
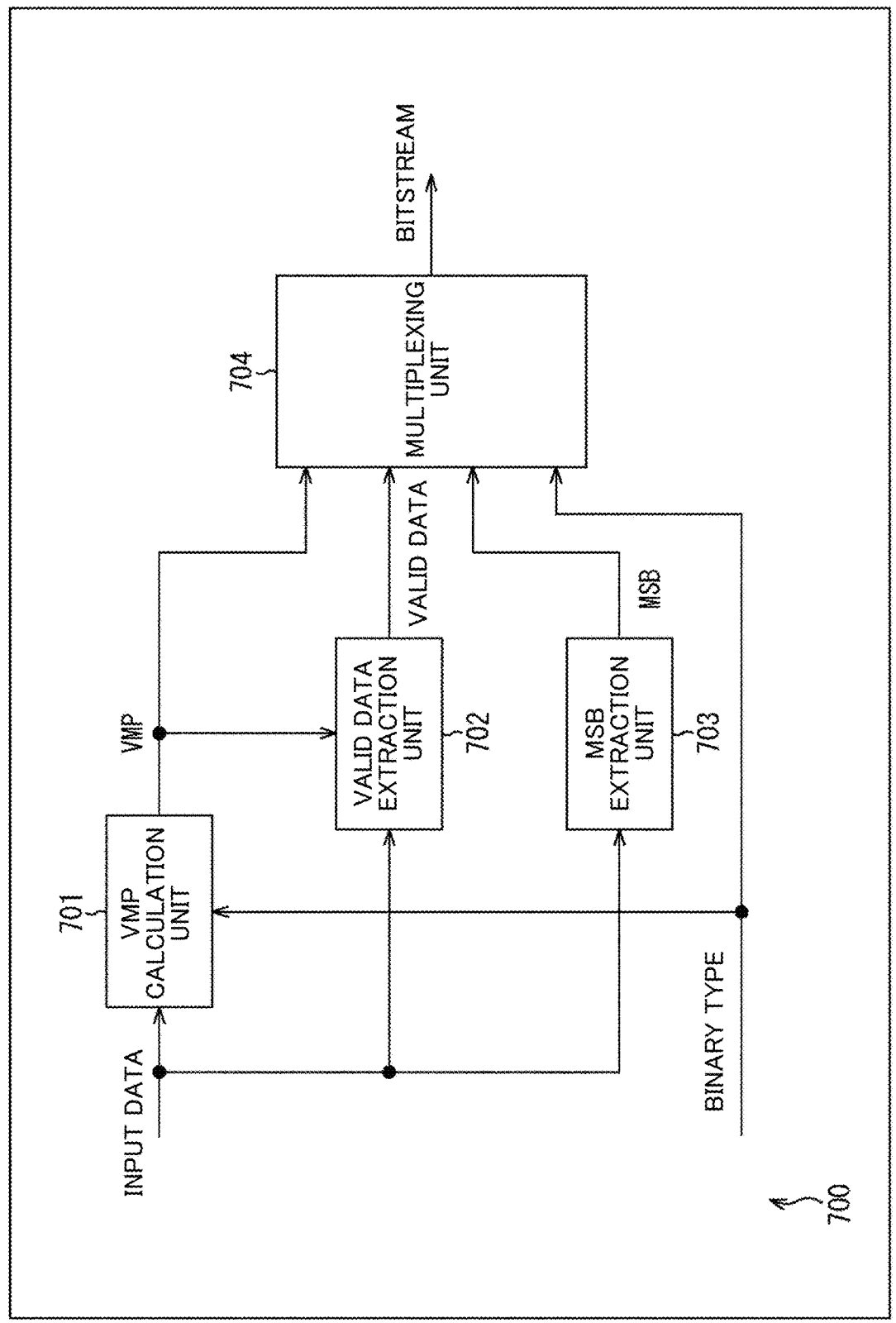
FIG. 42 is a block diagram illustrating an example of the main configuration of an encoding device.

FIG. 42 is a block diagram illustrating an example of the configuration of an encoding device serving as one aspect of an information processing device to which the present technique is applied. Note that FIG. 42 illustrates the main processing units, data flows, and the like, and the items illustrated in FIG. 42 are not necessarily all the items. In other words, an encoding device 700 may include processing units not illustrated as blocks in FIG. 42, and processing and data flows not indicated as arrows or the like in FIG. 42.

The encoding device 700 illustrated in FIG. 42 is a device that encodes input data supplied for each of data units, the data unit being a predetermined unit of data constituted by a plurality of samples, and outputs the resulting encoded data as a bitstream. At this time, the encoding device 700 performs the encoding by applying the present technique (Method 1-3-1-1). In other words, the encoding device 700 encodes input data of the binary type designated by the system. The encoding device 700 also stores information indicating the designated binary type in the bitstream.

As illustrated in FIG. 42, the encoding device 700 includes a VMP calculation unit 701, a valid data extraction unit 702, an MSB extraction unit 703, and a multiplexing unit 704. The processing units correspond to the VMP calculation unit 501, the valid data extraction unit 502, the MSB extraction unit 503, and the multiplexing unit 504 of the encoding device 500, and perform similar processing. However, the multiplexing unit 704 generates binary type information indicating the binary type designated by the system or the like, and stores the binary type information in the generated bitstream.

Figure 43:
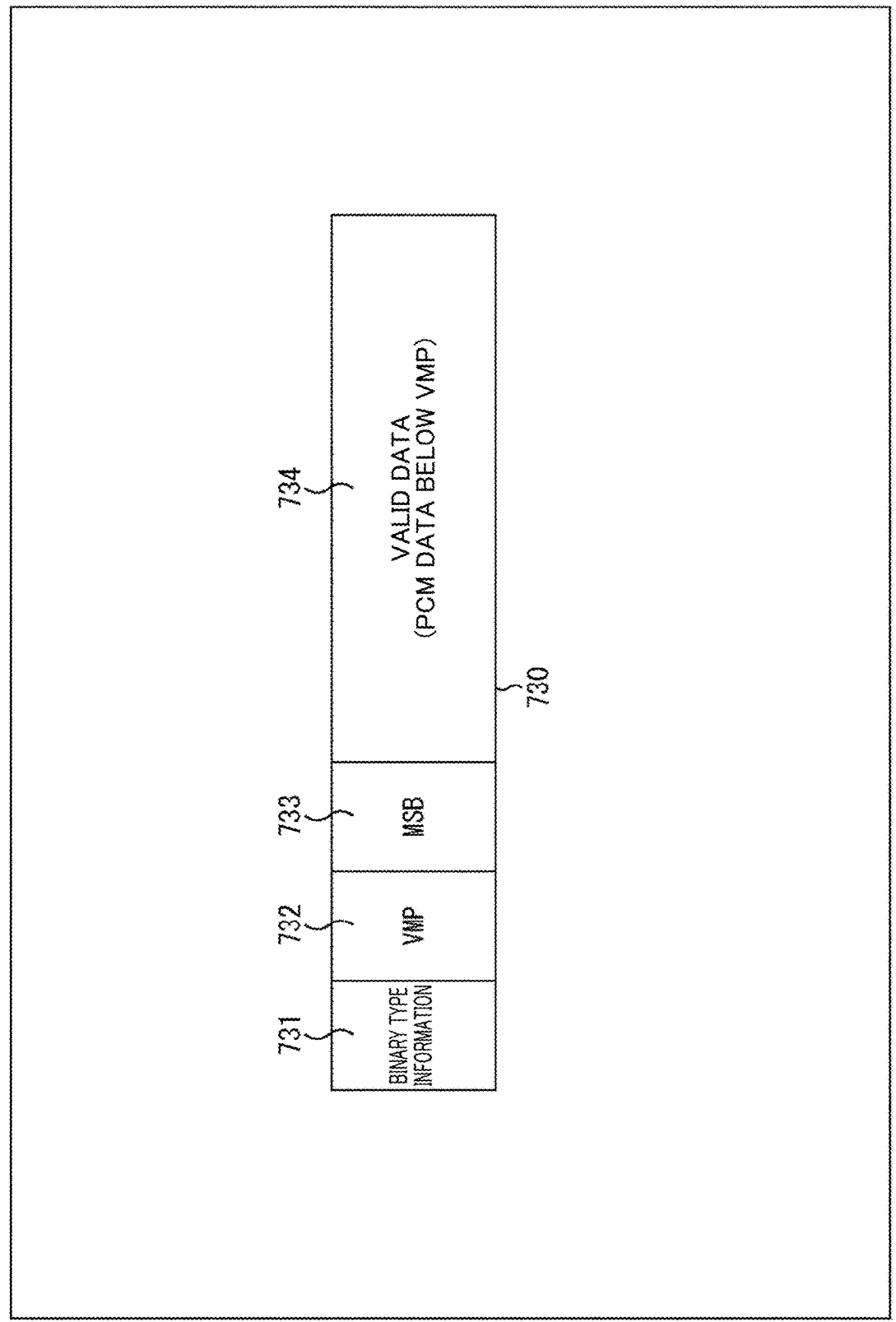
FIG. 43 is a diagram illustrating an example of a bitstream.

In other words, the multiplexing unit 704 generates a bitstream 730 such as that illustrated in FIG. 43. The bitstream 730 includes binary type information 731, a VMP 732, an MSB 733, and valid data 734. The binary type information 731 is information indicating the binary type designated by the system or the like, as described above. The VMP 732 is information indicating the VMP. The MSB 733 is constituted by the bit plane of the MSB. The valid data 734 is the bit string below the VMP, extracted from the data unit to be processed. This bitstream 730 is generated when two's complement binary, offset binary, or the like is designated as the binary type by the system or the like. If straight binary is designated, the MSB 733 is omitted.

As described above, the encoding device 700 can store and transmit binary type information, indicating the binary type designated by the system or the like, in the bitstream. This makes it possible for the encoding device 700 to designate the binary type to be applied by the decoding device. The decoding device can therefore correctly decode the bitstream in a more reliable manner. A drop in the encoding efficiency can therefore be suppressed.

<Flow of Encoding Processing>

Figure 44:
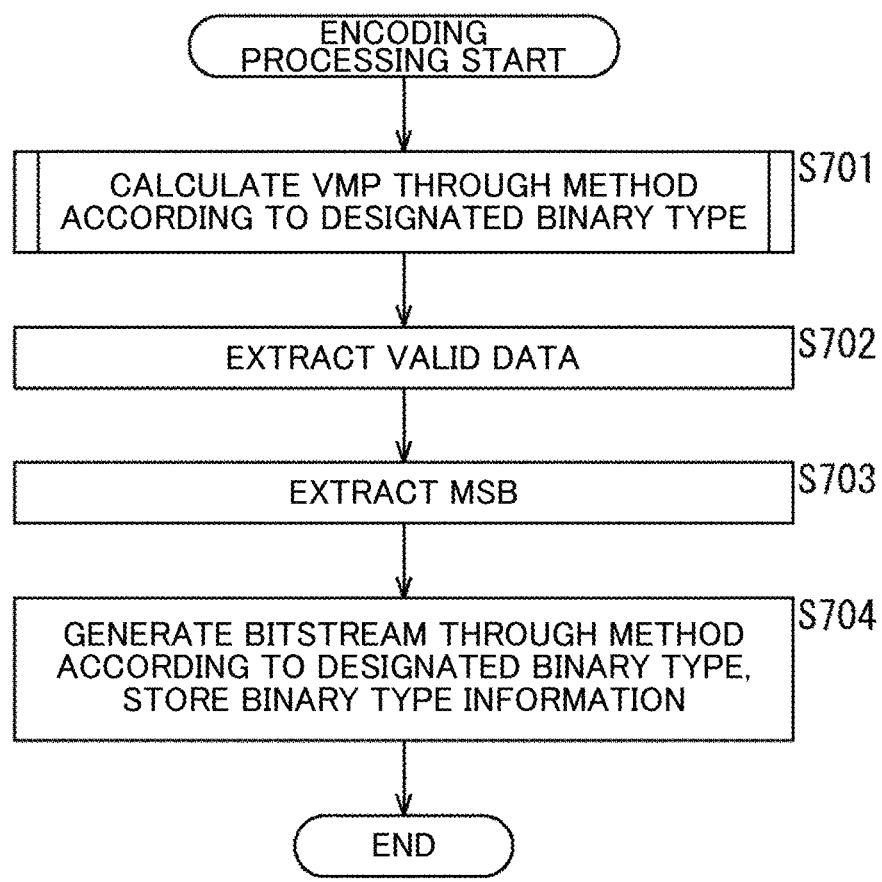
FIG. 44 is a flowchart illustrating an example of the flow of encoding processing.

An example of the flow of encoding processing executed by the encoding device 700 will be described with reference to the flowchart in FIG. 44.

When the encoding processing starts, the processes of each of steps S701 to S703 are performed in the same manner as the processes of each of steps S501 to S503 in FIG. 35.

In step S704, the multiplexing unit 704 generates the bitstream through a method according to the binary type that has been designated, and stores the binary type information in the bitstream.

When the processing of step S704 ends, the encoding processing ends.

By executing the encoding processing as described above, the encoding device 700 can store and transmit binary type information, indicating the binary type designated by the system or the like, in the bitstream. This makes it possible for the encoding device 700 to designate the binary type to be applied by the decoding device. The decoding device can therefore correctly decode the bitstream in a more reliable manner. A drop in the encoding efficiency can therefore be suppressed.

<Decoding Device>

The present technique can be applied in a decoding device. For example, the extraction unit may further extract information indicating the binary type from the bitstream, and the invalid data generation unit may generate invalid data constituted by a bit pattern according to the binary type indicated by that information.

Figure 45:
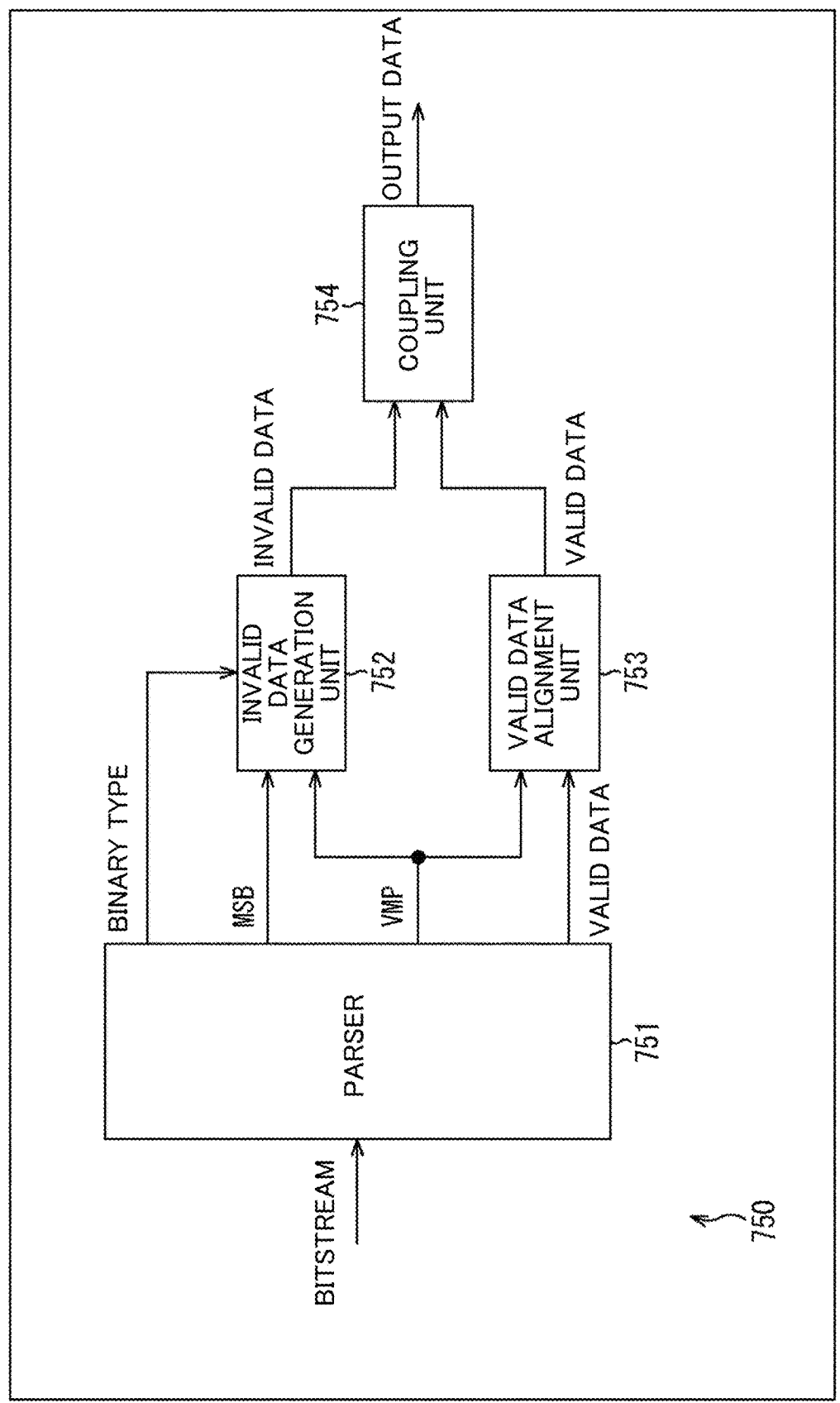
FIG. 45 is a block diagram illustrating an example of the main configuration of a decoding device.

FIG. 45 is a block diagram illustrating an example of the configuration of a decoding device serving as one aspect of an information processing device in which the present technique is applied. Note that FIG. 45 illustrates the main processing units, data flows, and the like, and the items illustrated in FIG. 45 are not necessarily all the items. That is, processing units not illustrated in FIG. 45 as blocks and processing and data flows not illustrated in FIG. 45 as arrows or the like may be present in a decoding device 750.

The decoding device 750 illustrated in FIG. 45 is a device that decodes a bitstream generated by the encoding device 700, restores input data to the state the data was in before being encoded by the encoding device 700, and outputs the input data as output data. At this time, the decoding device 750 performs the decoding by applying the present technique (Method 1-3-1-1). In other words, the decoding device 750 decodes a bitstream in which input data of the binary type designated by the system has been encoded in the VMP-applied PCM mode.

As illustrated in FIG. 45, the decoding device 750 includes a parser 751, an invalid data generation unit 752, a valid data alignment unit 753, and a coupling unit 754. These processing units correspond to the parser 551, the invalid data generation unit 552, the valid data alignment unit 553, and the coupling unit 554 of the decoding device 550, and perform similar processing. However, the parser 751 extracts binary type information, indicating the binary type designated by the system or the like, from the bitstream. The parser 751 supplies the extracted binary type information to the invalid data generation unit 752.

The invalid data generation unit 752 generates the invalid data constituted by a bit pattern according to the binary type indicated by the binary type information.

As described above, the decoding device 750 can extract the binary type information stored in the bitstream and generate the invalid data through a method according to that binary type. The decoding device 750 can therefore correctly decode the bitstream in a more reliable manner. A drop in the encoding efficiency can therefore be suppressed.

<Flow of Decoding Processing>

An example of a flow of the decoding processing executed by the decoding device 750 will be described with reference to the flowchart in FIG. 46.

When the decoding processing starts, in step S751, the parser 751 extracts the binary type information from the bitstream.

In step S752, the parser 751 extracts, from the bitstream, information according to the binary type designated by the binary type information.

In step S753, the invalid data generation unit 752 generates the invalid data through a method according to the binary type designated by the binary type information.

In step S754, the valid data alignment unit 753 aligns the valid data based on the VMP.

In step S755, the coupling unit 754 generates a data unit by coupling the invalid data and the valid data for each sample.

Once the processing of step S755 ends, the decoding processing ends.

By executing the decoding processing in this manner, the decoding device 750 can extract the binary type information stored in the bitstream and generate the invalid data through a method according to that binary type. The decoding device 750 can therefore correctly decode the bitstream in a more reliable manner. A drop in the encoding efficiency can therefore be suppressed.

<2-5-2-2. Selective Application with DPCM Mode>

Note that the present technique (Method 1-3-1-1) can also be applied to Method 1-2. In other words, when selectively applying a plurality of encoding methods, the encoding device and the decoding device may handle a plurality of binary types, and may transmit binary type information indicating the applied binary type.

<Encoding Device>

Figure 47:
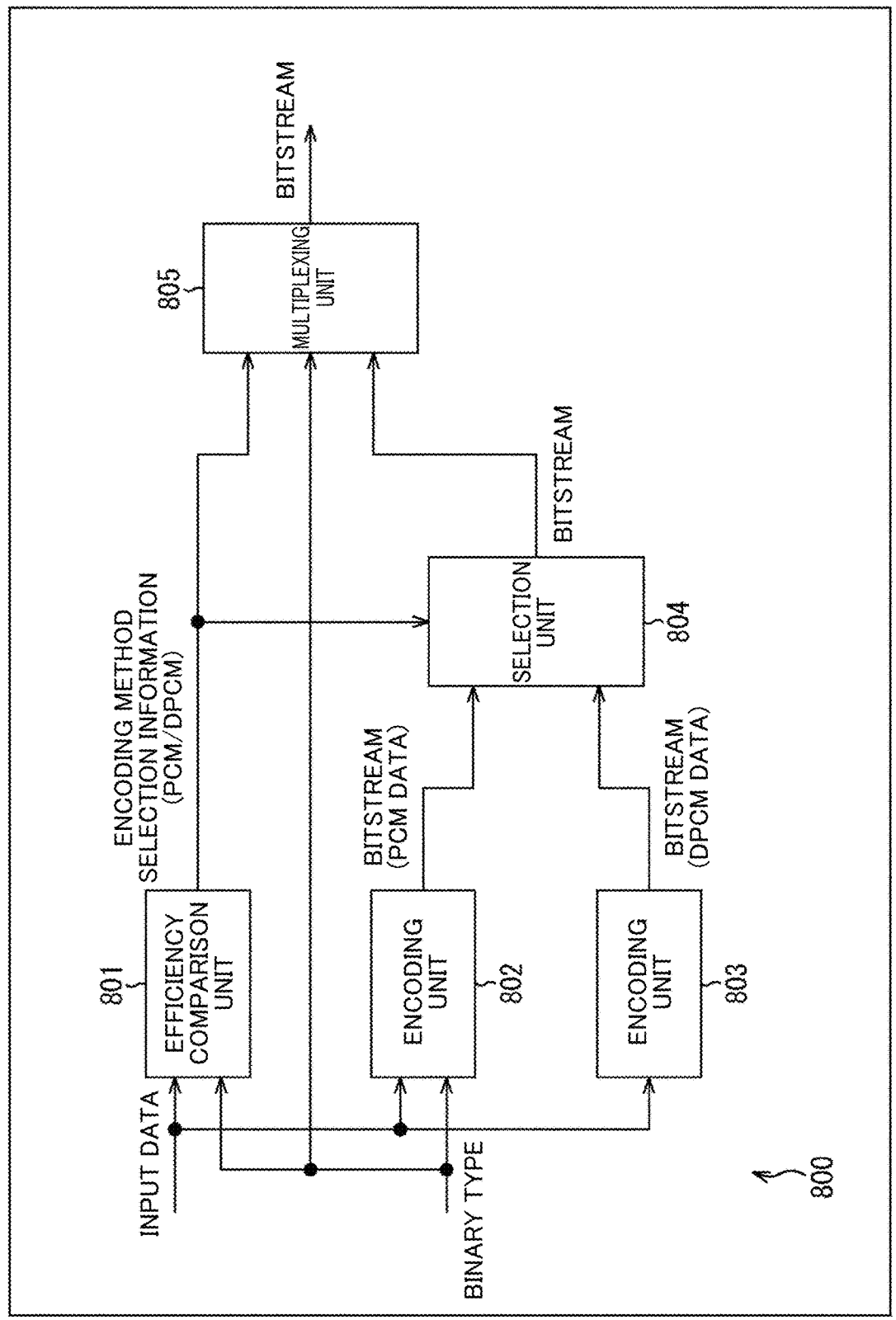
FIG. 47 is a block diagram illustrating an example of the main configuration of an encoding device.

FIG. 47 is a block diagram illustrating an example of the configuration of an encoding device serving as one aspect of an information processing device to which the present technique is applied. Note that FIG. 47 illustrates the main processing units, data flows, and the like, and the items illustrated in FIG. 47 are not necessarily all the items. In other words, an encoding device 800 may include processing units not illustrated as blocks in FIG. 47, and processing and data flows not indicated as arrows or the like in FIG. 47.

As illustrated in FIG. 47, the encoding device 800 includes an efficiency comparison unit 801, an encoding unit 802, an encoding unit 803, a selection unit 804, and a multiplexing unit 805. These processing units correspond to the processing units of the encoding device 600 in FIG. 38, i.e., the efficiency comparison unit 601, the encoding unit 602, the encoding unit 603, the selection unit 604, and the multiplexing unit 605, and perform processing similar to that of those processing units.

However, with the encoding device 800 in FIG. 47, the designated binary type is also supplied to the multiplexing unit 805. The multiplexing unit 805 generates the binary type information indicating the designated binary type, and stores the binary type information in the bitstream.

Figure 48:
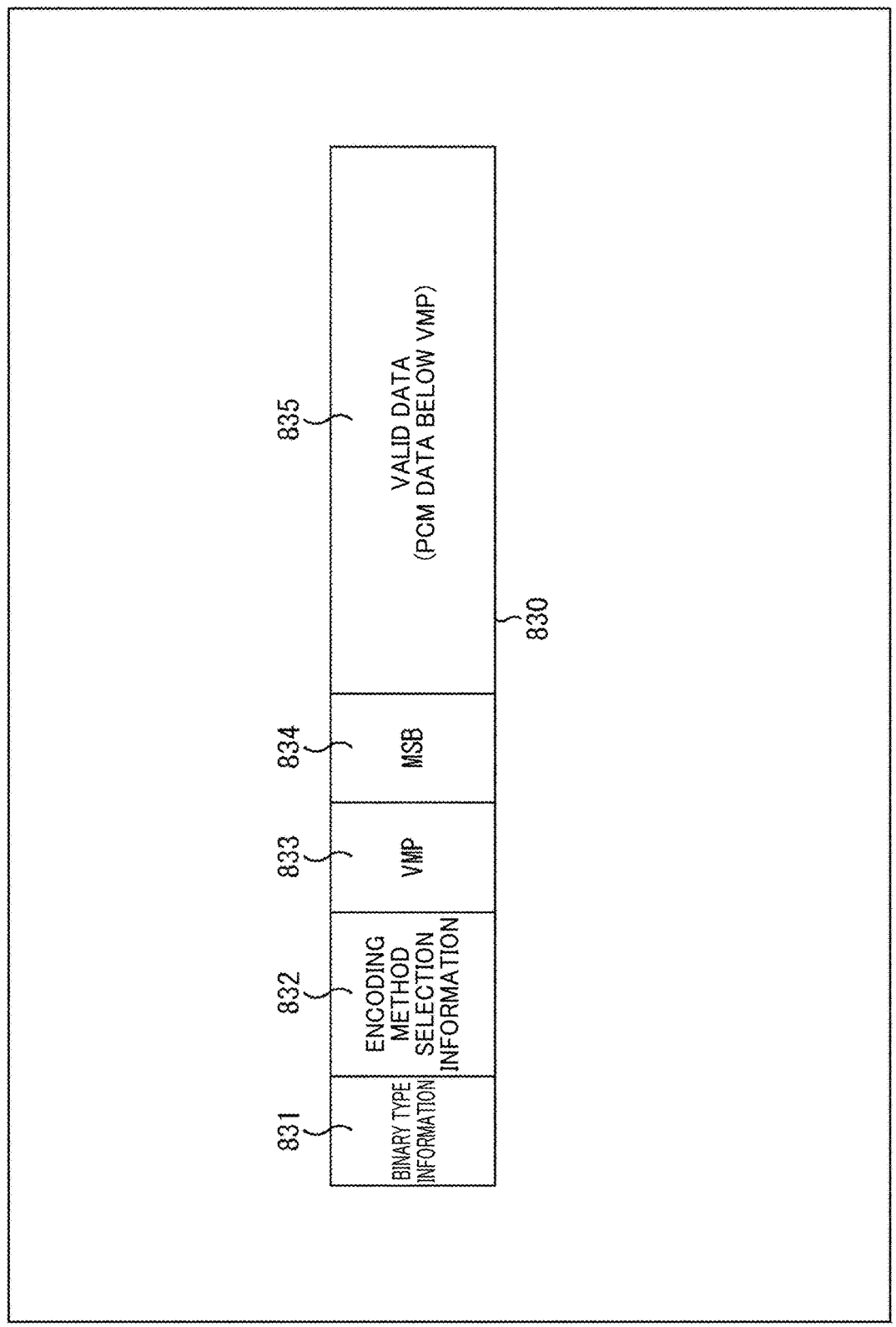
FIG. 48 is a diagram illustrating an example of a bitstream.

A bitstream 830 illustrated in FIG. 48 is a bitstream generated by the multiplexing unit 805. As illustrated in FIG. 48, the bitstream 830 includes binary type information 831, encoding method selection information 832, a VMP 833, an MSB 834, and valid data 835. The configurations of the encoding method selection information 832 to the valid data 835 are similar to those of the bitstream 422 and the bitstream 423 in FIG. 26. In other words, if two's complement binary or offset binary is designated, the multiplexing unit 805 generates the bitstream 830. If straight binary is designated, the multiplexing unit 805 generates a bitstream having the MSB 834 from the configuration of the bitstream 830.

In this manner, the encoding device 800 encodes input data of the binary type designated by the system or the like in the VMP-applied PCM mode. This makes it possible for the encoding device 800 to encode input data in a broader range of binary types.

<Flow of Encoding Processing>

An example of the flow of encoding processing executed by the encoding device 800 will be described with reference to the flowchart in FIG. 49.

Figure 49:
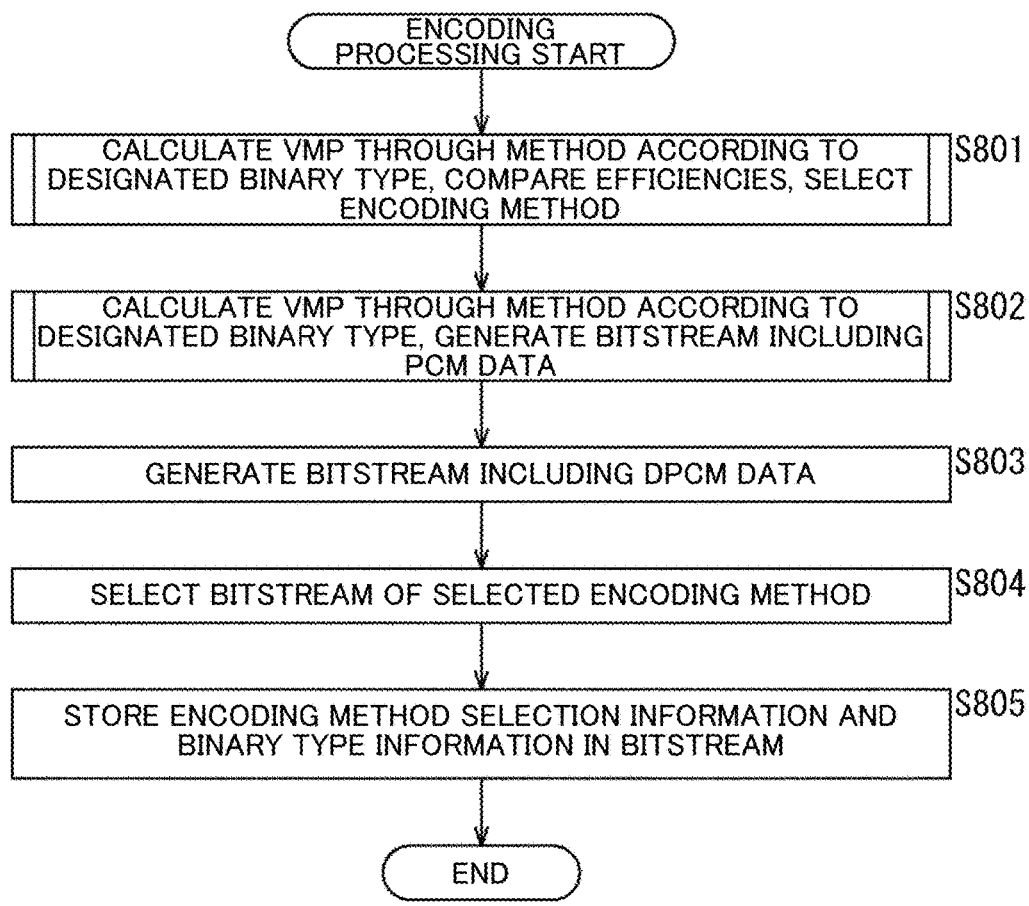
FIG. 49 is a flowchart illustrating an example of the flow of encoding processing.

When the encoding processing starts, in step S801 of FIG. 49, the efficiency comparison unit 801 calculates the VMP through a method according to the binary type designated by the system or the like, compares the efficiencies, and selects an encoding method.

In step S802, the encoding unit 802 calculates the VMP through a method according to the binary type that has been designated, encodes the input data having applied the VMP-applied PCM mode, and generates a bitstream including PCM data (valid data).

In step S803, the encoding unit 803 encodes the input data having applied the DPCM mode, and generates a bitstream including DPCM data.

In step S804, the selection unit 804 selects the bitstream of the encoding method selected in step S801, from among the bitstream generated through the processing of step S802 and the bitstream generated through the processing of step S803.

In step S805, the multiplexing unit 805 stores the encoding method selection information in the bitstream by multiplexing the encoding method selection information indicating the encoding method selected in step S801 and the bitstream selected in step S804. Furthermore, the multiplexing unit 805 stores the binary type information indicating the designated binary type in the bitstream by multiplexing the binary type information with the bitstream.

When the processing of step S805 ends, the encoding processing ends.

Executing the encoding processing as described above makes it possible for the encoding device 800 to encode input data in a broader range of binary types.

<Decoding Device>

Figure 50:
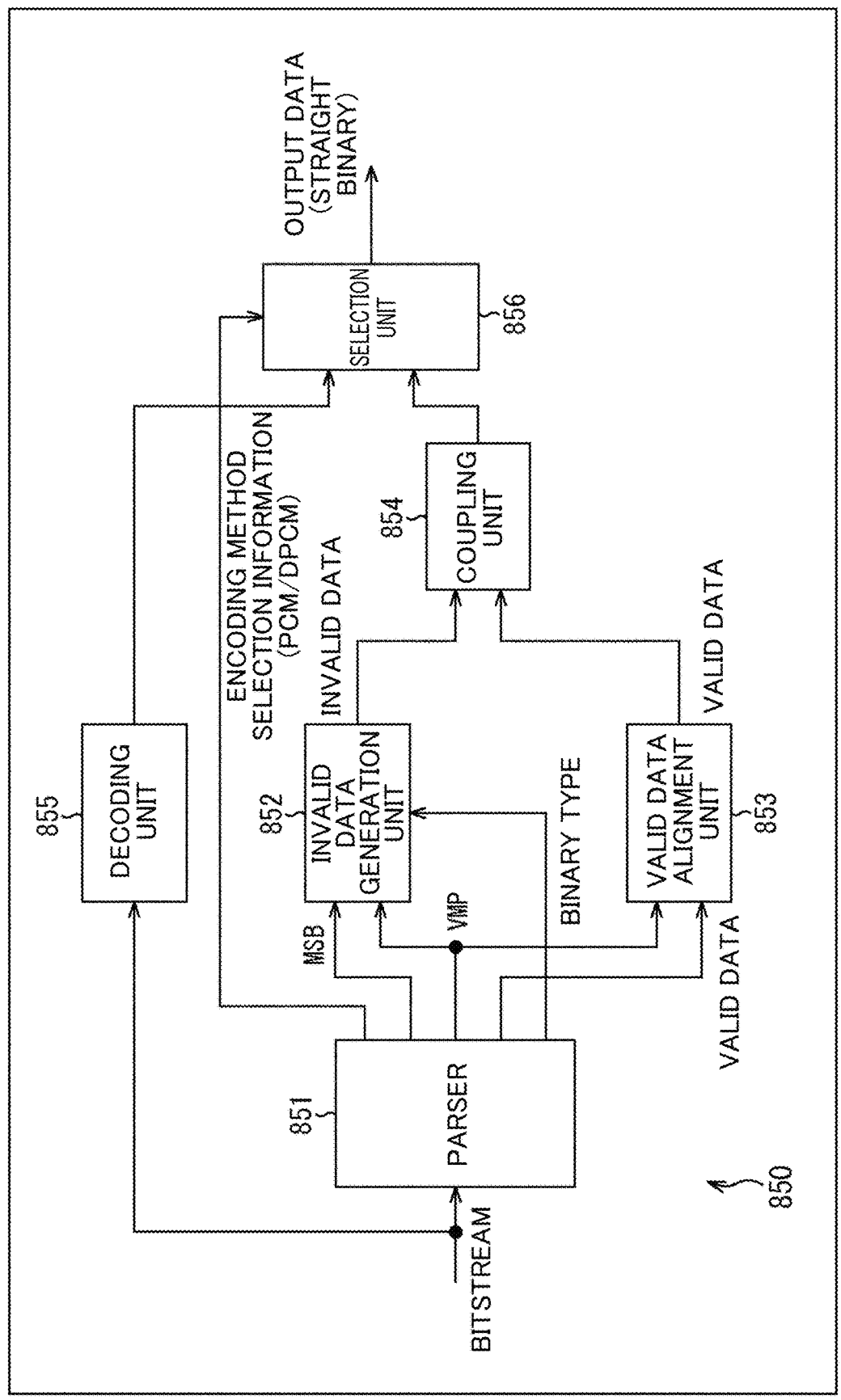
FIG. 50 is a block diagram illustrating an example of the main configuration of a decoding device.

The present technique can be applied in a decoding device, for example. FIG. 50 is a block diagram illustrating an example of the configuration of a decoding device serving as one aspect of an information processing device in which the present technique is applied. Note that FIG. 50 illustrates the main processing units, data flows, and the like, and the items illustrated in FIG. 50 are not necessarily all the items. That is, processing units not illustrated in FIG. 50 as blocks and processing and data flows not illustrated in FIG. 50 as arrows or the like may be present in a decoding device 850.

As illustrated in FIG. 50, the decoding device 850 includes a parser 851, an invalid data generation unit 852, a valid data alignment unit 853, a coupling unit 854, a decoding unit 855, and a selection unit 856. These processing units correspond to processing units of the decoding device 650 in FIG. 40, i.e., the parser 651, the invalid data generation unit 652, the valid data alignment unit 653, the coupling unit 654, the decoding unit 655, and the selection unit 656, and perform similar processing.

However, with the decoding device 850 in FIG. 50, the binary type information indicating the designated binary type is stored in the bitstream and transmitted from the encoding device 800 to the decoding device 850. Accordingly, the parser 851 extracts the binary type information from the supplied bitstream. The parser 851 supplies that binary type information to the invalid data generation unit 852.

The invalid data generation unit 852 generates the invalid data having a bit pattern according to the binary type supplied by the parser 851.

As described above, the decoding device 850 can extract the binary type information stored in the bitstream and generate the invalid data through a method according to that binary type. The decoding device 850 can therefore correctly decode the bitstream in a more reliable manner. A drop in the encoding efficiency can therefore be suppressed.

<Flow of Decoding Processing>

An example of a flow of the decoding processing executed by the decoding device 850 will be described with reference to the flowchart in FIG. 51.

Figure 51:
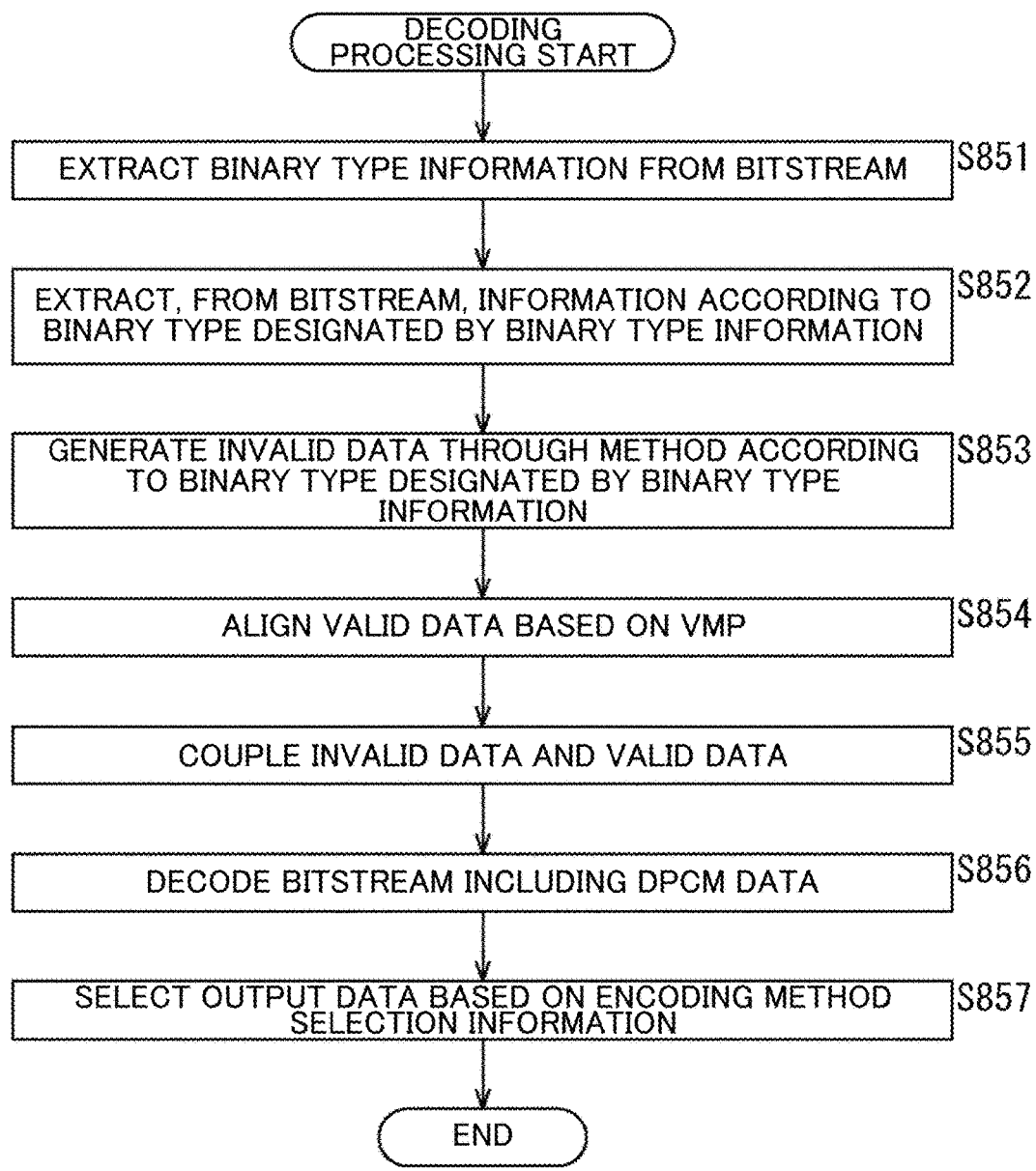
FIG. 51 is a flowchart illustrating an example of the flow of decoding processing.

When the decoding processing starts, in step S851 of FIG. 51, the parser 851 of the decoding device 850 extracts, from the supplied bitstream, information according to the binary type designated by the system or the like.

In step S852, the parser 851 extracts, from the bitstream, information according to the binary type designated by that binary type information.

In step S853, the invalid data generation unit 852 generates the invalid data through a method according to the binary type designated by that binary type information.

In step S854, the valid data alignment unit 853 aligns the valid data extracted in step S852 based on the information indicating the VMP extracted in step S852.

In step S855, the coupling unit 654 generates a data unit by coupling the invalid data generated in step S853 with the valid data aligned in step S854.

In step S856, the decoding unit 855 decodes the bitstream in DPCM mode and generates a data unit.

In step S856, the selection unit 856 selects the output data based on the encoding method selection information extracted in step S852. In other words, of the data unit generated in step S855 and the data unit generated in step S856, the selection unit 856 selects, as output data, the data unit corresponding to the encoding method designated by the encoding method selection information extracted in step S852. The selection unit 856 outputs the selected data unit as output data to the exterior of the decoding device 850.

Once the processing of step S856 ends, the decoding processing ends.

By executing he decoding processing as described above, the decoding device 850 can correctly decode a bitstream in which input data of the binary type designated by the system has been encoded in the VMP-applied PCM mode. In other words, the decoding device 850 can process data of a broader range of binary types.

<2-5-3. Determining Input Binary Type>

When applying Method 1-3, the binary type of the input data may be determined and processing may be performed according to that binary type, as indicated in the bottom row of the table in FIG. 4. Binary type information indicating that binary type may then be transmitted (Method 1-3-2).

<2-5-3-1. VMP-Applied PCM Mode>
<Encoding Device>

For example, the information processing device may further include a binary type determination unit that determines the binary type of the sample. The most significant bit position detection unit of the information processing device may detect the valid most significant bit position using a method according to a determination result for the binary type. The bitstream generation unit may generate the bitstream further including information indicating the determination result.

Figure 52:
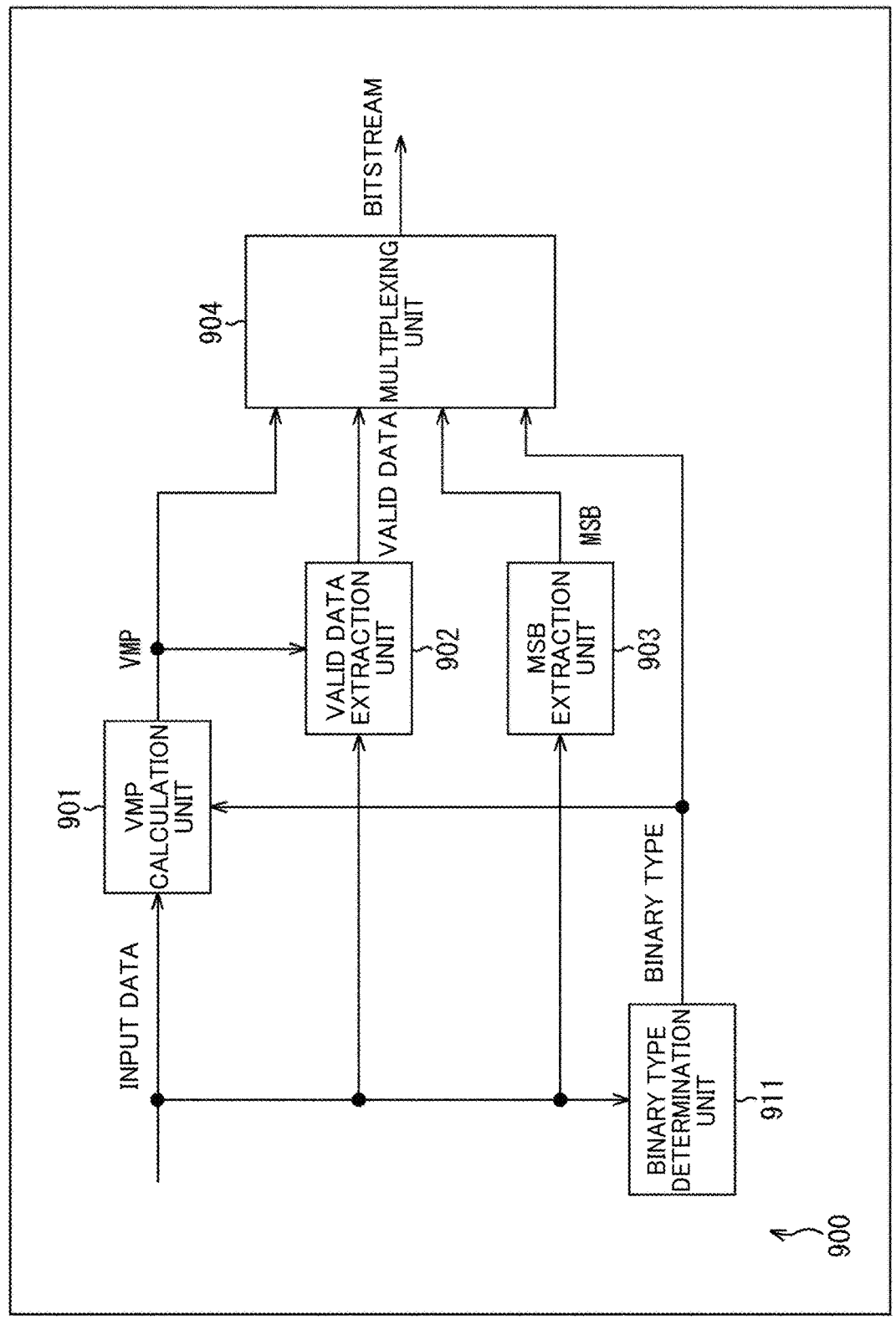
FIG. 52 is a block diagram illustrating an example of the main configuration of an encoding device.

FIG. 52 is a block diagram illustrating an example of the configuration of an encoding device serving as one aspect of an information processing device to which the present technique is applied. Note that FIG. 52 illustrates the main processing units, data flows, and the like, and the items illustrated in FIG. 52 are not necessarily all the items. In other words, an encoding device 900 may include processing units not illustrated as blocks in FIG. 52, and processing and data flows not indicated as arrows or the like in FIG. 52.

The encoding device 900 illustrated in FIG. 52 is a device that encodes input data supplied for each of data units, the data unit being a predetermined unit of data constituted by a plurality of samples, and outputs the resulting encoded data as a bitstream. At this time, the encoding device 900 performs the encoding by applying the present technique (Method 1-3-2). In other words, the encoding device 900 determines the binary type of the input data and encodes the input data through a method according to the determined binary type. The encoding device 800 also stores information indicating the determined binary type in the bitstream.

As illustrated in FIG. 52, the encoding device 800 includes a VMP calculation unit 901, a valid data extraction unit 902, an MSB extraction unit 903, and a multiplexing unit 904. The processing units correspond to the VMP calculation unit 701, the valid data extraction unit 702, the MSB extraction unit 703, and the multiplexing unit 704 of the encoding device 700, and perform similar processing. However, the encoding device 900 further includes a binary type determination unit 911.

The binary type determination unit 911 obtains the input data and determines the binary type of the obtained input data. The binary type determination unit 911 supplies information indicating the determination result to the VMP calculation unit 901 and the multiplexing unit 904.

The VMP calculation unit 901 calculates the VMP through a method according to the binary type of the input data determined by the binary type determination unit 911.

The multiplexing unit 904 multiplexes (i) the information indicating the VMP, (ii) the valid data, and (iii) the bit plane of the MSB to generate the bitstream, through a method according to the binary type of the input data determined by the binary type determination unit 911. For example, if the binary type of the input data is determined to be two's complement binary or offset binary, the bitstream 730 is generated. If the binary type of the input data is determined to be straight binary, the MSB 733 is omitted. The multiplexing unit 904 also stores and transmits binary type information indicating the binary type determined by the binary type determination unit 911 in the bitstream.

As described above, the encoding device 900 can store and transmit binary type information, indicating the determined binary type, in the bitstream. This makes it possible for the encoding device 900 to designate the binary type to be applied by the decoding device. The decoding device can therefore correctly decode the bitstream in a more reliable manner. A drop in the encoding efficiency can therefore be suppressed.

<Flow of Encoding Processing>

Figure 53:
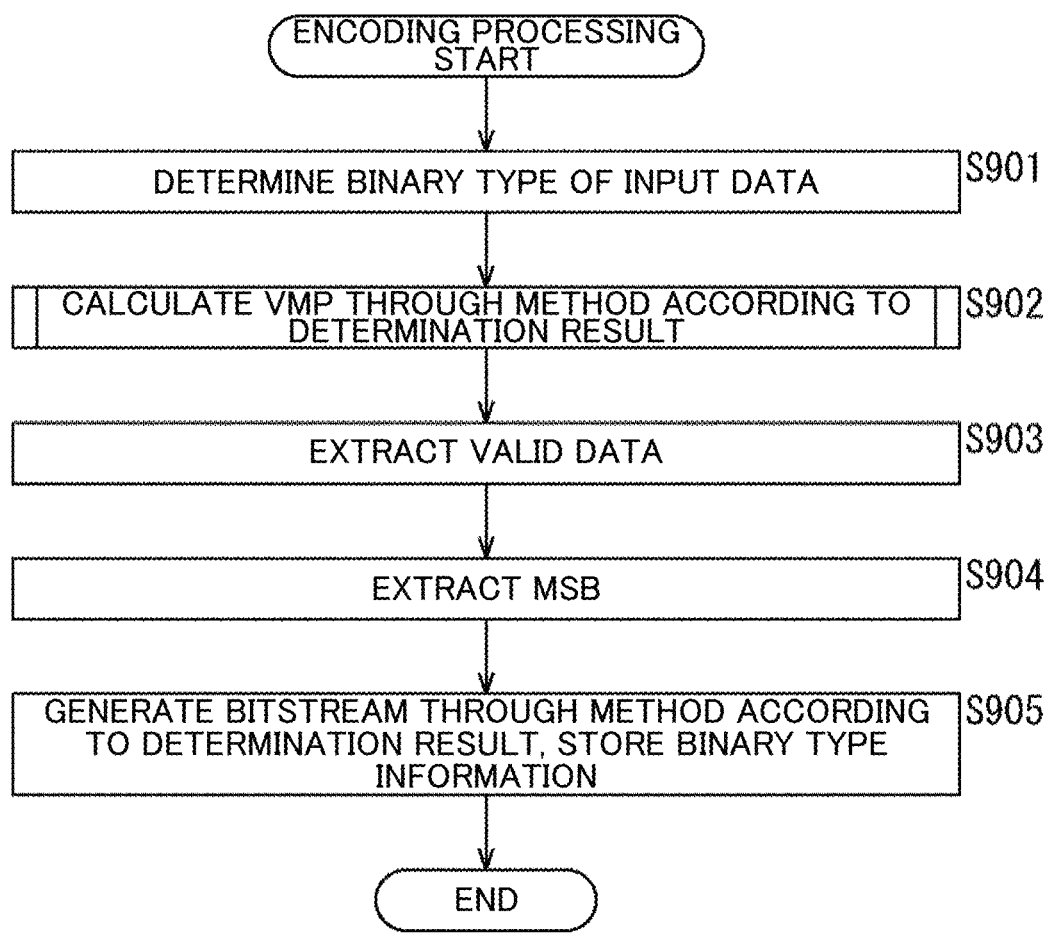
FIG. 53 is a flowchart illustrating an example of the flow of encoding processing.

An example of the flow of encoding processing executed by the encoding device 900 will be described with reference to the flowchart in FIG. 53.

When the encoding processing starts, in step S901, the binary type determination unit 911 determines the binary type of the input data.

In step S902, the VMP calculation unit 901 calculates the VMP through a method according to the determination result from step S901.

In step S903, the valid data extraction unit 902 extracts valid data from the input data.

In step S904, the MSB extraction unit 903 extracts the MSB from the input data.

In step S905, the multiplexing unit 904 generates the bitstream through a method according to the determination result from step S901, and stores the binary type information.

When the processing of step S905 ends, the encoding processing ends.

By executing the encoding processing as described above, the encoding device 900 can store and transmit binary type information, indicating the determined binary type of the input data, in the bitstream. This makes it possible for the encoding device 900 to designate the binary type to be applied by the decoding device. The decoding device can therefore correctly decode the bitstream in a more reliable manner. A drop in the encoding efficiency can therefore be suppressed.

Figure 46:
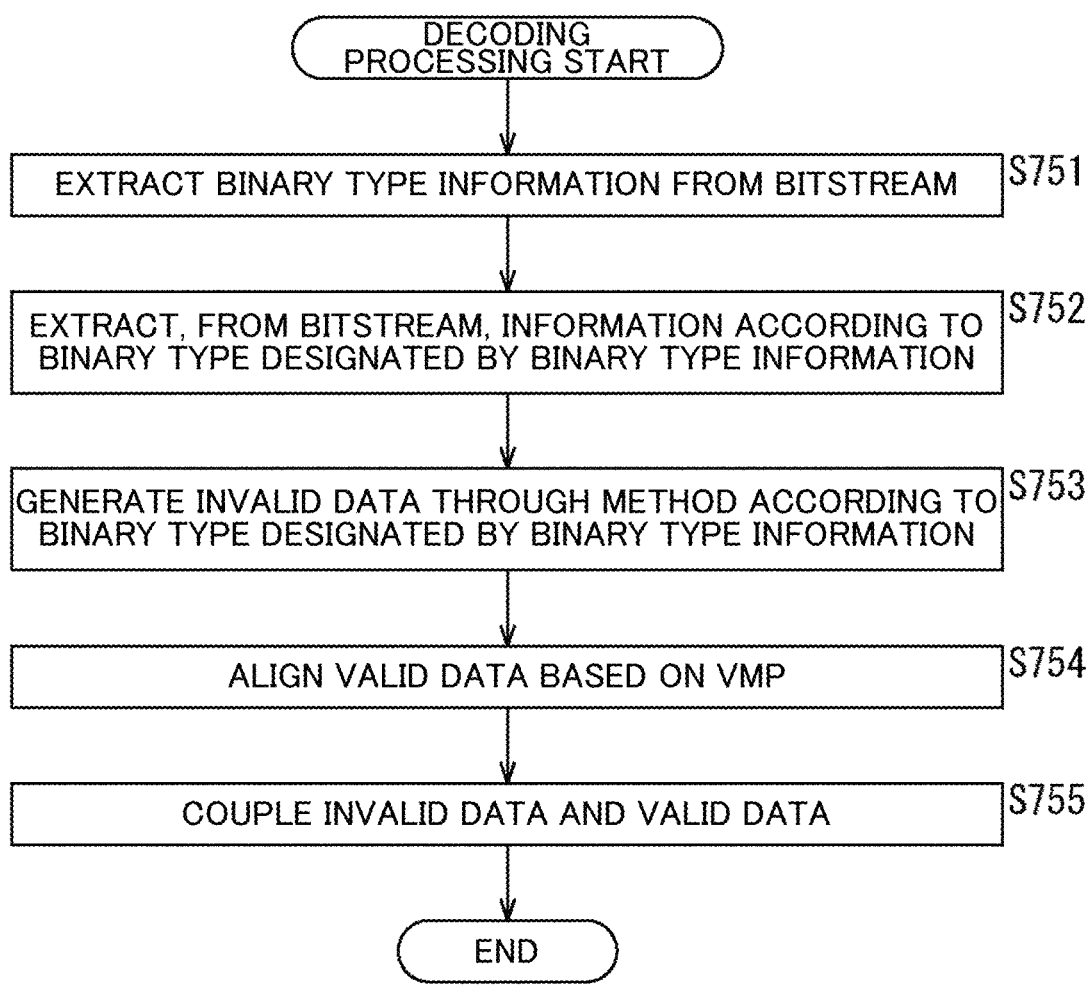
FIG. 46 is a flowchart illustrating an example of the flow of decoding processing.

Note that in this case, the decoding device has the same configuration as the decoding device 750 in FIG. 45, and the various types of processing may be executed through a flow similar to that of the flowchart in FIG. 46, and as such, descriptions thereof will be omitted.

<2-5-3-2. Selective Application with DPCM Mode>
<Encoding Device>

Note that the present technique (Method 1-3-2) can also be applied to Method 1-2. In other words, when selectively applying a plurality of encoding methods, the encoding device and the decoding device may handle a plurality of binary types, determine the binary type of the input data, and transmit binary type information that is a result of that determination.

Figure 54:
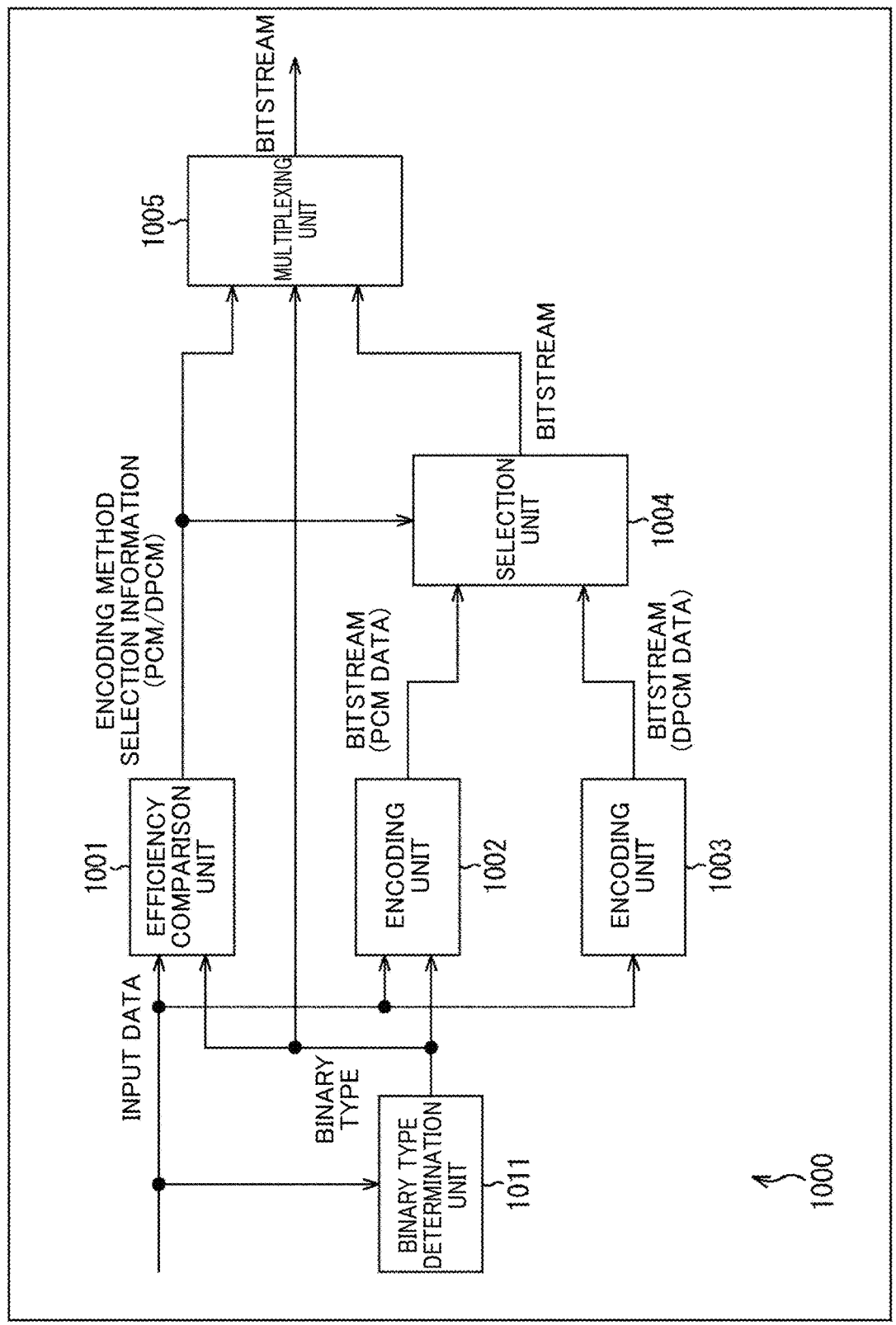
FIG. 54 is a block diagram illustrating an example of the main configuration of an encoding device.

FIG. 54 is a block diagram illustrating an example of the configuration of an encoding device serving as one aspect of an information processing device to which the present technique is applied. Note that FIG. 54 illustrates the main processing units, data flows, and the like, and the items illustrated in FIG. 54 are not necessarily all the items. In other words, an encoding device 1000 may include processing units not illustrated as blocks in FIG. 54, and processing and data flows not indicated as arrows or the like in FIG. 54.

As illustrated in FIG. 54, the encoding device 1000 includes an efficiency comparison unit 1001, an encoding unit 1002, an encoding unit 1003, a selection unit 1004, and a multiplexing unit 1005. These processing units correspond to the processing units of the encoding device 800 in FIG. 47, i.e., the efficiency comparison unit 801, the encoding unit 802, the encoding unit 803, the selection unit 804, and the multiplexing unit 805, and perform processing similar to that of those processing units.

However, the encoding device 1000 in FIG. 54 includes a binary type determination unit 1011. The binary type determination unit 1011 obtains the input data and determines the binary type of the input data. The binary type determination unit 1011 then supplies binary type information indicating the determination result to the efficiency comparison unit 1001, the encoding unit 1002, and the multiplexing unit 1005.

The efficiency comparison unit 1001 compares the efficiencies of the encoding modes through a method according to the binary type information (the determined binary type of the input data). The encoding unit 1002 encodes the input data through a method according to the binary type supplied by the binary type determination unit 1011, and generates a bitstream.

The multiplexing unit 1005 stores the binary type information in the bitstream.

As described above, the encoding device 1000 can store and transmit binary type information, indicating the determined binary type, in the bitstream. This makes it possible for the encoding device 1000 to designate the binary type to be applied by the decoding device. The decoding device can therefore correctly decode the bitstream in a more reliable manner. A drop in the encoding efficiency can therefore be suppressed.

<Flow of Encoding Processing>

Figure 55:
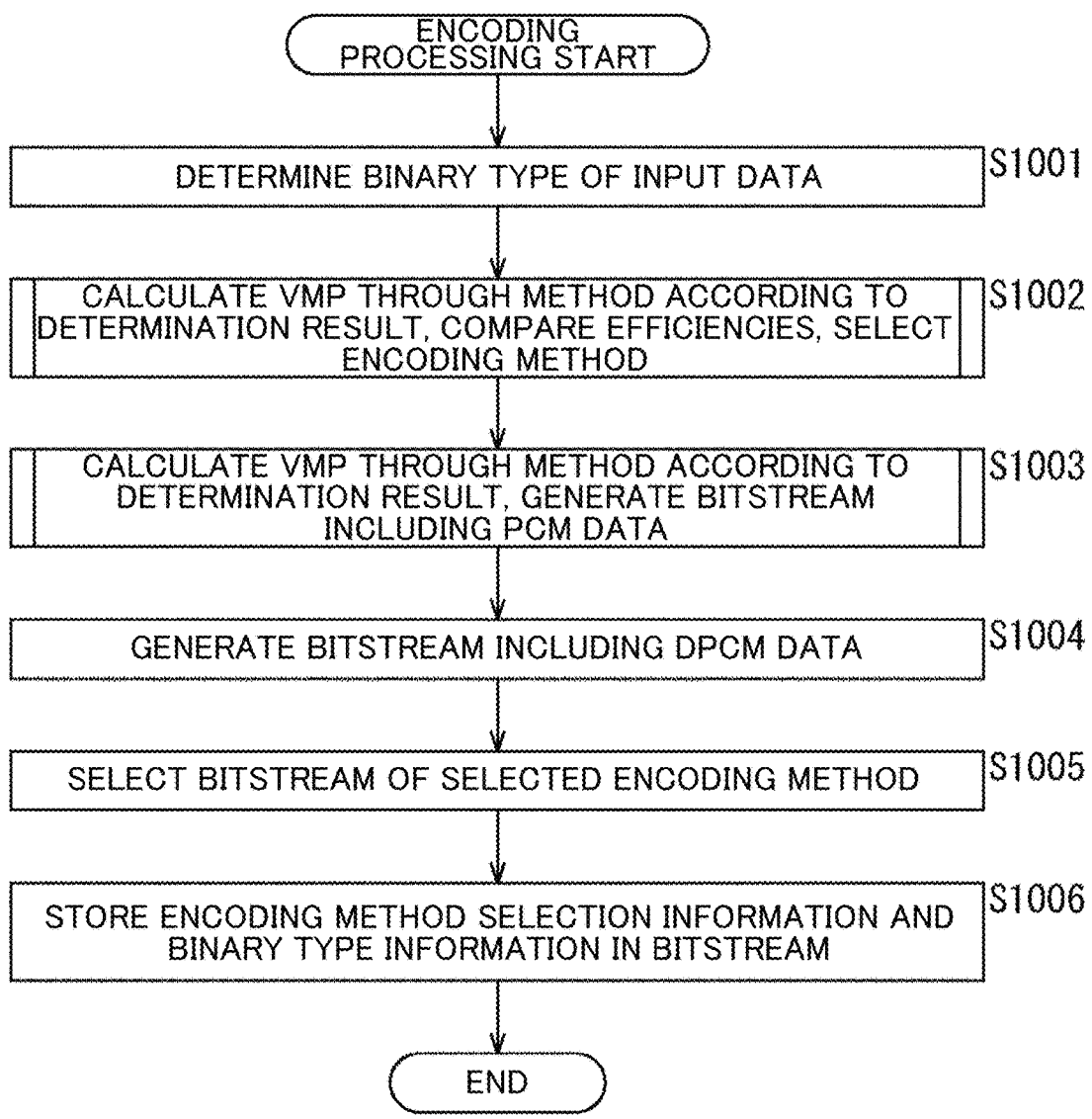
FIG. 55 is a flowchart illustrating an example of the flow of encoding processing.

An example of the flow of encoding processing executed by the encoding device 1000 will be described with reference to the flowchart in FIG. 55.

When the encoding processing starts, in step S1001, the binary type determination unit 1011 determines the binary type of the input data.

In step S1002, the efficiency comparison unit 1001 calculates the VMP through a method according to the determination result obtained in step S1001, compares the efficiencies, and selects an encoding method.

In step S1003, the encoding unit 1002 calculates the VMP through a method according to the determination result obtained in step S1001, and generates a bitstream including PCM data encoded in the VMP-applied PCM mode.

In step S1004, the encoding unit 1003 generates a bitstream including DPCM data.

In step S1005, the selection unit 1004 selects the bitstream of the selected encoding method.

In step S1006, the multiplexing unit 1005 stores the encoding method selection information and the binary type information in the bitstream.

When the processing of step S1006 ends, the encoding processing ends.

By executing the encoding processing as described above, the encoding device 1000 can store and transmit binary type information, indicating the determined binary type, in the bitstream. This makes it possible for the encoding device 1000 to designate the binary type to be applied by the decoding device. The decoding device can therefore correctly decode the bitstream in a more reliable manner. A drop in the encoding efficiency can therefore be suppressed.

Note that in this case, the decoding device has the same configuration as the decoding device 850 in FIG. 50, and the various types of processing may be executed through a flow similar to that of the flowchart in FIG. 51, and as such, descriptions thereof will be omitted.

<2-6. Application Example>

Figure 56:
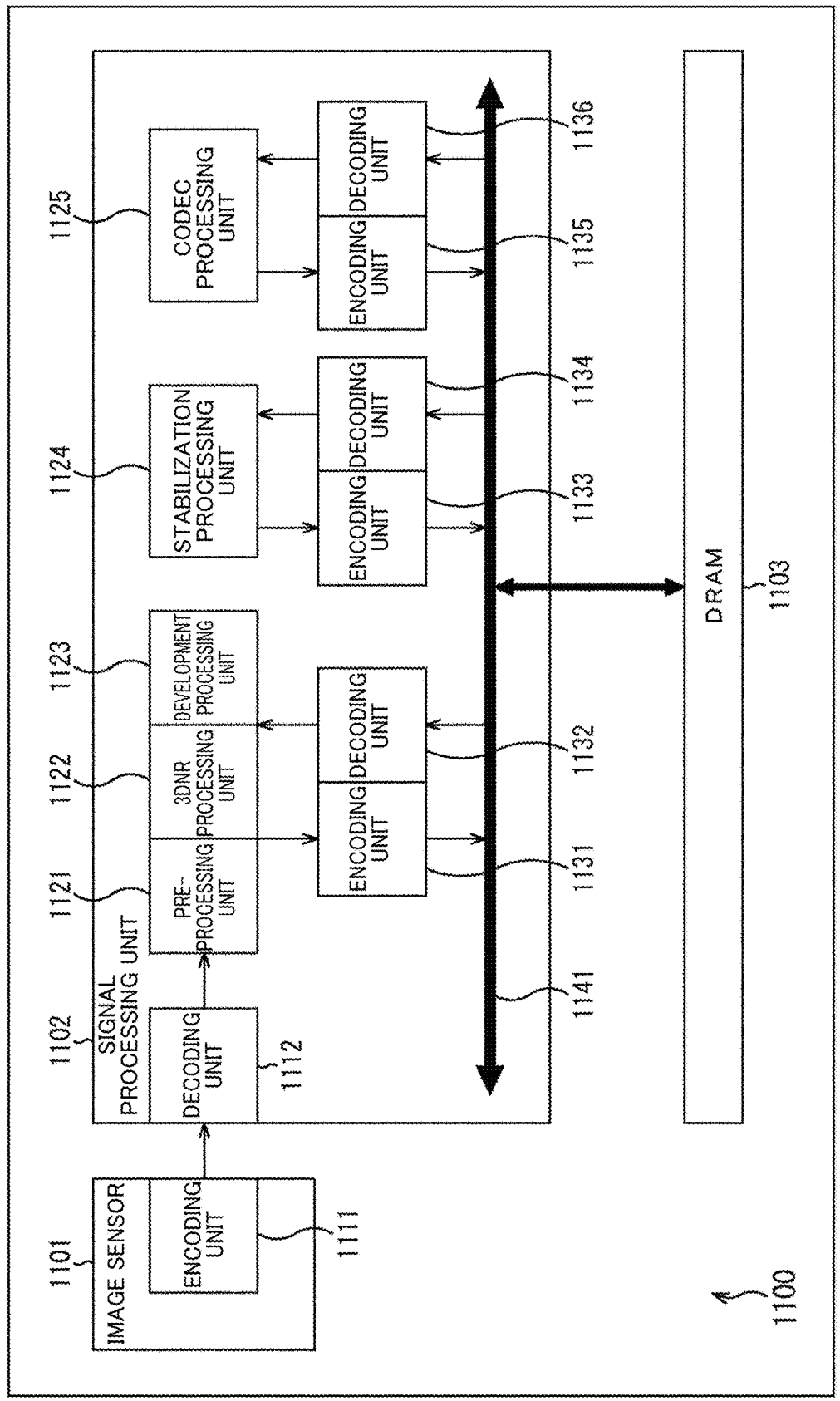
FIG. 56 is a block diagram illustrating an example of the main configuration of an image capturing device.

The present technique can be applied in an image capturing device, for example. FIG. 56 is a block diagram illustrating an example of the configuration of an image capturing device serving as one aspect of an information processing device in which the present technique is applied. Note that FIG. 56 illustrates the main processing units, data flows, and the like, and the items illustrated in FIG. 56 are not necessarily all the items. In other words, an image capturing device 1100 may include processing units not illustrated as blocks in FIG. 56, and processing and data flows not indicated as arrows or the like in FIG. 56.

As illustrated in FIG. 56, the image capturing device 1100 includes an image sensor 1101 and a signal processing unit 1102. When image data is transmitted from the image sensor 1101 to the signal processing unit 1102, the present technique may be applied to encode (compress) the image data. In other words, an encoding unit 1111 may be provided as an interface of the image sensor 1101, and the encoding unit 1111 may encode the image data by applying the present technique. Additionally, a decoding unit 1112 may be provided as an interface of the signal processing unit 1102, and the decoding unit 1112 may decode encoded data of the image data, generated by the encoding unit 1111, by applying the present technique. Doing so makes it possible to suppress a drop in encoding efficiency in the transmission of data from the image sensor 1101 to the signal processing unit 1102.

The signal processing unit 1102 includes a pre-processing unit 1121, a 3DNR processing unit 1122, and a development processing unit 1123. When performing the respective instances of signal processing, the processing units read out information stored in a DRAM 1103, or cause information to be stored in the DRAM 1103, over a bus 1141. For example, the processing units may cause data that is being processed or has been processed to be stored in the DRAM 1103, or data that is to be processed or is being processed to be read out from the DRAM 1103.

The data and the like to be exchanged with the DRAM 1103 may be encoded (compressed) by applying the present technique. In this case, an encoding unit 1131 and a decoding unit 1132 are provided. The encoding unit 1131 compresses data and the like to be supplied to the DRAM 1103, and the decoding unit 1132 decompresses encoded data read out from the DRAM 1103. Doing so makes it possible to suppress a drop in encoding efficiency in the transmission of data between the signal processing unit 112 and the DRAM 1103.

The signal processing unit 1102 may also include a stabilization processing unit 1124. An encoding unit 1133 and a decoding unit 1134 may be provided as interfaces for the stabilization processing unit 1124 to access the DRAM 1103 over the bus 1141. In other words, the encoding unit 1133 compresses data and the like to be supplied to the DRAM 1103, and the decoding unit 1132 decompresses encoded data read out from the DRAM 1103. Doing so makes it possible to suppress a drop in encoding efficiency in the transmission of data between the signal processing unit 11j02 and the DRAM 1103.

The signal processing unit 1102 may also include a codec processing unit 1125. An encoding unit 1135 and a decoding unit 1136 may be provided as interfaces for the codec processing unit 1125 to access the DRAM 1103 over the bus 1141. In other words, the encoding unit 1135 compresses data and the like to be supplied to the DRAM 1103, and the decoding unit 1136 decompresses encoded data read out from the DRAM 1103. Doing so makes it possible to suppress a drop in encoding efficiency in the transmission of data between the signal processing unit 1102 and the DRAM 1103.

<3. Supplementary Notes>

The various methods described above may be combined as appropriate.

<Computer>

The series of processing described above can be executed by hardware, or can be executed by software. When the series of processing is executed by software, a program that constitutes the software is installed on a computer. Here, the computer includes, for example, a computer built in dedicated hardware and a general-purpose personal computer in which various programs are installed to be able to execute various functions.

Figure 57:
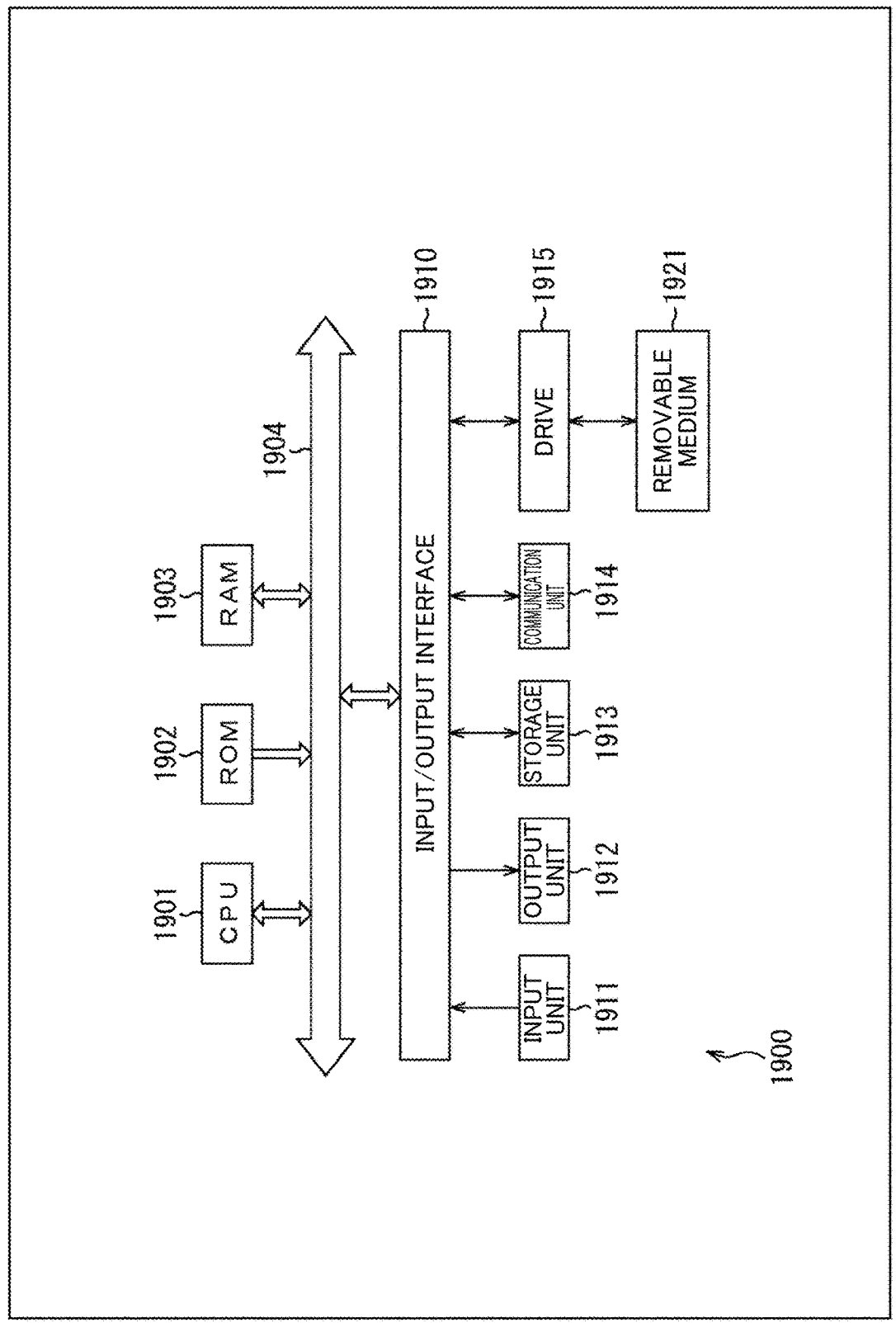
FIG. 57 is a block diagram illustrating an example of the main configuration of a computer.

FIG. 57 is a block diagram illustrating an example of hardware configuration of a computer that executes the series of processing described above according to a program.

In a computer 1900 illustrated in FIG. 57, a Central Processing Unit (CPU) 1901, a Read Only Memory (ROM) 1902, and a Random Access Memory (RAM) 1903 are connected to each other by a bus 1904.

An input/output interface 1910 is also connected to the bus 1904. An input unit 1911, an output unit 1912, a storage unit 1913, a communication unit 1914, and a drive 1915 are connected to the input/output interface 1910.

The input unit 1911 includes, for example, a keyboard, a mouse, a microphone, a touch panel, an input terminal, and the like. The output unit 1912 includes, for example, a display, a speaker, an output terminal, and the like. The storage unit 1913 includes, for example, a hard disk, a RAM disk, and non-volatile memory. The communication unit 1914 includes, for example, a network interface. The drive 1915 drives a removable medium 1921 such as a magnetic disk, an optical disc, a magneto-optical disk, semiconductor memory, or the like.

In the computer that has the above configuration, for example, the CPU 1901 executes the above-described series of processes by loading a program stored in the storage unit 1913 into the RAM 1903 via the input/output interface 1910 and the bus 1904 and executing the program. Data and the like necessary for the CPU 1901 to execute the various kinds of processing is also stored as appropriate in the RAM 1903.

The program executed by the computer can be recorded in, for example, the removable medium 1921 as a package medium or the like and provided in such a form. In this case, the program may be installed in the storage unit 1913 via the input/output interface 1910 by inserting the removable medium 1921 into the drive 1915.

Additionally, the program may also be provided via a wired or wireless transmission medium such as a local area network, the Internet, or digital satellite broadcasting. In this case, the program can be received by the communication unit 1914 and installed in the storage unit 1913.

In addition, this program can be installed in advance in the ROM 1902, the storage unit 1913, or the like.

<Application of the Present Technique>

The present technique can be applied to any desired configuration.

For example, the present technique can be applied in various electronic devices such as transmitters and receivers (e.g., television receivers and cellular phones) in satellite broadcasting, wired broadcasting such as cable TV, transmission on the Internet, transmission to terminals according to cellular communication, and the like, or devices (e.g., hard disk recorders and cameras) that record images in media such as an optical disk, a magnetic disk, and a flash memory or reproduce images from these storage media.

Additionally, for example, the present technique can be implemented as a configuration of a part of a device such as a processor (e.g., a video processor) of a system large scale integration (LSI) circuit, a module (e.g., a video module) using a plurality of processors or the like, a unit (e.g., a video unit) using a plurality of modules or the like, or a set (e.g., a video set) with other functions added to the unit.

For example, the present technique can also be applied in a network system constituted by a plurality of devices. The present technique may be implemented as, for example, cloud computing for processing shared among a plurality of devices via a network. For example, the present technique may be implemented in a cloud service that provides services pertaining to images (moving images) to any terminals such as a computer, an audio visual (AV) device, a mobile information processing terminal, and an Internet-of-Things (IoT) device or the like.

Note that in the present specification, "system" means a set of a plurality of constituent elements (devices, modules (components), or the like), and it does not matter whether or not all the constituent elements are provided in the same housing. Therefore, a plurality of devices contained in separate housings and connected over a network, and one device in which a plurality of modules are contained in one housing, are both "systems".

<Fields and Applications in which Present Technique is Applicable>

A system, a device, a processing unit, or the like in which the present technique is applied can be used in any field, such as, for example, transportation, medical care, crime prevention, agriculture, livestock industry, mining, beauty, factories, home appliances, weather, nature monitoring, and the like. The application of the present technique can also be implemented as desired.

For example, the present technique can be applied in systems and devices used for providing content for viewing and the like. In addition, for example, the present technique can be applied in systems and devices used for transportation, such as traffic condition monitoring and autonomous driving control. Furthermore, for example, the present technique can be applied in systems and devices used for security. In addition, for example, the present technique can be applied to systems and devices used for automatically controlling machines and the like.

Furthermore, for example, the present technique can be applied in systems and devices used for the agriculture and livestock industries. In addition, the present technique can also be applied, for example, in systems and devices for monitoring natural conditions such as volcanoes, forests, oceans, wildlife, and the like. Furthermore, for example, the present technique can be applied in systems and devices used for sports.

<Other>

Note that the term "flag" as used in the present specification refers to information used to identify a plurality of states, and includes not only information used when identifying two states, i.e., true (1) or false (0), but also information capable of identifying three or more states. Accordingly, the value this "flag" can take may be, for example, a binary value of 1 or 0, or three or more values. In other words, the number of bits constituting this "flag" can be set as desired, as one bit or multiple bits. Additionally, the identification information (including flags) is assumed to include not only the identification information in the bitstream, but also the difference information of the identification information relative to given reference information in the bitstream, "flag" and "identification information" in the present specification include not only that information, but also the difference information relative to that reference information.

Additionally various types of information (metadata and the like) pertaining to encoded data (a bitstream) may be transmitted or recorded in any form as long as the information is associated with the encoded data. Here, the term "associate" means, for example, to make one piece of data usable (linkable) for another piece of data when processing the other piece of data. In other words, data associated with each other may be grouped together as a single piece of data, or may be separate pieces of data. For example, information associated with encoded data (an image) may be transmitted over a different transmission path than the encoded data (the image). Additionally, for example, information associated with encoded data (an image) may be recorded in a different recording medium (or in a different recording area of the same recording medium) than the encoded data (the image). Note that this "association" may be for part of the data instead of the entirety of the data. For example, an image and information corresponding to the image may be associated with a plurality of frames, one frame, or any unit such as a part within the frame.

In the present specification, a term such as "combining," "multiplexing," "adding," "integrating," "including," "storing," "pushing," "entering," or "inserting" means that a plurality of things are collected as one, for example, encoded data and metadata are collected as one piece of data, and means one method of the above-described "associating".

Additionally, the embodiments of the present technique are not limited to the above-described embodiments, and various modifications can be made without departing from the essential spirit of the present technique.

For example, configurations described as one device (or one processing unit) may be divided to be configured as a plurality of devices (or processing units). Conversely, configurations described as a plurality of devices (or processing units) in the foregoing may be collectively configured as one device (or one processing unit). Configurations other than those described above may of course be added to the configuration of each device (or each processing unit). Furthermore, part of the configuration of one device (or one processing unit) may be included in the configuration of another device (or another processing unit) as long as the configuration or operation of the entire system is substantially the same.

Additionally, for example, the program described above may be executed on any device. In this case, the device may have necessary functions (function blocks and the like) and may be capable of obtaining necessary information.

Additionally, for example, each step of a single flowchart may be executed by a single device, or may be executed cooperatively by a plurality of devices. Furthermore, if a single step includes a plurality of processes, the plurality of processes may be executed by a single device or shared by a plurality of devices. In other words, the plurality of kinds of processing included in the single step may be executed as processing for a plurality of steps. Conversely, processing described as a plurality of steps may be collectively executed as a single step.

Furthermore, the program to be executed by a computer may have the following features. For example, the processing of steps described in the program may be executed in chronological order according to the order described in the present specification. Additionally, the processing of some steps described in the program may be executed in parallel. Furthermore, the processing of steps described in the program may be individually executed at the necessary timing, such as when called. That is, as long as no contradiction arises, the processing steps may be executed in an order different from the order described above. Additionally, the processing of some steps described in this program may be executed in parallel with the processing of another program. Furthermore, the processing of steps described in this program may be executed in combination with the processing of another program.

Additionally, for example, the multiple techniques related to the present technique can be implemented independently on their own, as long as no contradictions arise. Of course, any number of modes of the present technique may be used in combination. For example, part or all of the present technique described in any of the embodiments may be implemented in combination with part or all of the present technique described in the other embodiments. Furthermore, part or all of any of the above-described modes of the present technique may be implemented in combination with other techniques not described above.

Note that the present technique can also be configured as follows.

(1) An information processing device including:
  a valid most significant bit position detection unit that detects a valid most significant bit position in a data unit constituted by a plurality of samples, the valid most significant bit position being a position of a most significant bit among bits having a value different from a bit pattern according to a binary type;
  a valid data extraction unit that extracts a bit string below the valid most significant bit position as valid data from the samples; and
  a bitstream generation unit that generates a bitstream including information indicating the valid most significant bit position and the valid data of each of the samples.

(2) The information processing device according to (1), wherein the binary type is straight binary,
  the bit pattern is constituted only by values of "0", and
  the valid most significant bit position is the position of the most significant bit among bits having a value of "1".

(3) The information processing device according to (1) or (2),
wherein the binary type is two's complement binary,
the bit pattern is constituted only by values of "0" or only by values of "1",
the valid most significant bit position is the position of the most significant bit among bits having a value different from a value of the most significant bit in the samples,
the information processing device further includes a most significant bit extraction unit that extracts the most significant bit of the samples, and
the bitstream generation unit generates the bitstream further including the most significant bit of each of the samples.
(4) The information processing device according to any one of (1) to (3),
wherein the binary type is offset binary,
the bit pattern is constituted by a value of "0" for the most significant bit and a value of "1" for other bits, or is constituted by a value of "1" for the most significant bit and a value of "0" for other bits,
the valid most significant bit position is the position of the most significant bit among bits having a value identical to a value of the most significant bit in the samples,
the information processing device further includes a most significant bit extraction unit that extracts the most significant bit of the samples, and
the bitstream generation unit generates the bitstream further including the most significant bit of each of the samples.
(5) The information processing device according to any one of (1) to (4), further including:
an encoding unit that encodes the data unit using a second encoding method different from a first encoding method, the first encoding method using pulse code modulation; and
an encoding method selection unit that selects an encoding method to be applied, wherein the bitstream generation unit:
generates the bitstream including (i) information indicating the encoding method selected, (ii) the valid most significant bit position, and (iii) the valid data of each of the samples, when the first encoding method is selected; and
generates the bitstream including (i) information indicating the encoding method selected and (ii) encoded data of the data unit encoded using the second encoding method, when the second encoding method is selected.
(6) The information processing device according to (5),
wherein the second encoding method is an encoding method using differential pulse code modulation, and
the encoding unit calculates a difference between a sample which is not a reference sample and another sample, and generates the encoded data including the difference from the reference sample.
(7) The information processing device according to (5) or (6), further including:
an efficiency comparison unit that compares an efficiency of each of candidates for the encoding method to be applied,
wherein the encoding method selection unit selects the encoding method to be applied based on a comparison result for the efficiency.
(8) The information processing device according to (7),
wherein the efficiency comparison unit compares bit amounts that can be transmitted by each of the candidates.
(9) The information processing device according to (7) or (8),
wherein the efficiency comparison unit compares rate distortions of each of the candidates.
(10) The information processing device according to any one of (7) to (9),
wherein the efficiency comparison unit compares parameters that are designated.
(11) The information processing device according to any one of (1) to (10),
wherein the most significant bit position detection unit detects the valid most significant bit position using a method according to the binary type that has been designated.
(12) The information processing device according to (11),
wherein the bitstream generation unit generates the bitstream further including information indicating the binary type that has been designated.
(13) The information processing device according to any one of (1) to (12), further including:
a binary type determination unit that determines the binary type of the samples, wherein the most significant bit position detection unit detects the valid most significant bit position using a method according to a determination result for the binary type, and
the bitstream generation unit generates the bitstream further including information indicating the determination result.
(14) An information processing method including:
detecting a valid most significant bit position in a data unit constituted by a plurality of samples, the valid most significant bit position being a position of a most significant bit among bits having a value different from a bit pattern according to a binary type;
extracting a bit string below the valid most significant bit position as valid data from the samples; and
generating a bitstream including (i) information indicating the valid most significant bit position and (ii) the valid data of each of the samples.
(21) An information processing device including:
an extraction unit that extracts, from a bitstream, (i) information indicating a valid most significant bit position in a data unit constituted by a plurality of samples, the valid most significant bit position being the most significant bit position among the bits having a value different from the bit pattern according to the binary type, and (ii) valid data that is a bit string below the valid most significant bit position in each of the samples;
an invalid data generation unit that generates invalid data that is above the valid most significant bit position, the invalid data conforming to the bit pattern;
a valid data alignment unit that aligns the valid data to make the valid data a bit string below the valid most significant bit position in the samples; and
a data unit generation unit that generates the data unit by coupling the invalid data with the valid data aligned, for each of the samples.
(22) The information processing device according to (21),
wherein the binary type is straight binary,
the bit pattern is constituted only by values of "0", and
the valid most significant bit position is the position of the most significant bit
among bits having a value of "1".

(23) The information processing device according to (21) or (22),
wherein the binary type is two's complement binary,
the bit pattern is constituted only by values of "0" or only by values of "1",
the valid most significant bit position is the position of the most significant bit among bits having a value different from a value of the most significant bit in the samples,
the extraction unit further extracts the most significant bit of the samples from the bitstream, and
the invalid data generation unit generates the invalid data using the most significant bit of the samples.

(24) The information processing device according to any one of (21) to (23),
wherein the binary type is offset binary,
the bit pattern is constituted by a value of "0" for the most significant bit and a value of "1" for other bits, or is constituted by a value of "1" for the most significant bit and a value of "0" for other bits,
the valid most significant bit position is the position of the most significant bit among bits having a value identical to a value of the most significant bit in the samples,
the extraction unit further extracts the most significant bit of the samples from the bitstream, and
the invalid data generation unit generates the invalid data using the most significant bit of the samples.

(25) The information processing device according to any one of (21) to (24),
wherein the extraction unit further extracts, from the bitstream, information indicating an encoding method applied to the data unit, and
the information processing device further includes:
a decoding unit that generates the data unit by extracting encoded data of the data unit from the bitstream and decoding the encoded data using a decoding method corresponding to a second encoding method different from a first encoding method,
the first encoding method using pulse code modulation; and
a data unit selection unit that selects the data unit generated by the data unit generation unit when the first encoding method is selected according to the information, and selects the data unit generated by the decoding unit when the second encoding method is selected according to the information.

(26) The information processing device according to (25),
wherein the second encoding method is an encoding method using differential pulse code modulation, and
the decoding unit generates the data unit by adding a reference sample included in the encoded data with one of differences between two of the samples, and repeatedly adding a result of the adding to another one of the differences in a recursive manner.

(27) The information processing device according to any one of (21) to (26),
wherein the invalid data generation unit generates the invalid data constituted by a bit pattern according to the binary type that has been designated.

(28) The information processing device according to any one of (21) to (27),
wherein the extraction unit further extracts information indicating the binary type from the bitstream, and
the invalid data generation unit generates the invalid data constituted by a bit pattern according to the binary type indicated by the information.

(29) An information processing method including:
extracting, from a bitstream, (i) information indicating a valid most significant bit position in a data unit constituted by a plurality of samples, the valid most significant bit position being the most significant bit position among the bits having a value different from the bit pattern according to the binary type, and (ii) valid data that is a bit string below the valid most significant bit position in each of the samples;
generating invalid data that is above the valid most significant bit position, the invalid data conforming to the bit pattern;
aligning the valid data to make the valid data a bit string below the valid most significant bit position in the samples; and
generating the data unit by coupling the invalid data with the valid data aligned, for each of the samples.

REFERENCE SIGNS LIST

100 Encoding device
101 VMP calculation unit
102 Valid data extraction unit
103 Multiplexing unit
150 Decoding device
151 Parser
152 Invalid data generation unit
153 Valid data alignment unit
154 Coupling unit
200 Encoding device
201 VMP calculation unit
202 Valid data extraction unit
203 MSB extraction unit
204 Multiplexing unit
250 Decoding device
251 Parser
252 Invalid data generation unit
253 Valid data alignment unit
254 Coupling unit
300 Encoding device
301 VMP calculation unit
302 Valid data extraction unit
303 MSB extraction unit
304 Multiplexing unit
350 Decoding device
351 Parser
352 Invalid data generation unit
353 Valid data alignment unit
354 Coupling unit
400 Encoding device
401 Efficiency comparison unit
402 Encoding unit
403 Encoding unit
404 Selection unit
405 Multiplexing unit
431 VMP calculation unit
432 Coverage calculation unit
433 Coverage calculation unit
434 Comparison unit
441 VMP calculation unit
442 Rate distortion calculation unit
443 Rate distortion calculation unit
444 Comparison unit
450 Decoding device
451 Parser
452 Invalid data generation unit
453 Valid data alignment unit 454 Coupling unit
455 Decoding unit
456 Selection unit
500 Encoding device
501 VMP calculation unit
502 Valid data extraction unit
503 MSB extraction unit
504 Multiplexing unit
550 Decoding device
551 Parser
552 Invalid data generation unit
553 Valid data alignment unit
554 Coupling unit
600 Encoding device
601 Efficiency comparison unit
602 Encoding unit
603 Encoding unit
604 Selection unit
605 Multiplexing unit
650 Decoding device
651 Parser
652 Invalid data generation unit
653 Valid data alignment unit
654 Coupling unit
655 Decoding unit
656 Selection unit
700 Encoding device
701 VMP calculation unit
702 Valid data extraction unit
703 MSB extraction unit
704 Multiplexing unit
750 Decoding device
751 Parser
752 Invalid data generation unit
753 Valid data alignment unit
754 Coupling unit
800 Encoding device
801 Efficiency comparison unit
802 Encoding unit
803 Encoding unit
804 Selection unit
805 Multiplexing unit
850 Decoding device
851 Parser
852 Invalid data generation unit
853 Valid data alignment unit
854 Coupling unit
855 Decoding unit
856 Selection unit
900 Encoding device
901 VMP calculation unit
902 Valid data extraction unit
903 MSB extraction unit
904 Multiplexing unit
911 Binary type determination unit
1000 Encoding device
1001 Efficiency comparison unit
1002 Encoding unit
1003 Encoding unit
1004 Selection unit
1005 Multiplexing unit
1011 Binary determination unit
1100 Image capturing device
1101 Image sensor
1102 Signal processing unit
1103 DRAM
1111 Encoding unit
1112 Decoding unit
1121 Preprocessing unit
1122 3DNR processing unit
1123 Developing processing unit
1124 Stabilization processing unit
1125 Codec processing unit
1131 Encoding unit
1132 Decoding unit
1133 Encoding unit
1134 Decoding unit
1135 Encoding unit
1136 Decoding unit
1141 Bus
1900 Computer

The invention claimed is:

1. An information processing device comprising:
a valid most significant bit position detection unit that detects a valid most significant bit position in a data unit constituted by a plurality of samples, the valid most significant bit position being a position of a most significant bit among bits having a value different from a bit pattern according to a binary type;
a valid data extraction unit that extracts a bit string below the valid most significant bit position as valid data from the samples; and
a bitstream generation unit that generates a bitstream including information indicating the binary type, information indicating the valid most significant bit position, and the valid data of each of the samples.

2. The information processing device according to claim 1,
wherein the binary type is straight binary,
the bit pattern is constituted only by values of "0", and
the valid most significant bit position is the position of the most significant bit among bits having a value of "1".

3. The information processing device according to claim 1,
wherein the binary type is two's complement binary,
the bit pattern is constituted only by values of "0" or only by values of "1",
the valid most significant bit position is the position of the most significant bit among bits having a value different from a value of the most significant bit in the samples,
the information processing device further comprises a most significant bit extraction unit that extracts the most significant bit of the samples, and
the bitstream generation unit generates the bitstream further including the most significant bit of each of the samples.

4. The information processing device according to claim 1,
wherein the binary type is offset binary,
the bit pattern is constituted by a value of "0" for the most significant bit and a value of "1" for other bits, or is constituted by a value of "1" for the most significant bit and a value of "0" for other bits,
the valid most significant bit position is the position of the most significant bit among bits having a value identical to a value of the most significant bit in the samples,
the information processing device further comprises a most significant bit extraction unit that extracts the most significant bit of the samples, and
the bitstream generation unit generates the bitstream further including the most significant bit of each of the samples.

5. The information processing device according to claim 1, further comprising:
an encoding unit that encodes the data unit using a second encoding method different from a first encoding method, the first encoding method using pulse code modulation; and
an encoding method selection unit that selects an encoding method to be applied,
wherein the bitstream generation unit:
generates the bitstream including (i) information indicating the encoding method selected, (ii) the valid most significant bit position, and (iii) the valid data of each of the samples, when the first encoding method is selected; and
generates the bitstream including (i) information indicating the encoding method selected and (ii) encoded data of the data unit encoded using the second encoding method, when the second encoding method is selected.

6. The information processing device according to claim 5,
wherein the second encoding method is an encoding method using differential pulse code modulation, and
the encoding unit calculates a difference between a sample which is not a reference sample and another sample, and generates the encoded data including the difference from the reference sample.

7. The information processing device according to claim 5, further comprising:
an efficiency comparison unit that compares an efficiency of each of candidates for the encoding method to be applied,
wherein the encoding method selection unit selects the encoding method to be applied based on a comparison result for the efficiency.

8. The information processing device according to claim 1,
wherein the most significant bit position detection unit detects the valid most significant bit position using a method according to the binary type that has been designated.

9. The information processing device according to claim 8,
wherein the information indicating the binary type indicates the binary type that has been designated.

10. The information processing device according to claim 1, further comprising:
a binary type determination unit that determines the binary type of the samples,
wherein the most significant bit position detection unit detects the valid most significant bit position using a method according to the binary type that has been determined, and
the information indicating the binary type indicates the binary type that has been determined.

11. An information processing method comprising:
detecting a valid most significant bit position in a data unit constituted by a plurality of samples, the valid most significant bit position being a position of a most significant bit among bits having a value different from a bit pattern according to a binary type;
extracting a bit string below the valid most significant bit position as valid data from the samples; and
generating a bitstream including information indicating the binary type, information indicating the valid most significant bit position, and the valid data of each of the samples.

* * * * *